(12) United States Patent
Rivard et al.

(10) Patent No.: US 10,924,688 B2
(45) Date of Patent: Feb. 16, 2021

(54) IMAGE SENSOR APPARATUS AND METHOD FOR OBTAINING LOW-NOISE, HIGH-SPEED CAPTURES OF A PHOTOGRAPHIC SCENE

(71) Applicant: Duelight LLC, Sunnyvale, CA (US)

(72) Inventors: William Rivard, Menlo Park, CA (US); Adam Feder, Mountain View, CA (US); Brian Kindle, Sunnyvale, CA (US)

(73) Assignee: DUELIGHT LLC, Sunnyvale, CA (US)

( * ) Notice: Subject to any disclaimer, the term of this patent is extended or adjusted under 35 U.S.C. 154(b) by 0 days.

(21) Appl. No.: 16/584,486

(22) Filed: Sep. 26, 2019

(65) Prior Publication Data
US 2020/0029008 A1    Jan. 23, 2020

Related U.S. Application Data

(63) Continuation-in-part of application No. 16/519,244, filed on Jul. 23, 2019, now Pat. No. 10,652,478, which is a continuation of application No. 15/891,251, filed on Feb. 7, 2018, now Pat. No. 10,382,702, which is a continuation of application No. 14/823,993, filed on Aug. 11, 2015, now Pat. No.
(Continued)

(51) Int. Cl.
| | |
|---|---|
| H04N 5/235 | (2006.01) |
| H04N 5/243 | (2006.01) |
| G06T 5/50 | (2006.01) |
| H04N 5/232 | (2006.01) |

(52) U.S. Cl.
CPC ............ *H04N 5/2355* (2013.01); *G06T 5/50* (2013.01); *H04N 5/2352* (2013.01); *H04N 5/23254* (2013.01); *H04N 5/243* (2013.01); *G06T 2207/20208* (2013.01); *G06T 2207/20221* (2013.01)

(58) Field of Classification Search
CPC .. H04N 5/355; H04N 5/3745; H04N 5/35536; H04N 5/37452; H04N 9/77; H04N 9/735; H01L 27/14641
See application file for complete search history.

(56) References Cited

U.S. PATENT DOCUMENTS

| | | |
|---|---|---|
| 4,873,561 A | 10/1989 | Wen |
| 5,200,828 A | 4/1993 | Jang et al. |

(Continued)

FOREIGN PATENT DOCUMENTS

| | | |
|---|---|---|
| CN | 101290388 A | 10/2008 |
| CN | 101408709 A | 4/2009 |

(Continued)

OTHER PUBLICATIONS

Rivard et al., U.S. Appl. No. 16/796,497, filed Feb. 20, 2020.
(Continued)

*Primary Examiner* — Kelly L Jerabek
(74) *Attorney, Agent, or Firm* — Zilka-Kotab, P.C.

(57) ABSTRACT

A system, method, and computer program product are provided for obtaining low-noise, high-speed captures of a photographic scene. In use, a first cell of a first pixel is in communication with a first node for storing a first sample. Further, a second cell of a second pixel is in communication with a second node for storing a second sample. Still further, the first cell and the second cell are communicatively coupled.

20 Claims, 19 Drawing Sheets

Related U.S. Application Data 9,918,017, which is a continuation-in-part of application No. 14/535,279, filed on Nov. 6, 2014, now Pat. No. 9,179,085.

(56) References Cited

U.S. PATENT DOCUMENTS

| | | |
|---|---|---|
| 5,363,209 A | 11/1994 | Eschbach et al. |
| 5,818,977 A | 10/1998 | Tansley |
| 5,867,215 A | 2/1999 | Kaplan |
| 6,115,065 A | 9/2000 | Yadid-Pecht et al. |
| 6,184,940 B1 | 2/2001 | Sano |
| 6,243,430 B1 | 6/2001 | Mathe |
| 6,365,950 B1 | 4/2002 | Sohn |
| 6,453,068 B1 | 9/2002 | Li |
| 6,498,926 B1 | 12/2002 | Ciccarelli et al. |
| 6,642,962 B1 | 11/2003 | Lin et al. |
| 6,788,338 B1 | 9/2004 | Dinev et al. |
| 6,996,186 B2 | 2/2006 | Ngai et al. |
| 7,084,905 B1 | 8/2006 | Nayar et al. |
| 7,088,351 B2 | 8/2006 | Wang |
| 7,098,952 B2 | 8/2006 | Morris et al. |
| 7,206,449 B2 | 4/2007 | Raskar et al. |
| 7,256,381 B2 | 8/2007 | Asaba |
| 7,265,784 B1 | 9/2007 | Frank |
| 7,518,645 B2 | 4/2009 | Farrier |
| 7,587,099 B2 | 9/2009 | Szeliski et al. |
| 7,599,569 B2 | 10/2009 | Smirnov et al. |
| 7,760,246 B2 | 7/2010 | Dalton et al. |
| 7,835,586 B2 | 11/2010 | Porikli |
| 7,907,791 B2 | 3/2011 | Kinrot et al. |
| 7,999,858 B2 | 8/2011 | Nayar et al. |
| 8,144,253 B2 | 3/2012 | Su et al. |
| 8,189,944 B1 | 5/2012 | Lim |
| 8,610,789 B1 | 12/2013 | Nayar et al. |
| 8,675,086 B1 | 3/2014 | Linzer |
| 8,723,284 B1 | 5/2014 | Hynecek |
| 8,761,245 B2 | 6/2014 | Puri et al. |
| 8,780,420 B1 | 7/2014 | Bluzer et al. |
| 8,811,757 B2 | 8/2014 | Batur |
| 8,854,421 B2 | 10/2014 | Kasahara |
| 8,878,963 B2 | 11/2014 | Prabhudesai et al. |
| 8,934,029 B2 | 1/2015 | Nayar et al. |
| 8,976,264 B2 | 3/2015 | Rivard et al. |
| 9,014,459 B2 | 4/2015 | Xiang et al. |
| 9,070,185 B2 | 6/2015 | Lee et al. |
| 9,083,905 B2 | 7/2015 | Wan et al. |
| 9,106,888 B2 | 8/2015 | Chou |
| 9,137,455 B1 | 9/2015 | Rivard et al. |
| 9,154,708 B1 | 10/2015 | Rivard et al. |
| 9,160,936 B1 | 10/2015 | Rivard et al. |
| 9,167,169 B1 | 10/2015 | Rivard et al. |
| 9,179,062 B1 | 11/2015 | Rivard et al. |
| 9,179,085 B1 | 11/2015 | Rivard et al. |
| 9,336,574 B2 | 5/2016 | Zhang |
| 9,406,147 B2 | 8/2016 | Rivard et al. |
| 9,531,961 B2 | 12/2016 | Rivard et al. |
| 9,560,269 B2 | 1/2017 | Baldwin |
| 9,578,211 B2 | 2/2017 | Kong et al. |
| 9,600,741 B1 | 3/2017 | Su et al. |
| 9,661,327 B2 | 5/2017 | Nilsson |
| 9,807,322 B2 | 10/2017 | Feder et al. |
| 9,819,849 B1 | 11/2017 | Rivard et al. |
| 9,860,461 B2 | 1/2018 | Feder et al. |
| 9,912,928 B2 | 3/2018 | Rivard et al. |
| 9,918,017 B2 | 3/2018 | Rivard et al. |
| 9,998,721 B2 | 6/2018 | Rivard et al. |
| 10,110,870 B2 | 10/2018 | Rivard et al. |
| 10,129,514 B2 | 11/2018 | Rivard et al. |
| 10,178,300 B2 | 1/2019 | Rivard et al. |
| 10,182,197 B2 | 1/2019 | Feder et al. |
| 10,270,958 B2 | 4/2019 | Rivard et al. |
| 10,372,971 B2 | 8/2019 | Rivard et al. |
| 10,375,369 B2 | 8/2019 | Rivard et al. |
| 10,382,702 B2 | 8/2019 | Rivard et al. |
| 10,469,714 B2 | 11/2019 | Rivard et al. |
| 10,477,077 B2 | 11/2019 | Rivard et al. |
| 10,498,982 B2 | 12/2019 | Feder et al. |
| 10,558,848 B2 | 2/2020 | Rivard et al. |
| 10,586,097 B2 | 3/2020 | Rivard et al. |
| 10,652,478 B2 | 5/2020 | Rivard et al. |
| 10,785,401 B2 | 9/2020 | Rivard et al. |
| 2003/0015645 A1 | 1/2003 | Brickell et al. |
| 2003/0142745 A1 | 7/2003 | Osawa |
| 2004/0181375 A1 | 9/2004 | Szu et al. |
| 2004/0184677 A1 | 9/2004 | Raskar et al. |
| 2004/0252199 A1 | 12/2004 | Cheung et al. |
| 2004/0263510 A1 | 12/2004 | Marschner et al. |
| 2005/0088570 A1 | 4/2005 | Seo |
| 2005/0134723 A1 | 6/2005 | Lee et al. |
| 2006/0015308 A1 | 1/2006 | Marschner et al. |
| 2006/0050165 A1 | 3/2006 | Amano |
| 2006/0087702 A1 | 4/2006 | Satoh et al. |
| 2006/0181614 A1 | 8/2006 | Yen et al. |
| 2006/0245014 A1 | 11/2006 | Haneda |
| 2007/0023798 A1 | 2/2007 | McKee |
| 2007/0025714 A1 | 2/2007 | Shiraki |
| 2007/0025717 A1 | 2/2007 | Raskar et al. |
| 2007/0030357 A1 | 2/2007 | Levien et al. |
| 2007/0242900 A1 | 10/2007 | Chen et al. |
| 2007/0248342 A1 | 10/2007 | Tamminen et al. |
| 2007/0263106 A1 | 11/2007 | Tanaka et al. |
| 2008/0018763 A1 | 1/2008 | Sato |
| 2008/0030592 A1 | 2/2008 | Border et al. |
| 2008/0107411 A1 | 5/2008 | Hope |
| 2008/0151097 A1 | 6/2008 | Chen et al. |
| 2008/0158398 A1 | 7/2008 | Yaffe et al. |
| 2008/0170160 A1 | 7/2008 | Lukac |
| 2008/0192064 A1 | 8/2008 | Hong et al. |
| 2009/0002475 A1 | 1/2009 | Jelley et al. |
| 2009/0066782 A1 | 3/2009 | Choi et al. |
| 2009/0153245 A1 | 6/2009 | Lee |
| 2009/0160992 A1 | 6/2009 | Inaba et al. |
| 2009/0175555 A1 | 7/2009 | Mahowald |
| 2009/0295941 A1 | 12/2009 | Nakajima et al. |
| 2009/0309990 A1 | 12/2009 | Levoy et al. |
| 2009/0309994 A1 | 12/2009 | Inoue |
| 2009/0322903 A1 | 12/2009 | Hashimoto et al. |
| 2010/0073499 A1 | 3/2010 | Gere |
| 2010/0118204 A1 | 5/2010 | Proca et al. |
| 2010/0165178 A1 | 7/2010 | Chou et al. |
| 2010/0165181 A1 | 7/2010 | Murakami et al. |
| 2010/0182465 A1 | 7/2010 | Okita |
| 2010/0194851 A1 | 8/2010 | Pasupaleti et al. |
| 2010/0194963 A1 | 8/2010 | Terashima |
| 2010/0201831 A1 | 8/2010 | Weinstein |
| 2010/0208099 A1 | 8/2010 | Nomura |
| 2010/0231747 A1 | 9/2010 | Yim |
| 2010/0265079 A1 | 10/2010 | Yin |
| 2010/0302407 A1 | 12/2010 | Ayers et al. |
| 2011/0019051 A1 | 1/2011 | Yin et al. |
| 2011/0090385 A1 | 4/2011 | Aoyama et al. |
| 2011/0096192 A1 | 4/2011 | Niikura |
| 2011/0115971 A1 | 5/2011 | Furuya et al. |
| 2011/0134267 A1 | 6/2011 | Ohya |
| 2011/0150332 A1 | 6/2011 | Sibiryakov et al. |
| 2011/0194618 A1 | 8/2011 | Gish et al. |
| 2011/0242334 A1 | 10/2011 | Wilburn et al. |
| 2011/0279698 A1 | 11/2011 | Yoshikawa |
| 2011/0280541 A1 | 11/2011 | Lee |
| 2012/0002082 A1 | 1/2012 | Johnson et al. |
| 2012/0002089 A1 | 1/2012 | Wang et al. |
| 2012/0008011 A1 | 1/2012 | Garcia Manchado |
| 2012/0033118 A1 | 2/2012 | Lee et al. |
| 2012/0057786 A1 | 3/2012 | Yano |
| 2012/0069213 A1 | 3/2012 | Jannard et al. |
| 2012/0154541 A1 | 6/2012 | Scott |
| 2012/0154627 A1 | 6/2012 | Rivard et al. |
| 2012/0162465 A1 | 6/2012 | Culbert et al. |
| 2012/0177352 A1 | 7/2012 | Pillman et al. |
| 2012/0188392 A1 | 7/2012 | Smith |
| 2012/0206582 A1 | 8/2012 | DiCarlo et al. |
| 2012/0212661 A1 | 8/2012 | Yamaguchi et al. |
| 2012/0242844 A1 | 9/2012 | Walker et al. |
| 2012/0262600 A1 | 10/2012 | Velarde et al. |

(56) References Cited

U.S. PATENT DOCUMENTS

| | | |
|---|---|---|
| 2012/0274806 A1 | 11/2012 | Mori |
| 2012/0287223 A1 | 11/2012 | Zhang et al. |
| 2012/0314100 A1 | 12/2012 | Frank |
| 2013/0010075 A1 | 1/2013 | Gallagher et al. |
| 2013/0021447 A1 | 1/2013 | Brisedoux et al. |
| 2013/0027580 A1 | 1/2013 | Olsen et al. |
| 2013/0050520 A1 | 2/2013 | Takeuchi |
| 2013/0070145 A1 | 3/2013 | Matsuyama |
| 2013/0107062 A1 | 5/2013 | Okazaki |
| 2013/0114894 A1 | 5/2013 | Yadav et al. |
| 2013/0147979 A1 | 6/2013 | McMahon et al. |
| 2013/0148013 A1 | 6/2013 | Shiohara |
| 2013/0176458 A1 | 7/2013 | Van Dalen et al. |
| 2013/0194963 A1 | 8/2013 | Hampel |
| 2013/0223530 A1 | 8/2013 | Demos |
| 2013/0228673 A1 | 9/2013 | Hashimoto et al. |
| 2013/0235068 A1 | 9/2013 | Ubillos et al. |
| 2013/0271631 A1 | 10/2013 | Tatsuzawa et al. |
| 2013/0279584 A1 | 10/2013 | Demos |
| 2013/0293744 A1 | 11/2013 | Attar et al. |
| 2013/0301729 A1 | 11/2013 | Demos |
| 2013/0335596 A1 | 12/2013 | Demandolx et al. |
| 2013/0342526 A1 | 12/2013 | Ng et al. |
| 2013/0342740 A1 | 12/2013 | Govindarao |
| 2014/0009636 A1 | 1/2014 | Lee et al. |
| 2014/0063287 A1 | 3/2014 | Yamada |
| 2014/0063301 A1 | 3/2014 | Solhusvik |
| 2014/0098248 A1 | 4/2014 | Okazaki |
| 2014/0168468 A1 | 6/2014 | Levoy et al. |
| 2014/0176757 A1 | 6/2014 | Rivard et al. |
| 2014/0184894 A1 | 7/2014 | Motta |
| 2014/0192216 A1 | 7/2014 | Matsumoto |
| 2014/0192267 A1 | 7/2014 | Biswas et al. |
| 2014/0193088 A1 | 7/2014 | Capata et al. |
| 2014/0198242 A1 | 7/2014 | Weng et al. |
| 2014/0211852 A1 | 7/2014 | Demos |
| 2014/0244858 A1 | 8/2014 | Okazaki |
| 2014/0247979 A1 | 9/2014 | Roffet et al. |
| 2014/0267869 A1 | 9/2014 | Sawa |
| 2014/0300795 A1 | 10/2014 | Bilcu et al. |
| 2014/0301642 A1 | 10/2014 | Muninder |
| 2014/0354781 A1 | 12/2014 | Matsuyama |
| 2015/0005637 A1 | 1/2015 | Stegman et al. |
| 2015/0077581 A1 | 3/2015 | Baltz et al. |
| 2015/0092852 A1 | 4/2015 | Demos |
| 2015/0098651 A1 | 4/2015 | Rivard et al. |
| 2015/0103192 A1 | 4/2015 | Venkatraman et al. |
| 2015/0138366 A1 | 5/2015 | Keelan et al. |
| 2015/0222809 A1 | 8/2015 | Osuka et al. |
| 2015/0229819 A1 | 8/2015 | Rivard et al. |
| 2015/0279113 A1 | 10/2015 | Knorr et al. |
| 2015/0334318 A1 | 11/2015 | Georgiev et al. |
| 2015/0341593 A1 | 11/2015 | Zhang et al. |
| 2016/0028948 A1 | 1/2016 | Omori et al. |
| 2016/0065926 A1 | 3/2016 | Nonaka et al. |
| 2016/0071289 A1 | 3/2016 | Kobayashi et al. |
| 2016/0086318 A1 | 3/2016 | Hannuksela et al. |
| 2016/0142610 A1 | 5/2016 | Rivard et al. |
| 2016/0150147 A1 | 5/2016 | Shioya |
| 2016/0150175 A1 | 5/2016 | Hynecek |
| 2016/0219211 A1 | 7/2016 | Katayama |
| 2016/0248968 A1 | 8/2016 | Baldwin |
| 2016/0284065 A1 | 9/2016 | Cohen |
| 2016/0316154 A1 | 10/2016 | Elmfors et al. |
| 2016/0323518 A1 | 11/2016 | Rivard et al. |
| 2016/0381304 A9 | 12/2016 | Feder et al. |
| 2017/0048442 A1 | 2/2017 | Cote et al. |
| 2017/0054966 A1 | 2/2017 | Zhou |
| 2017/0061234 A1 | 3/2017 | Lim et al. |
| 2017/0061236 A1 | 3/2017 | Pope |
| 2017/0061567 A1 | 3/2017 | Lim et al. |
| 2017/0064192 A1 | 3/2017 | Mori |
| 2017/0064227 A1 | 3/2017 | Lin et al. |
| 2017/0064276 A1 | 3/2017 | Rivard et al. |
| 2017/0070690 A1 | 3/2017 | Feder et al. |
| 2017/0076430 A1 | 3/2017 | Xu |
| 2017/0085785 A1 | 3/2017 | Corcoran et al. |
| 2017/0302903 A1 | 10/2017 | Ng et al. |
| 2017/0374336 A1 | 12/2017 | Rivard et al. |
| 2018/0007240 A1 | 1/2018 | Rivard et al. |
| 2018/0063409 A1 | 3/2018 | Rivard et al. |
| 2018/0063411 A1 | 3/2018 | Rivard et al. |
| 2018/0077367 A1 | 3/2018 | Feder et al. |
| 2018/0160092 A1 | 6/2018 | Rivard et al. |
| 2018/0183989 A1 | 6/2018 | Rivard et al. |
| 2019/0045165 A1 | 2/2019 | Rivard et al. |
| 2019/0108387 A1 | 4/2019 | Rivard et al. |
| 2019/0108388 A1 | 4/2019 | Rivard et al. |
| 2019/0116306 A1 | 4/2019 | Rivard et al. |
| 2019/0124280 A1 | 4/2019 | Feder et al. |
| 2019/0174028 A1 | 6/2019 | Rivard et al. |
| 2019/0197297 A1 | 6/2019 | Rivard et al. |
| 2019/0335151 A1 | 10/2019 | Rivard et al. |
| 2019/0349510 A1 | 11/2019 | Rivard et al. |
| 2020/0059575 A1 | 2/2020 | Rivard et al. |
| 2020/0084398 A1 | 3/2020 | Feder et al. |
| 2020/0193144 A1 | 6/2020 | Rivard et al. |
| 2020/0259991 A1 | 8/2020 | Rivard et al. |

FOREIGN PATENT DOCUMENTS

| | | |
|---|---|---|
| CN | 102053453 A | 5/2011 |
| CN | 103152519 A | 6/2013 |
| CN | 103813098 A | 5/2014 |
| CN | 204316606 U | 5/2015 |
| CN | 105026955 A | 11/2015 |
| DE | 102011107844 A1 | 1/2013 |
| EP | 2169946 A2 | 3/2010 |
| EP | 2346079 A1 | 7/2011 |
| EP | 2565843 A2 | 3/2013 |
| EP | 2731326 A2 | 5/2014 |
| GB | 2486878 A | 7/2012 |
| GB | 287943 A | 8/2012 |
| JP | 2000278532 A | 10/2000 |
| JP | 2002112008 A | 4/2002 |
| JP | 2003101886 A | 4/2003 |
| JP | 2004247983 A | 9/2004 |
| JP | 2004248061 A | 9/2004 |
| JP | 2004326119 A | 11/2004 |
| JP | 2004328532 A | 11/2004 |
| JP | 2006080752 A | 3/2006 |
| JP | 2006121612 A | 5/2006 |
| JP | 2007035028 A | 2/2007 |
| JP | 2008236726 A | 10/2008 |
| JP | 2909267923 A | 11/2009 |
| JP | 2009303010 A | 12/2009 |
| JP | 2010016416 A | 1/2010 |
| JP | 2010136224 A | 6/2010 |
| JP | 2010157925 A | 7/2010 |
| JP | 2010166281 A | 7/2010 |
| JP | 2010239317 A | 10/2010 |
| JP | 4649623 B2 | 3/2011 |
| JP | 2011097141 A | 5/2011 |
| JP | 2011101180 A | 5/2011 |
| JP | 2011120094 A | 6/2011 |
| JP | 2011146957 A | 7/2011 |
| JP | 2012156885 A | 8/2012 |
| JP | 2012195660 A | 10/2012 |
| JP | 2013066142 A | 4/2013 |
| JP | 2013120254 A | 6/2013 |
| JP | 2013207327 A | 10/2013 |
| JP | 2013219708 A | 10/2013 |
| JP | 2013258444 A | 12/2013 |
| JP | 2013258510 A | 12/2013 |
| JP | 2014057256 A | 3/2014 |
| JP | 2014140247 A | 7/2014 |
| JP | 2014142836 A | 8/2014 |
| JP | 2014155033 A | 8/2014 |
| KR | 20100094200 A | 8/2010 |
| WO | 9746001 A1 | 12/1997 |
| WO | 0237830 A2 | 5/2002 |
| WO | 2004064391 A1 | 7/2004 |
| WO | 2008010559 A1 | 1/2008 |
| WO | 209074938 A2 | 6/2009 |

(56) References Cited

FOREIGN PATENT DOCUMENTS

| WO | 2014172059 A2 | 10/2014 |
|---|---|---|
| WO | 2015123455 A1 | 8/2015 |
| WO | 2015173565 A1 | 11/2015 |

OTHER PUBLICATIONS

Corrected Notice of Allowance from U.S. Appl. No. 16/519,244, dated Feb. 20, 2020.
Extended European Search Report from European Application No. 17821236.1, dated Jan. 24, 2020.
Petschnigg et al., "Digital Photography with Flash and No-Flash Image Pairs," ACM Transactions of Graphics, vol. 23, Aug. 2004, pp. 664-672.
Non-Final Office Action for U.S. Appl. No. 16/505,278, dated Jan. 10, 2020.
Notice of Allowance from U.S. Appl. No. 16/519,244, dated Jan. 14, 2020.
Office Action from Japanese Patent Application No. 2017-544282, dated Jan. 7, 2020.
Office Action from Chinese Patent Application No. 201780053926.9, dated Jan. 16, 2020.
International Search Report and Written Opinion from International Application No. PCT/US 18/54014, dated Dec. 26, 2018.
Non-Final Office Action from U.S. Appl. No. 16/215,351, dated Jan. 24, 2019.
Supplemental Notice of Allowance for U.S. Appl. No. 15/254,964, dated Feb. 1, 2019.
Rivard et al., U.S. Appl. No. 16/290,763, filed Mar. 1, 2019.
Supplemental Notice of Allowance for U.S. Appl. No. 15/254,964, dated Mar. 11, 2019.
Rivard et al., U.S. Appl. No. 15/976,756, filed May 10, 2018.
Final Office Action for U.S. Appl. No. 15/636,324, dated Mar. 22, 2019.
Non-Final Office Action from U.S. Appl. No. 16/271,604, dated Apr. 5, 2019.
Notice of Allowance from U.S. Appl. No. 16/215,351, dated Apr. 1, 2019.
Rivard et al., U.S. Appl. No. 16/271,604, filed Feb. 8, 2019.
Non-Final Office Action for U.S. Appl. No. 15/636,324, dated Apr. 18, 2019.
Notice of Allowance from U.S. Appl. No. 15/891,251, dated May 7, 2019.
Notice of Allowance from U.S. Appl. No. 16/154,999, dated Jun. 7, 2019.
Corrected Notice of Allowance from U.S. Appl. No. 15/891,251, dated Jul. 3, 2019.
Notice of Allowance from U.S. Appl. No. 15/636,324, dated Jul. 2, 2019.
Notice of Allowance from U.S. Appl. No. 16/271,604, dated Jul. 2, 2019.
Non-Final Office Action for U.S. Appl. No. 15/976,756, dated Jun. 27, 2019.
Non-Final Office Action for U.S. Appl. No. 16/290,763, dated Jun. 26, 2019.
Rivard et al., U.S. Appl. No. 16/505,278, filed Jul. 8, 2019.
Rivard et al., U.S. Appl. No. 16/519,244, filed Jul. 23, 2019.
Notice of Allowance from U.S. Appl. No. 16/217,848, dated Jul. 31, 2019.
Corrected Notice of Allowance from U.S. Appl. No. 16/271,604, dated Aug. 8, 2019.
Corrected Notice of Allowance from U.S. Appl. No. 15/636,324, dated Aug. 20, 2019.
Office Action from Chinese Patent Application No. 201580079444.1, dated Aug. 1, 2019.
Corrected Notice of Allowance from U.S. Appl. No. 15/636,324, dated Sep. 5, 2019.
Corrected Notice of Allowance from U.S. Appl. No. 16/271,604, dated Sep. 19, 2019.
Non-Final Office Action for U.S. Appl. No. 16/519,244, dated Sep. 23, 2019.
Corrected Notice of Allowance from U.S. Appl. No. 16/217,848, dated Sep. 24, 2019.
Examination Report from European Application No. 15 856 814.7, dated Aug. 20, 2019.
Examination Report from European Application No. 15 857 675.1, dated Aug. 23, 2019.
Examination Report from European Application No. 15 856 710.7, dated Sep. 9, 2019.
Examination Report from European Application No. 15 857 386.5, dated Sep. 17, 2019.
Examination Report from European Application No. 15 857 748.6, dated Sep. 26, 2019.
Office Action from Japanese Patent Application No. 2017-544281, dated Nov. 26, 2019.
Extended European Search Report from European Application No. 16915389.7, dated Dec. 2, 2019.
Office Action from Japanese Patent Application No. 2017-544284, dated Dec. 10, 2019.
Feder et al., U.S. Appl. No. 16/684,389, filed Nov. 14, 2019.
Wan et al., "CMOS Image Sensors With Multi-Bucket Pixels for Computational Photography," IEEE Journal of Solid-State Circuits, vol. 47, No. 4, Apr. 2012, pp. 1031-1042.
Notice of Allowance from U.S. Appl. No. 15/201,283, dated Mar. 23, 2017.
Chatterjee et al., "Clustering-Based Denoising With Locally Learned Dictionaries," IEEE Transactions on Image Processing, vol. 18, No. 7, Jul. 2009, pp. 1-14.
Burger et al., "Image denoising: Can plain Neural Networks compete with BM3D?," Computer Vision and Pattern Recognition (CVPR), IEEE, 2012, pp. 4321-4328.
Kervann et al., "Optimal Spatial Adaptation for Patch-Based Image Denoising," IEEE Transactions on Image Processing, vol. 15, No. 10, Oct. 2006, pp. 2866-2878.
Foi et al., "Practical Poissonian-Gaussian noise modeling and fitting for single-image raw-data," IEEE Transactions, 2007, pp. 1-18.
International Search Report and Written Opinion from PCT Application No. PCT/US17/39946, dated Sep. 25, 2017.
Notice of Allowance from U.S. Appl. No. 15/201,283, dated Jul. 19, 2017.
Notice of Allowance from U.S. Appl. No. 15/354,935, dated Aug. 23, 2017.
Notice of Allowance from U.S. Appl. No. 14/823,993, dated Oct. 31, 2017.
Notice of Allowance from U.S. Appl. No. 15/352,510, dated Oct. 17, 2017.
European Office Communication and Exam Report from European Application No. 15856814.7, dated Dec. 14, 2017.
Supplemental Notice of Allowance from U.S. Appl. No. 15/354,935, dated Dec. 1, 2017.
European Office Communication and Exam Report from European Application No. 15856267.8, dated Dec. 12, 2017.
European Office Communication and Exam Report from European Application No. 15856710.7, dated Dec. 21, 2017.
European Office Communication and Exam Report from European Application No. 15857675.1, dated Dec. 21, 2017.
European Office Communication and Exam Report from European Application No. 15856212.4, dated Dec. 15, 2017.
Non-Final Office Action from U.S. Appl. No. 15/254,964, dated Jan. 3, 2018.
Non-Final Office Action from U.S. Appl. No. 15/643,311, dated Jan. 4, 2018.
European Office Communication and Exam Report from European Application No. 15857386.5, dated Jan. 11, 2018.
Kim et al., "A CMOS Image Sensor Based on Unified Pixel Architecture With Time-Division Multiplexing Scheme for Color and Depth Image Acquisition," IEEE Journal of Solid-State Circuits, vol. 47, No. 11, Nov. 2012, pp. 2834-2845.
European Office Communication and Exam Report from European Application No. 15857748.6, dated Jan. 10, 2018.
Non-Final Office Action from U.S. Appl. No. 151814,238, dated Feb. 8, 2018.

(56) References Cited

OTHER PUBLICATIONS

Non-Final Office Action for U.S. Appl. No. 15/687,278, dated Apr. 13, 2018.
Non-Final Office Action from U.S. Appl. No. 151836,655, dated Apr. 6, 2018.
Notice of Allowance from U.S. Appl. No. 15/836,655, dated Apr. 30, 2018.
Rivard, W. et al., U.S. Appl. No. 15/891,251, filed Feb. 7, 2018.
Rivard et al., U.S. Appl. No. 14/823,993, filed Aug. 11, 2015.
Rivard et al., U.S. Appl. No. 14/536,524, filed Nov. 7, 2014.
Extended European Search Report from European Application No. 15891394.7 dated Jun. 19, 2018.
Non-Final Office Action for U.S. Appl. No. 15/885,296, dated Jun. 4, 2018.
Non-Final Office Action for U.S. Appl. No. 15/891,251, dated May 31, 2018.
Notice of Allowance from U.S. Appl. No. 15/687,278, dated Aug. 24, 2018.
Final Office Action for U.S. Appl. No. 15/643,311 dated Jul. 24, 2018.
Notice of Allowance for U.S. Appl. No. 15/885,296 dated Sep. 21, 2018.
Final Office Action for U.S. Appl. No. 15/254,964 dated Jul. 24, 2018.
Notice of Allowance for U.S. Appl. No. 15/814,238 dated Oct. 4, 2018.
Corrected Notice of Allowance for U.S. Appl. No. 15/885,296 dated Oct. 16, 2018.
Rivard et al., U.S. Appl. No. 16/154,999, filed Oct. 9, 2018.
Non-Final Office Action for U.S. Appl. No. 15/636,324, dated Oct. 18, 2018.
Notice of Allowance for U.S. Appl. No. 15/643,311, dated Oct. 31, 2018.
Corrected Notice of Allowance for U.S. Appl. No. 15/814,238 dated Nov. 13, 2018.
Final Office Action for U.S. Appl. No. 15/891,251, dated Nov. 29, 2018.
Rivard et al., U.S. Appl. No. 16/215,351, filed Dec. 10, 2018.
Rivard et al., U.S. Appl. No. 16/213,041, filed Dec. 7, 2018.
Non-Final Office Action for U.S. Appl. No. 16/154,999, dated Dec. 20, 2018.
Notice of Allowance for U.S. Appl. No. 15/254,964, dated Dec. 21, 2018.
Supplemental Notice of Allowance for U.S. Appl. No. 15/643,311, dated Dec. 11, 2018.
Feder et al., U.S. Appl. No. 16/217,848, filed Dec. 12, 2018.
International Preliminary Examination Report from PCT Application No. PCT/US2017/39946, dated Jan. 10, 2019.
Supplemental Notice of Allowance from U.S. Appl. No. 16/213,041, dated Jun. 17, 2020.
Non-Final Office Action for U.S. Appl. No. 16/857,016, dated Aug. 5, 2020.
Rivard, W. et al., U.S. Appl. No. 17/000,098, filed Aug. 21, 2020.
Office Action from Japanese Patent Application No. 2017-544284, dated Aug. 18, 2020.
Notice of Allowance from U.S. Appl. No. 16/505,278, dated Sep. 25, 2020.
Supplemental Notice of Allowance from U.S. Appl. No. 16/213,041, dated Aug. 31, 2020.
Summons to Attend Oral Proceedings from European Application No. 15 856 710.7, dated Sep. 18, 2020.
Corrected Notice of Allowance from U.S. Appl. No. 16/519,244, dated Apr. 9, 2020.
Rivard et al., U.S. Appl. No. 16/857,016, filed Apr. 23, 2020.
International Preliminary Examination Report from PCT Application No. PCT/US2018/054014, dated Apr. 16, 2020.
Office Action from Chinese Patent Application No. 201680088945.0, dated May 21, 2020.
Notice of Allowance from U.S. Appl. No. 16/213,041, dated May 29, 2020.
Notice of Allowance from U.S. Appl. No. 13/573,252, dated Oct. 22, 2014.
Non-Final Office Action from U.S. Appl. No. 131573,252, dated Jul. 10, 2014.
Rivard, W. et al., U.S. Appl. No. 14/568,045, filed Dec. 11, 2014.
Restriction Requirement from U.S. Appl. No. 14/568,045, dated Jan. 15, 2015.
Rivard, W. et al., U.S. Appl. No. 14/534,068, filed Nov. 5, 2014.
Non-Final Office Action from U.S. Appl. No. 14/534,068, dated Feb. 17, 2015.
Feder et al., U.S. Appl. No. 13/999,678, filed Mar. 14, 2014.
Rivard, W. et al., U.S. Appl. No. 14/534,079, filed Nov. 5, 2014.
Non-Final Office Action from U.S. Appl. No. 14/534,079, dated Jan. 29, 2015.
Rivard, W. et al., U.S. Appl. No. 14/534,089, filed Nov. 5, 2014.
Non-Final Office Action from U.S. Appl. No. 14/534,089, dated Feb. 25, 2015.
Rivard, W. et al., U.S. Appl. No. 14/535,274, filed Nov. 6, 2014.
Non-Final Office Action from U.S. Appl. No. 14/535,274, dated Feb. 3, 2015.
Rivard, W. et al., U.S. Appl. No. 14/535,279, filed Nov. 6, 2014.
Non-Final Office Action from U.S. Appl. No. 14/535,279, dated Feb. 5, 2015.
Rivard, W. et al., U.S. Appl. No. 14/535,282, filed Nov. 6, 2014.
Non-Final Office Action from U.S. Appl. No. 14/535,282, dated Jan. 30, 2015.
Non-Final Office Action from U.S. Appl. No. 14/536,524, dated Mar. 3, 2015.
Rivard, W. et al., U.S. Appl. No. 14/536,524, Nov. 7, 2014.
Non-Final Office Action from U.S. Appl. No. 14/568,045, dated Mar. 24, 2015.
Rivard, W. et al., U.S. Appl. No. 14/702,549, filed May 1, 2015.
Notice of Allowance from U.S. Appl. No. 14/534,079, dated May 11, 2015.
Notice of Allowance from U.S. Appl. No. 14/535,274, dated May 26, 2015.
Notice of Allowance from U.S. Appl. No. 14/534,089, dated Jun. 23, 2015.
Notice of Allowance from U.S. Appl. No. 14/535,282, dated Jun. 23, 2015.
Notice of Allowance from U.S. Appl. No. 14/536,524, dated Jun. 29, 2015.
Notice of Allowance from U.S. Appl. No. 14/534,068, dated Jul. 29, 2015.
Notice of Allowance from U.S. Appl. No. 14/535,279, dated Aug. 31, 2015.
Final Office Action from U.S. Appl. No. 14/568,045, dated Sep. 18, 2015.
Non-Final Office Action from U.S. Appl. No. 13/999,678, dated Aug. 12, 2015.
International Search Report and Written Opinion from International Application No. PCT/US15/59348, dated Feb. 2, 2016.
International Search Report and Written Opinion from International Application No. PCT/US15/59097, dated Jan. 4, 2016.
Non-Final Office Action from U.S. Appl. No. 14/702,549, dated Jan. 25, 2016.
Final Office Action from U.S. Appl. No. 13/999,678, dated Mar. 28, 2016.
International Search Report and Written Opinion from International Application No. PCT/US2015/060476, dated Feb. 10, 2016.
Notice of Allowance from U.S. Appl. No. 14/568,045, dated Apr. 26, 2016.
International Search Report and Written Opinion from International Application No. PCT/US2015/058895, dated Apr. 11, 2016.
Notice of Allowance from U.S. Appl. No. 14/568,045, dated Jan. 12, 2016.
International Search Report and Written Opinion from International Application No. PCT/US2015/059103, dated Dec. 21, 2015.
Final Office Action from U.S. Appl. No. 14/178,305, dated May 18, 2015.
Non-Final Office Action from U.S. Appl. No. 14/178,305, dated Aug. 11, 2014.

(56) References Cited

OTHER PUBLICATIONS

Non-Final Office Action from U.S. Appl. No. 14/823,993, dated Jul. 28, 2016.
International Search Report and Written Opinion from International Application No. PCT/US2015/059105, dated Jul. 26, 2016.
Notice of Allowance from U.S. Appl. No. 14/702,549, dated Aug. 15, 2016.
International Search Report and Written Opinion from International Application No. PCT/US2015/058896, dated Aug. 26, 2016.
International Search Report and Written Opinion from International Application No. PCT/US2015/058891, dated Aug. 26, 2016.
International Search Report and Written Opinion from International Application No. PCT/US2016/050011, dated Nov. 10, 2016.
Final Office Action from U.S. Appl. No. 14/823,993, dated Feb. 10, 2017.
Non-Final Office Action from U.S. Appl. No. 15/354,935, dated Feb. 8, 2017.
Non-Final Office Action from U.S. Appl. No. 13/999,678, dated Dec. 20, 2016.
Notice of Allowance from U.S. Appl. No. 15/976,756, dated Oct. 4, 2019.
Notice of Allowance from U.S. Appl. No. 16/290,763, dated Oct. 10, 2019.
Corrected Notice of Allowance from U.S. Appl. No. 16/217,848, dated Oct. 31, 2019.
Non-Final Office Action for U.S. Appl. No. 16/213,041, dated Oct. 30, 2019.
Office Action from Japanese Patent Application No. 2017-544279, dated Oct. 23, 2019.
Office Action from Japanese Patent Application No. 2017-544280, dated Oct. 29, 2019.
Office Action from Japanese Patent Application No. 2017-544283, dated Oct. 29, 2019.
Office Action from Japanese Patent Application No. 2017-544547, dated Nov. 5, 2019.
Rivard et al., U.S. Appl. No. 16/662,965, filed Oct. 24, 2019.
Office Action from Japanese Patent Application No. 2017-544281, dated Oct. 27, 2020.
Corrected Notice of Allowance from U.S. Appl. No. 16/505,278, dated Oct. 22, 2020.
Notice of Allowance from U.S. Appl. No. 16/684,389, dated Oct. 29, 2020.
Office Action from Chinese Patent Application No. 201780053926.9, dated Oct. 13, 2020.
Corrected Notice of Allowance from U.S. Appl. No. 16/505,278, dated Nov. 18, 2020.
Corrected Notice of Allowance from U.S. Appl. No. 16/684,389, dated Nov. 27, 2020.

IMAGE SENSOR APPARATUS AND METHOD FOR OBTAINING LOW-NOISE, HIGH-SPEED CAPTURES OF A PHOTOGRAPHIC SCENE

RELATED APPLICATIONS

The present application is a continuation in part of and claims priority to U.S. patent application Ser. No. 16/519,244, entitled "IMAGE SENSOR APPARATUS AND METHOD FOR OBTAINING MULTIPLE EXPOSURES WITH ZERO INTERFRAME TIME," filed Jul. 23, 2019, which in turn is a continuation of, and claims priority to U.S. patent application Ser. No. 15/891,251, entitled "IMAGE SENSOR APPARATUS AND METHOD FOR OBTAINING MULTIPLE EXPOSURES WITH ZERO INTERFRAME TIME," filed Feb. 7, 2018, now U.S. Pat. No. 10,382,702, which in turn, is a continuation of, and claims priority to U.S. patent application Ser. No. 14/823,993, entitled "IMAGE SENSOR APPARATUS AND METHOD FOR OBTAINING MULTIPLE EXPOSURES WITH ZERO INTERFRAME TIME," filed Aug. 11, 2015, now U.S. Pat. No. 9,918,017.

Additionally, U.S. patent application Ser. No. 14/823,993 is a continuation-in-part of, and claims priority to U.S. patent application Ser. No. 14/535,279, now U.S. Pat. No. 9,179,085, entitled "IMAGE SENSOR APPARATUS AND METHOD FOR OBTAINING LOW-NOISE, HIGH-SPEED CAPTURES OF A PHOTOGRAPHIC SCENE" filed Nov. 6, 2014, which is herein incorporated by reference in its entirety for all purposes.

This application is related to the following U.S. patent applications, the entire disclosures being incorporated by reference herein: application Ser. No. 13/999,678, filed Mar. 14, 2014, entitled "SYSTEMS AND METHODS FOR DIGITAL IMAGE SENSOR," now U.S. Pat. No. 9,807,322; application Ser. No. 14/534,068, filed Nov. 5, 2014, entitled "SYSTEMS AND METHODS FOR HIGH-DYNAMIC RANGE IMAGES," now U.S. Pat. No. 9,167,174; application Ser. No. 14/534,079, filed Nov. 5, 2014, entitled "IMAGE SENSOR APPARATUS AND METHOD FOR OBTAINING MULTIPLE EXPOSURES WITH ZERO INTERFRAME TIME", now U.S. Pat. No. 9,137,455; application Ser. No. 14/534,089, filed Nov. 5, 2014, entitled "IMAGE SENSOR APPARATUS AND METHOD FOR SIMULTANEOUSLY CAPTURING MULTIPLE IMAGES," now U.S. Pat. No. 9,167,169; application Ser. No. 14/535,274, filed Nov. 6, 2014, entitled "IMAGE SENSOR APPARATUS AND METHOD FOR SIMULTANEOUSLY CAPTURING FLASH AND AMBIENT ILLUMINATED IMAGES," now U.S. Pat. No. 9,154,708; and application Ser. No. 14/536,524, filed Nov. 7, 2014, entitled "SYSTEMS AND METHODS FOR GENERATING A HIGH-DYNAMIC RANGE (HDR) PIXEL STREAM," now U.S. Pat. No. 9,160,936.

FIELD OF THE INVENTION

The present invention relates to photographic systems, and more particularly to an image sensor apparatus and method for obtaining exposures low-noise, high-speed captures.

BACKGROUND

Traditional digital photography systems are inherently limited by the amount of light measured at a capturing image sensor. One solution to such limitation is the application of large amounts of gain to captured photographs. Another solution is increasing a shutter or exposure time during capture. However, both of these solutions suffer from problems that reduce the quality of any resulting photographs, such as increased noise or blur.

SUMMARY

A system, method, and computer program product are provided for obtaining low-noise, high-speed captures of a photographic scene. In use, a first cell of a first pixel is in communication with a first node for storing a first sample. Further, a second cell of a second pixel is in communication with a second node for storing a second sample. Still further, the first cell and the second cell are communicatively coupled. Additional systems, methods, and computer program products are also presented.

DETAILED DESCRIPTION

Figure 1:
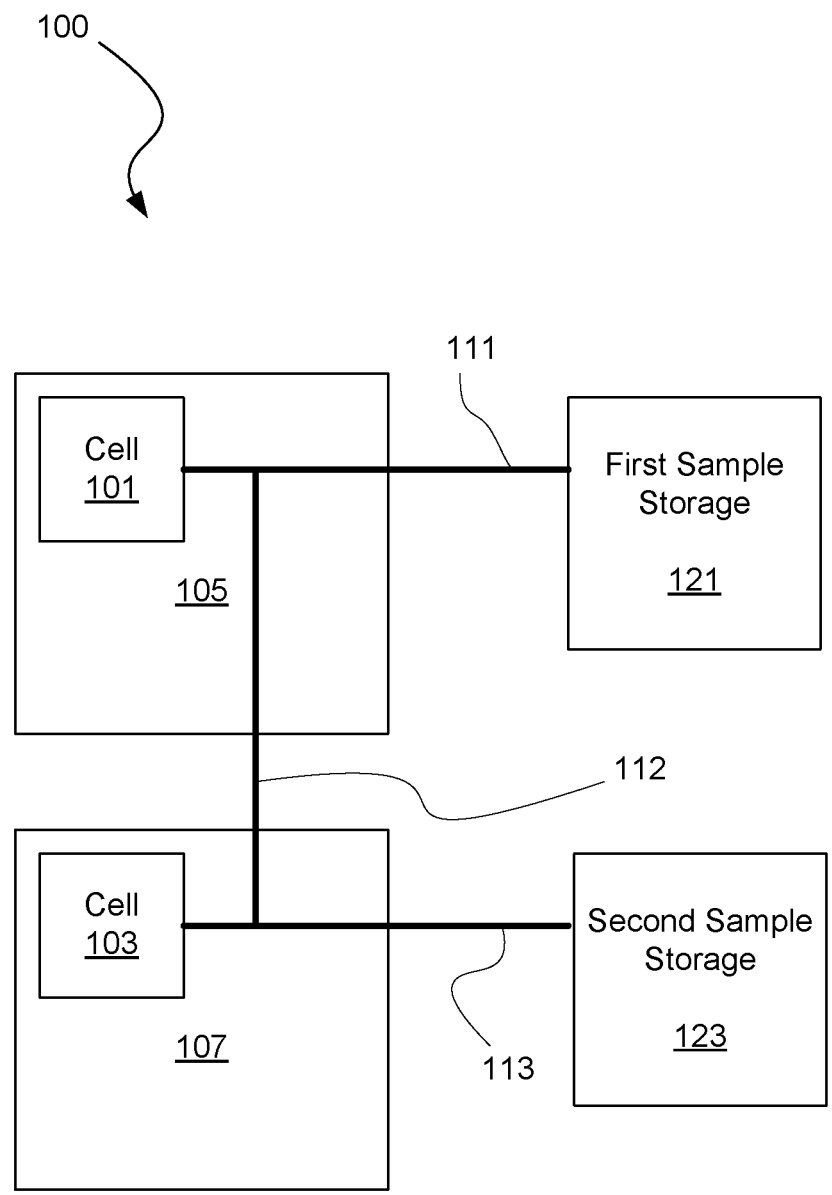
FIG. 1 illustrates an exemplary system for obtaining low-noise, high-speed captures of a photographic scene, in accordance with one embodiment.

FIG. 1 illustrates a system 100 for obtaining low-noise, high-speed captures of a photographic scene, in accordance with one embodiment. As an option, the system 100 may be implemented in the context of any of the Figures disclosed herein. Of course, however, the system 100 may be implemented in any desired environment. Further, the aforementioned definitions may equally apply to the description below.

As shown in FIG. 1, the system 100 includes a first pixel 105, a second pixel 107, a first sample storage node 121, and a second sample storage node 123. Further, the first pixel 105 is shown to include a first cell 101, and the second pixel 107 is shown to include a second cell 103. In one embodiment, each pixel may include one or more cells. For example, in some embodiments, each pixel may include four cells. Further, each of the cells may include a photodiode, photosensor, or any photo-sensing electrical element. A photodiode may comprise any semiconductor diode that generates a potential difference, current, or changes its electrical resistance, in response to photon absorption. Accordingly, a photodiode may be used to detect or measure a light intensity.

Referring again to FIG. 1, the first cell 101 and the first sample storage node 121 are in communication via interconnect 111, the second cell 103 and the second sample storage node 123 are in communication via interconnect 113, and the first cell 101 and the second cell 103 are in communication via interconnect 112.

Each of the interconnects 111-113 may carry an electrical signal from one or more cells to a sample storage node. For example, the interconnect 111 may carry an electrical signal from the cell 101 to the first sample storage node 121. The interconnect 113 may carry an electrical signal from the cell 103 to the second sample storage node 123. Further, the interconnect 112 may carry an electrical signal from the cell 103 to the first sample storage node 121, or may carry an electrical signal from the cell 101 to the second sample storage node 123. In such embodiments, the interconnect 112 may enable a communicative coupling between the first cell 101 and the second cell 103. Further, in some embodiments, the interconnect 112 may be operable to be selectively enabled or disabled. In such embodiments, the interconnect 112 may be selectively enabled or disable using one or more transistors and/or control signals.

In one embodiment, each electrical signal carried by the interconnects 111-113 may include a photodiode current. For example, each of the cells 101 and 103 may include a photodiode. Each of the photodiodes of the cells 101 and 103 may generate a photodiode current which is communicated from the cells 101 and 103 via the interconnects 111-113 to one or more of the sample storage nodes 121 and 123. In configurations where the interconnect 112 is disabled, the interconnect 113 may communicate a photodiode current from the cell 103 to the second sample storage node 123, and, similarly, the interconnect 111 may communicate a photodiode current from the cell 101 to the first sample storage node 121. However, in configurations where the interconnect 112 is enabled, both the cell 101 and the cell 103 may communicate a photodiode current to the first sample storage node 121 and the second sample storage node 123.

Of course, each sample storage node may be operative to receive any electrical signal from one or more communicatively coupled cells, and then store a sample based upon the received electrical signal. In some embodiments, each sample storage node may be configured to store two or more samples. For example, the first sample storage node 121 may store a first sample based on a photodiode current from the cell 101, and may separately store a second sample based on, at least in part, a photodiode current from the cell 103.

In one embodiment, each sample storage node includes a charge storing device for storing a sample, and the sample stored at a given storage node may be a function of a light intensity detected at one or more associated photodiodes. For example, the first sample storage node 121 may store a sample as a function of a received photodiode current, which is generated based on a light intensity detected at a photodiode of the cell 101. Further, the second sample storage node 123 may store a sample as a function of a received photodiode current, which is generated based on a light intensity detected at a photodiode of the cell 103. As yet another example, when the interconnect 112 is enabled, the first sample storage node 121 may receive a photodiode current from each of the cells 101 and 103, and the first sample storage node 121 may thereby store a sample as a function of both the light intensity detected at the photodiode of the cell 101 and the light intensity detected at the photodiode of the cell 103.

In one embodiment, each sample storage node may include a capacitor for storing a charge as a sample. In such an embodiment, each capacitor stores a charge that corresponds to an accumulated exposure during an exposure time or sample time. For example, current received at each capacitor from one or more associated photodiodes may cause the capacitor, which has been previously charged, to discharge at a rate that is proportional to incident light intensity detected at the one or more photodiodes. The remaining charge of each capacitor may be referred to as a value or analog value, and may be subsequently output from the capacitor. For example, the remaining charge of each capacitor may be output as an analog value that is a function of the remaining charge on the capacitor. In one embodiment, via the interconnect 112, the cell 101 may be communicatively coupled to one or more capacitors of the first sample storage node 121, and the cell 103 may also be communicatively coupled to one or more capacitors of the first sample storage node 121.

In some embodiments, each sample storage node may include circuitry operable for receiving input based on one or more photodiodes. For example, such circuitry may include one or more transistors. The one or more transistors may be configured for rendering the sample storage node responsive to various control signals, such as sample, reset, and row select signals received from one or more controlling devices or components. In other embodiments, each sample storage node may include any device for storing any sample or value that is a function of a light intensity detected at one or more associated photodiode. In some embodiments, the interconnect 112 may be selectively enabled or disabled using one or more associated transistors. Accordingly, the cell 101 and the cell 103 may be in communication utilizing a communicative coupling that includes at least one transistor. In embodiments where each of the pixels 105 and 107 include additional cells (not shown), the additional cells may not be communicatively coupled to the cells 101 and 103 via the interconnect 112.

In various embodiments, the pixels 105 and 107 may be two pixels of an array of pixels of an image sensor. Each value stored at a sample storage node may include an electronic representation of a portion of an optical image that has been focused on the image sensor that includes the pixels 105 and 107. In such an embodiment, the optical image may be focused on the image sensor by a lens. The electronic representation of the optical image may comprise spatial color intensity information, which may include different color intensity samples (e.g. red, green, and blue light, etc.). In other embodiments, the spatial color intensity information may also include samples for white light. In one embodiment, the optical image may be an optical image of a photographic scene. Such an image sensor may comprise a complementary metal oxide semiconductor (CMOS) image sensor, or charge-coupled device (CCD) image sensor, or any other technically feasible form of image sensor.

Figure 2:
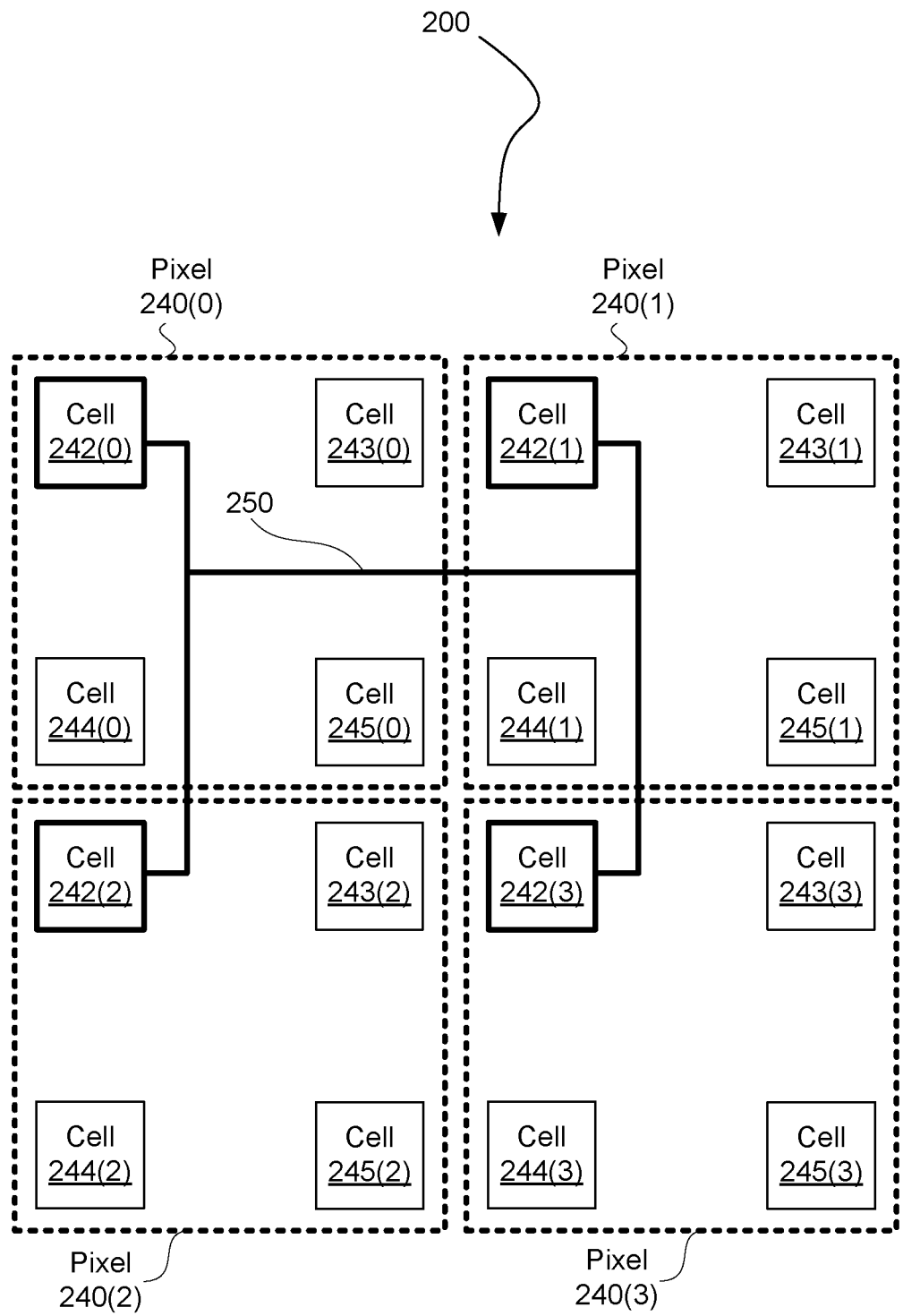
FIG. 2 illustrates an exemplary system for obtaining low-noise, high-speed captures of a photographic scene, in accordance with another embodiment.

FIG. 2 illustrates a system 200 for obtaining low-noise, high-speed captures of a photographic scene, in accordance with another embodiment. As an option, the system 200 may be implemented in the context of any of the Figures disclosed herein. Of course, however, the system 200 may be implemented in any desired environment. Further, the aforementioned definitions may equally apply to the description below.

As shown in FIG. 2, the system 200 includes a plurality of pixels 240. Specifically, the system 200 is shown to include pixels 240(0), 240(1), 240(2), and 240(3). Each of the pixels 240 may be substantially identical with respect to composition and configuration. Further, each of the pixels 240 may be a single pixel of an array of pixels comprising an image sensor. To this end, each of the pixels 240 may comprise hardware that renders the pixel operable to detect or measure various wavelengths of light, and convert the measured light into one or more electrical signals for rendering or generating one or more digital images. Each of the pixels 240 may be substantially identical to the pixel 105 or the pixel 107 of FIG. 1.

Further, each of the pixels 240 is shown to include a cell 242, a cell 243, a cell 244 and a cell 245. In one embodiment, each of the cells 242-245 includes a photodiode operative to detect and measure one or more peak wavelengths of light. For example, each of the cells 242 may be operative to detect and measure red light, each of the cells 243 and 244 may be operative to detect and measure green light, and each of the cells 245 may be operative to detect and measure blue light. In other embodiments, a photodiode may be configured to detect wavelengths of light other than only red, green, or blue. For example, a photodiode may be configured to detect white, cyan, magenta, yellow, or non-visible light such as infrared or ultraviolet light. Any communicatively coupled cells may be configured to detect a same peak wavelength of light.

In various embodiments, each of the cells 242-245 may generate an electrical signal in response to detecting and measuring its associated one or more peak wavelengths of light. In one embodiment, each electrical signal may include a photodiode current. A given cell may generate a photodiode current which is sampled by a sample storage node for a selected sample time or exposure time, and the sample storage node may store an analog value based on the sampling of the photodiode current. Of course, as noted previously, each sample storage node may be capable of concurrently storing more than one analog value.

As shown in FIG. 2, each of the cells 242 are communicatively coupled via an interconnect 250. In one embodiment, the interconnect 250 may be enabled or disabled using one or more control signals. When the interconnect 250 is enabled, the interconnect may carry a combined electrical signal. The combined electrical signal may comprise a combination of electrical signals output from each of the cells 242. For example, the combined electrical signal may comprise a combined photodiode current, where the combined photodiode current includes photodiode current received from photodiodes of each of the cells 242. Thus, enabling the interconnect 250 may serve to increase a combined photodiode current generated based on one or more peak wavelengths of light. In some embodiments, the combined photodiode current may be used to more rapidly store an analog value at a sample storage node than if a photodiode current generated by only a single cell was used to store the analog value. To this end, the interconnect 250 may be enabled to render the pixels 240 of an image sensor more sensitive to incident light. Increasing the sensitivity of an image sensor may allow for more rapid capture of digital images in low light conditions, capture of digital images with reduced noise, and/or capture of brighter or better exposed digital images in a given exposure time.

The embodiments disclosed herein may advantageously enable a camera module to sample images to have less noise, less blur, and greater exposure in low-light conditions than conventional techniques. In certain embodiments, images may be effectively sampled or captured simultaneously, which may reduce inter-sample time to, or near, zero. In other embodiments, the camera module may sample images in coordination with the strobe unit to reduce inter-sample time between an image sampled without strobe illumination and an image sampled with strobe illumination.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 3A:
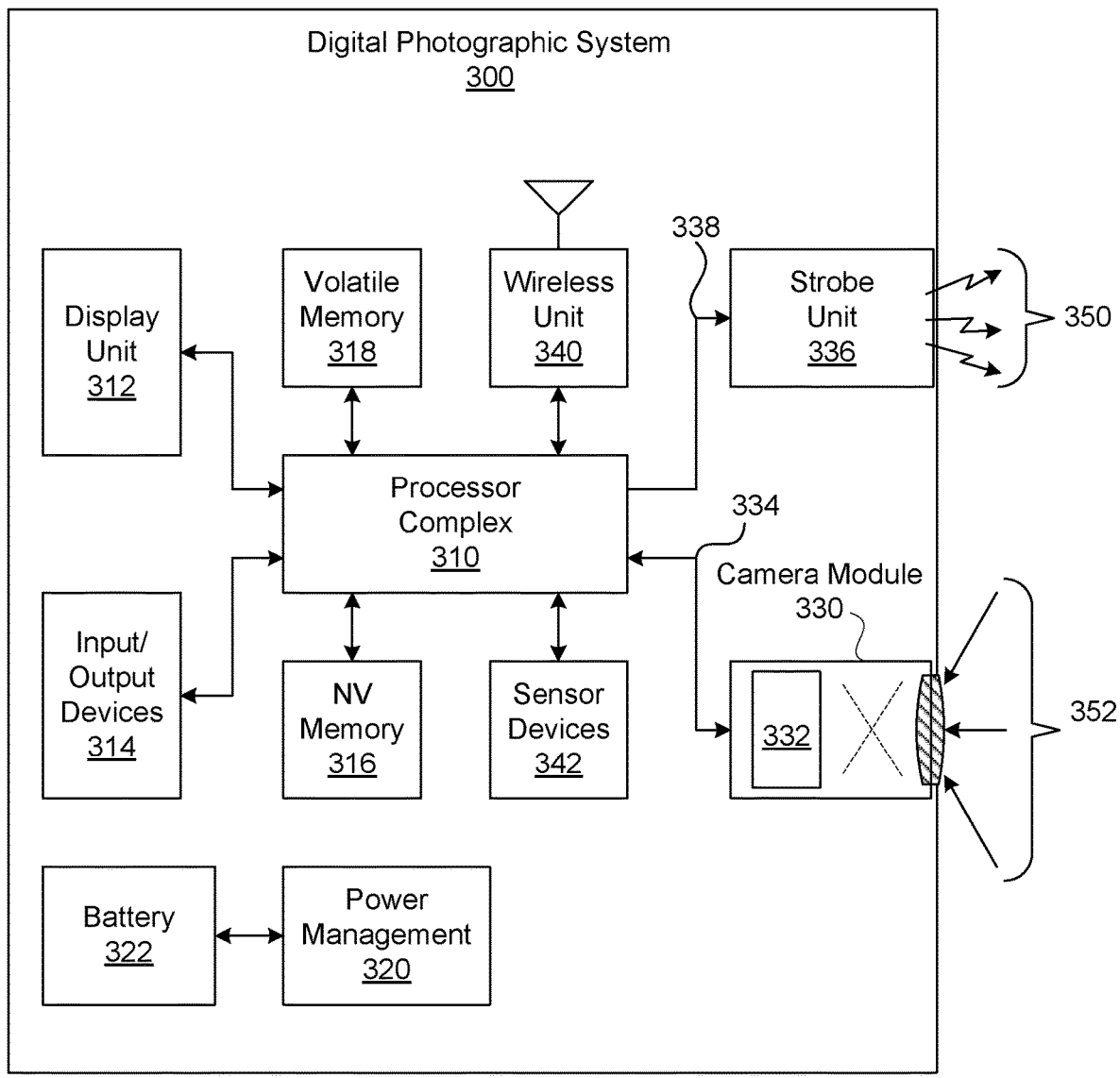
FIG. 3A illustrates a digital photographic system configured to obtain low-noise, high-speed captures of a photographic scene, in accordance with an embodiment.

FIG. 3A illustrates a digital photographic system 300, in accordance with one embodiment. As an option, the digital photographic system 300 may be implemented in the context of the details of any of the Figures disclosed herein. Of course, however, the digital photographic system 300 may be implemented in any desired environment. Further, the aforementioned definitions may equally apply to the description below.

As shown, the digital photographic system 300 may include a processor complex 310 coupled to a camera module 330 via an interconnect 334. In one embodiment, the processor complex 310 is coupled to a strobe unit 336. The digital photographic system 300 may also include, without limitation, a display unit 312, a set of input/output devices 314, non-volatile memory 316, volatile memory 318, a wireless unit 340, and sensor devices 342, each coupled to the processor complex 310. In one embodiment, a power management subsystem 320 is configured to generate appropriate power supply voltages for each electrical load element within the digital photographic system 300. A battery 322 may be configured to supply electrical energy to the power management subsystem 320. The battery 322 may implement any technically feasible energy storage system, including primary or rechargeable battery technologies. Of course, in other embodiments, additional or fewer features, units, devices, sensors, or subsystems may be included in the system.

In one embodiment, a strobe unit 336 may be integrated into the digital photographic system 300 and configured to provide strobe illumination 350 during an image sample event performed by the digital photographic system 300. In another embodiment, a strobe unit 336 may be implemented as an independent device from the digital photographic system 300 and configured to provide strobe illumination 350 during an image sample event performed by the digital photographic system 300. The strobe unit 336 may comprise one or more LED devices, a gas-discharge illuminator (e.g. a Xenon strobe device, a Xenon flash lamp, etc.), or any other technically feasible illumination device. In certain embodiments, two or more strobe units are configured to synchronously generate strobe illumination in conjunction with sampling an image. In one embodiment, the strobe unit 336 is controlled through a strobe control signal 338 to either emit the strobe illumination 350 or not emit the strobe illumination 350. The strobe control signal 338 may be implemented using any technically feasible signal transmission protocol. The strobe control signal 338 may indicate a strobe parameter (e.g. strobe intensity, strobe color, strobe time, etc.), for directing the strobe unit 336 to generate a specified intensity and/or color of the strobe illumination 350. The strobe control signal 338 may be generated by the processor complex 310, the camera module 330, or by any other technically feasible combination thereof. In one embodiment, the strobe control signal 338 is generated by a camera interface unit within the processor complex 310 and transmitted to both the strobe unit 336 and the camera module 330 via the interconnect 334. In another embodiment, the strobe control signal 338 is generated by the camera module 330 and transmitted to the strobe unit 336 via the interconnect 334.

Optical scene information 352, which may include at least a portion of the strobe illumination 350 reflected from objects in the photographic scene, is focused as an optical image onto an image sensor 332 within the camera module 330. The image sensor 332 generates an electronic representation of the optical image. The electronic representation comprises spatial color intensity information, which may include different color intensity samples (e.g. red, green, and blue light, etc.). In other embodiments, the spatial color intensity information may also include samples for white light. The electronic representation is transmitted to the processor complex 310 via the interconnect 334, which may implement any technically feasible signal transmission protocol.

In one embodiment, input/output devices 314 may include, without limitation, a capacitive touch input surface, a resistive tablet input surface, one or more buttons, one or more knobs, light-emitting devices, light detecting devices, sound emitting devices, sound detecting devices, or any other technically feasible device for receiving user input and converting the input to electrical signals, or converting electrical signals into a physical signal. In one embodiment, the input/output devices 314 include a capacitive touch input surface coupled to a display unit 312. A touch entry display system may include the display unit 312 and a capacitive touch input surface, also coupled to processor complex 310.

Additionally, in other embodiments, non-volatile (NV) memory 316 is configured to store data when power is interrupted. In one embodiment, the NV memory 316 comprises one or more flash memory devices (e.g. ROM, PCM, FeRAM, FRAM, PRAM, MRAM, NRAM, etc.). The NV memory 316 comprises a non-transitory computer-readable medium, which may be configured to include programming instructions for execution by one or more processing units within the processor complex 310. The programming instructions may implement, without limitation, an operating system (OS), UI software modules, image processing and storage software modules, one or more input/output devices 314 connected to the processor complex 310, one or more software modules for sampling an image stack through camera module 330, one or more software modules for presenting the image stack or one or more synthetic images generated from the image stack through the display unit 312. As an example, in one embodiment, the programming instructions may also implement one or more software modules for merging images or portions of images within the image stack, aligning at least portions of each image within the image stack, or a combination thereof. In another embodiment, the processor complex 310 may be configured to execute the programming instructions, which may implement one or more software modules operable to create a high dynamic range (HDR) image.

Still yet, in one embodiment, one or more memory devices comprising the NV memory 316 may be packaged as a module configured to be installed or removed by a user. In one embodiment, volatile memory 318 comprises dynamic random access memory (DRAM) configured to temporarily store programming instructions, image data such as data associated with an image stack, and the like, accessed during the course of normal operation of the digital photographic system 300. Of course, the volatile memory may be used in any manner and in association with any other input/output device 314 or sensor device 342 attached to the process complex 310.

In one embodiment, sensor devices 342 may include, without limitation, one or more of an accelerometer to detect motion and/or orientation, an electronic gyroscope to detect motion and/or orientation, a magnetic flux detector to detect orientation, a global positioning system (GPS) module to detect geographic position, or any combination thereof. Of course, other sensors, including but not limited to a motion detection sensor, a proximity sensor, an RGB light sensor, a gesture sensor, a 3-D input image sensor, a pressure sensor, and an indoor position sensor, may be integrated as sensor devices. In one embodiment, the sensor devices may be one example of input/output devices 314.

Wireless unit 340 may include one or more digital radios configured to send and receive digital data. In particular, the wireless unit 340 may implement wireless standards (e.g. WiFi, Bluetooth, NFC, etc.), and may implement digital cellular telephony standards for data communication (e.g. CDMA, 3G, 4G, LTE, LTE-Advanced, etc.). Of course, any wireless standard or digital cellular telephony standards may be used.

In one embodiment, the digital photographic system 300 is configured to transmit one or more digital photographs to a network-based (online) or "cloud-based" photographic media service via the wireless unit 340. The one or more digital photographs may reside within either the NV memory 316 or the volatile memory 318, or any other memory device associated with the processor complex 310. In one embodiment, a user may possess credentials to access an online photographic media service and to transmit one or more digital photographs for storage to, retrieval from, and presentation by the online photographic media service. The credentials may be stored or generated within the digital photographic system 300 prior to transmission of the digital photographs. The online photographic media service may comprise a social networking service, photograph sharing service, or any other network-based service that provides storage of digital photographs, processing of digital photographs, transmission of digital photographs, sharing of digital photographs, or any combination thereof. In certain embodiments, one or more digital photographs are generated by the online photographic media service based on image data (e.g. image stack, HDR image stack, image package, etc.) transmitted to servers associated with the online photographic media service. In such embodiments, a user may upload one or more source images from the digital photographic system 300 for processing by the online photographic media service.

In one embodiment, the digital photographic system 300 comprises at least one instance of a camera module 330. In another embodiment, the digital photographic system 300 comprises a plurality of camera modules 330. Such an embodiment may also include at least one strobe unit 336 configured to illuminate a photographic scene, sampled as multiple views by the plurality of camera modules 330. The plurality of camera modules 330 may be configured to sample a wide angle view (e.g., greater than forty-five degrees of sweep among cameras) to generate a panoramic photograph. In one embodiment, a plurality of camera modules 330 may be configured to sample two or more narrow angle views (e.g., less than forty-five degrees of sweep among cameras) to generate a stereoscopic photograph. In other embodiments, a plurality of camera modules 330 may be configured to generate a 3-D image or to otherwise display a depth perspective (e.g. a z-component, etc.) as shown on the display unit 312 or any other display device.

In one embodiment, a display unit 312 may be configured to display a two-dimensional array of pixels to form an image for display. The display unit 312 may comprise a liquid-crystal (LCD) display, a light-emitting diode (LED) display, an organic LED display, or any other technically feasible type of display. In certain embodiments, the display unit 312 may be able to display a narrower dynamic range of image intensity values than a complete range of intensity values sampled from a photographic scene, such as within a single HDR image or over a set of two or more images comprising a multiple exposure or HDR image stack. In one embodiment, images comprising an image stack may be merged according to any technically feasible HDR blending technique to generate a synthetic image for display within dynamic range constraints of the display unit 312. In one embodiment, the limited dynamic range may specify an eight-bit per color channel binary representation of corresponding color intensities. In other embodiments, the limited dynamic range may specify more than eight-bits (e.g., 10 bits, 12 bits, or 14 bits, etc.) per color channel binary representation.

Figure 3B:
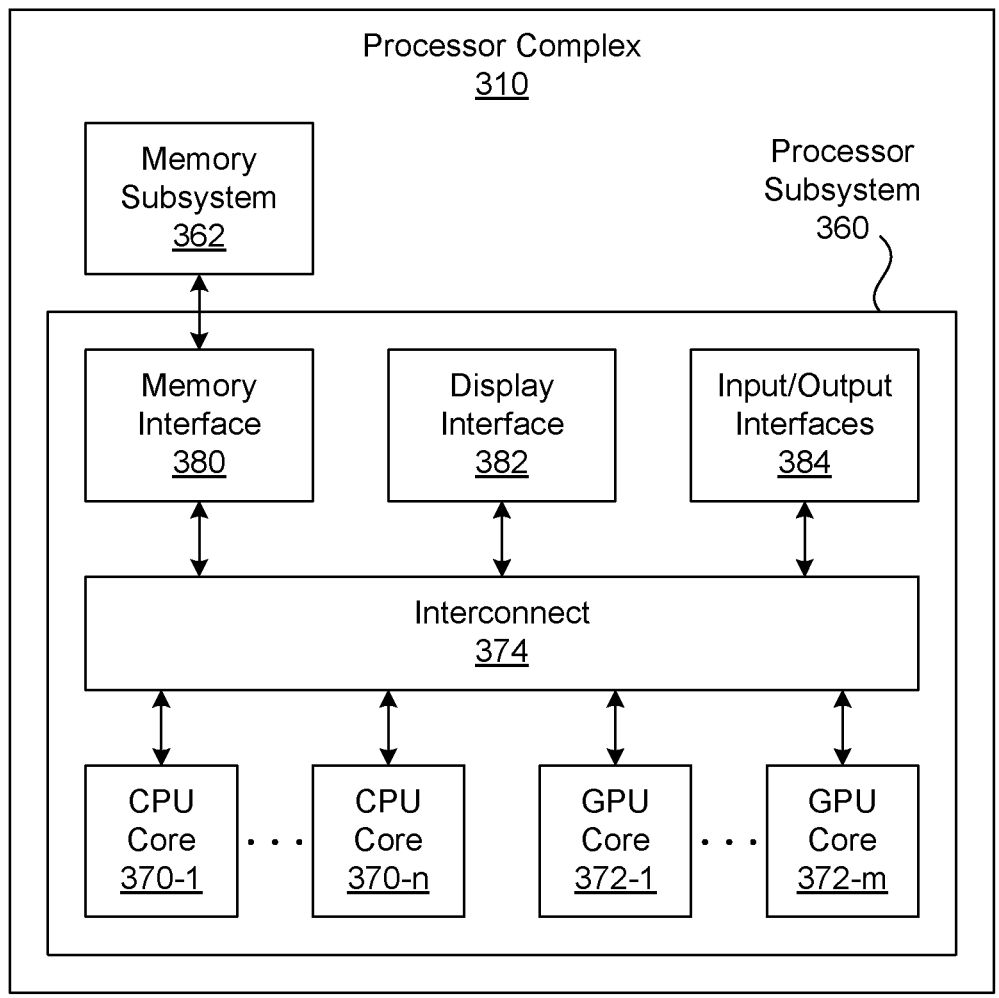
FIG. 3B illustrates a processor complex within a digital photographic system, according to one embodiment.

FIG. 3B illustrates a processor complex 310 within the digital photographic system 300 of FIG. 3A, in accordance with one embodiment. As an option, the processor complex 310 may be implemented in the context of the details of any of the Figures disclosed herein. Of course, however, the processor complex 310 may be implemented in any desired environment. Further, the aforementioned definitions may equally apply to the description below.

As shown, the processor complex 310 includes a processor subsystem 360 and may include a memory subsystem 362. In one embodiment, processor complex 310 may comprise a system on a chip (SoC) device that implements processor subsystem 360, and memory subsystem 362 comprises one or more DRAM devices coupled to the processor subsystem 360. In another embodiment, the processor complex 310 may comprise a multi-chip module (MCM) encapsulating the SoC device and the one or more DRAM devices comprising the memory subsystem 362.

The processor subsystem 360 may include, without limitation, one or more central processing unit (CPU) cores 370, a memory interface 380, input/output interfaces unit 384, and a display interface unit 382, each coupled to an interconnect 374. The one or more CPU cores 370 may be configured to execute instructions residing within the memory subsystem 362, volatile memory 318, NV memory 316, or any combination thereof. Each of the one or more CPU cores 370 may be configured to retrieve and store data through interconnect 374 and the memory interface 380. In one embodiment, each of the one or more CPU cores 370 may include a data cache, and an instruction cache. Additionally, two or more of the CPU cores 370 may share a data cache, an instruction cache, or any combination thereof. In one embodiment, a cache hierarchy is implemented to provide each CPU core 370 with a private cache layer, and a shared cache layer.

In some embodiments, processor subsystem 360 may include one or more graphics processing unit (GPU) cores 372. Each GPU core 372 may comprise a plurality of multi-threaded execution units that may be programmed to implement, without limitation, graphics acceleration functions. In various embodiments, the GPU cores 372 may be configured to execute multiple thread programs according to well-known standards (e.g. OpenGL™ WebGL™, OpenCL™, CUDA™, etc.), and/or any other programmable rendering graphic standard. In certain embodiments, at least one GPU core 372 implements at least a portion of a motion estimation function, such as a well-known Harris detector or a well-known Hessian-Laplace detector. Such a motion estimation function may be used at least in part to align images or portions of images within an image stack. For example, in one embodiment, an HDR image may be compiled based on an image stack, where two or more images are first aligned prior to compiling the HDR image.

As shown, the interconnect 374 is configured to transmit data between and among the memory interface 380, the display interface unit 382, the input/output interfaces unit 384, the CPU cores 370, and the GPU cores 372. In various embodiments, the interconnect 374 may implement one or more buses, one or more rings, a cross-bar, a mesh, or any other technically feasible data transmission structure or technique. The memory interface 380 is configured to couple the memory subsystem 362 to the interconnect 374. The memory interface 380 may also couple NV memory 316, volatile memory 318, or any combination thereof to the interconnect 374. The display interface unit 382 may be configured to couple a display unit 312 to the interconnect 374. The display interface unit 382 may implement certain frame buffer functions (e.g. frame refresh, etc.). Alternatively, in another embodiment, the display unit 312 may implement certain frame buffer functions (e.g. frame refresh, etc.). The input/output interfaces unit 384 may be configured to couple various input/output devices to the interconnect 374.

In certain embodiments, a camera module 330 is configured to store exposure parameters for sampling each image associated with an image stack. For example, in one embodiment, when directed to sample a photographic scene, the camera module 330 may sample a set of images comprising the image stack according to stored exposure parameters. A software module comprising programming instructions executing within a processor complex 310 may generate and store the exposure parameters prior to directing the camera module 330 to sample the image stack. In other embodiments, the camera module 330 may be used to meter an image or an image stack, and the software module comprising programming instructions executing within a processor complex 310 may generate and store metering parameters prior to directing the camera module 330 to capture the image. Of course, the camera module 330 may be used in any manner in combination with the processor complex 310.

In one embodiment, exposure parameters associated with images comprising the image stack may be stored within an exposure parameter data structure that includes exposure parameters for one or more images. In another embodiment, a camera interface unit (not shown in FIG. 3B) within the processor complex 310 may be configured to read exposure parameters from the exposure parameter data structure and to transmit associated exposure parameters to the camera module 330 in preparation of sampling a photographic scene. After the camera module 330 is configured according to the exposure parameters, the camera interface may direct the camera module 330 to sample the photographic scene; the camera module 330 may then generate a corresponding image stack. The exposure parameter data structure may be stored within the camera interface unit, a memory circuit within the processor complex 310, volatile memory 318, NV memory 316, the camera module 330, or within any other technically feasible memory circuit. Further, in another embodiment, a software module executing within processor complex 310 may generate and store the exposure parameter data structure.

Figure 3C:
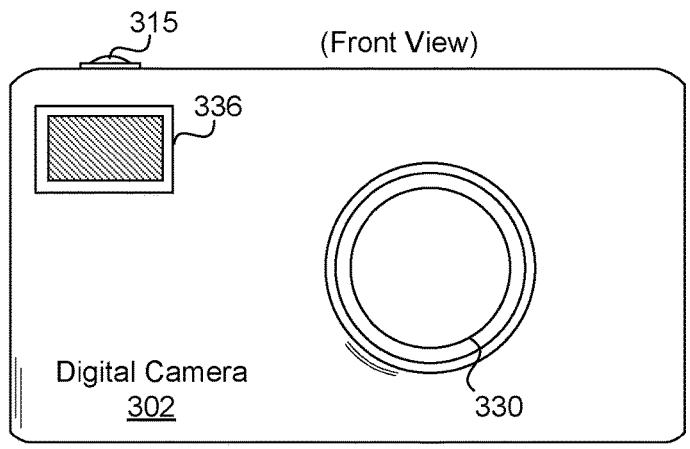
FIG. 3C illustrates a digital camera, in accordance with an embodiment.

FIG. 3C illustrates a digital camera 302, in accordance with one embodiment. As an option, the digital camera 302 may be implemented in the context of the details of any of the Figures disclosed herein. Of course, however, the digital camera 302 may be implemented in any desired environment. Further, the aforementioned definitions may equally apply to the description below.

In one embodiment, the digital camera 302 may be configured to include a digital photographic system, such as digital photographic system 300 of FIG. 3A. As shown, the digital camera 302 includes a camera module 330, which may include optical elements configured to focus optical scene information representing a photographic scene onto an image sensor, which may be configured to convert the optical scene information to an electronic representation of the photographic scene.

Additionally, the digital camera 302 may include a strobe unit 336, and may include a shutter release button 315 for triggering a photographic sample event, whereby digital camera 302 samples one or more images comprising the electronic representation. In other embodiments, any other technically feasible shutter release mechanism may trigger the photographic sample event (e.g. such as a timer trigger or remote control trigger, etc.).

Figure 3D:
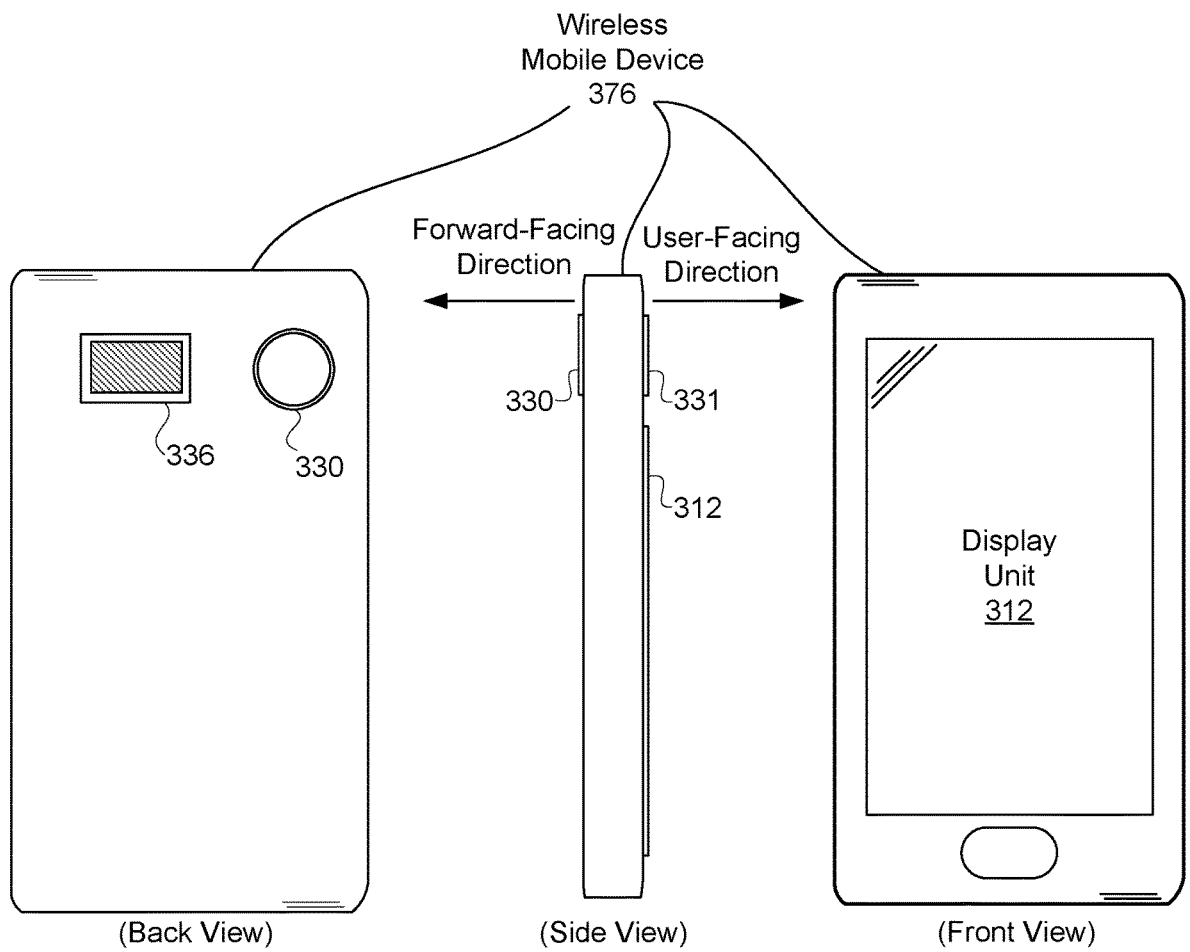
FIG. 3D illustrates a wireless mobile device, in accordance with another embodiment.

FIG. 3D illustrates a wireless mobile device 376, in accordance with one embodiment. As an option, the mobile device 376 may be implemented in the context of the details of any of the Figures disclosed herein. Of course, however, the mobile device 376 may be implemented in any desired environment. Further, the aforementioned definitions may equally apply to the description below.

In one embodiment, the mobile device 376 may be configured to include a digital photographic system (e.g. such as digital photographic system 300 of FIG. 3A), which is configured to sample a photographic scene. In various embodiments, a camera module 330 may include optical elements configured to focus optical scene information representing the photographic scene onto an image sensor, which may be configured to convert the optical scene information to an electronic representation of the photographic scene. Further, a shutter release command may be generated through any technically feasible mechanism, such as a virtual button, which may be activated by a touch gesture on a touch entry display system comprising display unit 312, or a physical button, which may be located on any face or surface of the mobile device 376. Of course, in other embodiments, any number of other buttons, external inputs/outputs, or digital inputs/outputs may be included on the mobile device 376, and which may be used in conjunction with the camera module 330.

As shown, in one embodiment, a touch entry display system comprising display unit 312 is disposed on the opposite side of mobile device 376 from camera module 330. In certain embodiments, the mobile device 376 includes a user-facing camera module 331 and may include a user-facing strobe unit (not shown). Of course, in other embodiments, the mobile device 376 may include any number of user-facing camera modules or rear-facing camera modules, as well as any number of user-facing strobe units or rear-facing strobe units.

In some embodiments, the digital camera 302 and the mobile device 376 may each generate and store a synthetic image based on an image stack sampled by camera module 330. The image stack may include one or more images sampled under ambient lighting conditions, one or more images sampled under strobe illumination from strobe unit 336, or a combination thereof.

Figure 3E:
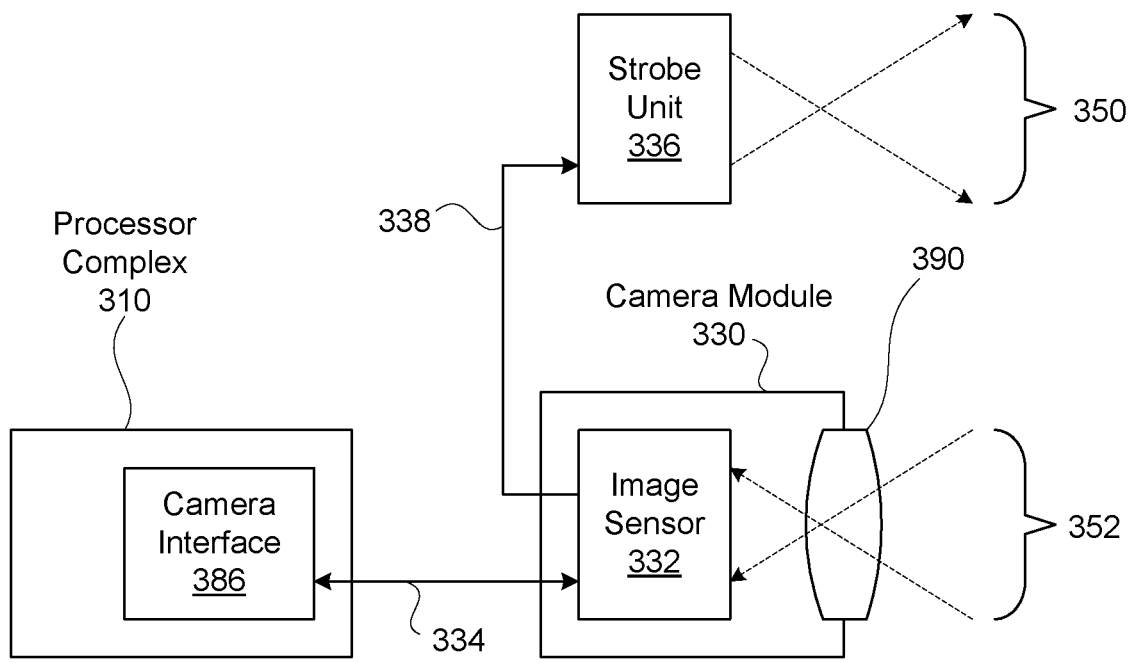
FIG. 3E illustrates a camera module configured to sample an image, according to one embodiment.

FIG. 3E illustrates camera module 330, in accordance with one embodiment. As an option, the camera module 330 may be implemented in the context of the details of any of the Figures disclosed herein. Of course, however, the camera module 330 may be implemented in any desired environment. Further, the aforementioned definitions may equally apply to the description below.

In one embodiment, the camera module 330 may be configured to control strobe unit 336 through strobe control signal 338. As shown, a lens 390 is configured to focus optical scene information 352 onto image sensor 332 to be sampled. In one embodiment, image sensor 332 advantageously controls detailed timing of the strobe unit 336 though the strobe control signal 338 to reduce inter-sample time between an image sampled with the strobe unit 336 enabled, and an image sampled with the strobe unit 336 disabled. For example, the image sensor 332 may enable the strobe unit 336 to emit strobe illumination 350 less than one microsecond (or any desired length) after image sensor 332 completes an exposure time associated with sampling an ambient image and prior to sampling a strobe image.

In other embodiments, the strobe illumination 350 may be configured based on a desired one or more target points. For example, in one embodiment, the strobe illumination 350 may light up an object in the foreground, and depending on the length of exposure time, may also light up an object in the background of the image. In one embodiment, once the strobe unit 336 is enabled, the image sensor 332 may then immediately begin exposing a strobe image. The image sensor 332 may thus be able to directly control sampling operations, including enabling and disabling the strobe unit 336 associated with generating an image stack, which may comprise at least one image sampled with the strobe unit 336 disabled, and at least one image sampled with the strobe unit 336 either enabled or disabled. In one embodiment, data comprising the image stack sampled by the image sensor 332 is transmitted via interconnect 334 to a camera interface unit 386 within processor complex 310. In some embodiments, the camera module 330 may include an image sensor controller, which may be configured to generate the strobe control signal 338 in conjunction with controlling operation of the image sensor 332.

Figure 3F:
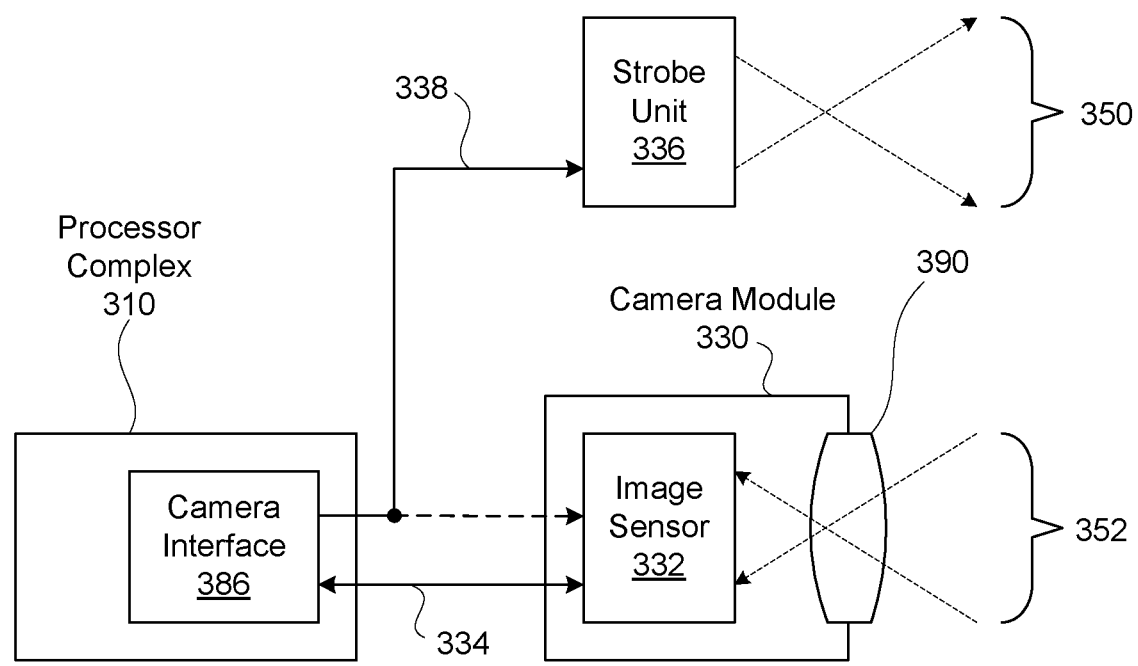
FIG. 3F illustrates a camera module configured to sample an image, according to another embodiment.

FIG. 3F illustrates a camera module 330, in accordance with one embodiment. As an option, the camera module 330 may be implemented in the context of the details of any of the Figures disclosed herein. Of course, however, the camera module 330 may be implemented in any desired environment. Further, the aforementioned definitions may equally apply to the description below.

In one embodiment, the camera module 330 may be configured to sample an image based on state information for strobe unit 336. The state information may include, without limitation, one or more strobe parameters (e.g. strobe intensity, strobe color, strobe time, etc.), for directing the strobe unit 336 to generate a specified intensity and/or color of the strobe illumination 350. In one embodiment, commands for configuring the state information associated with the strobe unit 336 may be transmitted through a strobe control signal 338, which may be monitored by the camera module 330 to detect when the strobe unit 336 is enabled. For example, in one embodiment, the camera module 330 may detect when the strobe unit 336 is enabled or disabled within a microsecond or less of the strobe unit 336 being enabled or disabled by the strobe control signal 338. To sample an image requiring strobe illumination, a camera interface unit 386 may enable the strobe unit 336 by sending an enable command through the strobe control signal 338. In one embodiment, the camera interface unit 386 may be included as an interface of input/output interfaces 384 in a processor subsystem 360 of the processor complex 310 of FIG. 3B. The enable command may comprise a signal level transition, a data packet, a register write, or any other technically feasible transmission of a command. The camera module 330 may sense that the strobe unit 336 is enabled and then cause image sensor 332 to sample one or more images requiring strobe illumination while the strobe unit 336 is enabled. In such an implementation, the image sensor 332 may be configured to wait for an enable signal destined for the strobe unit 336 as a trigger signal to begin sampling a new exposure.

In one embodiment, camera interface unit 386 may transmit exposure parameters and commands to camera module 330 through interconnect 334. In certain embodiments, the camera interface unit 386 may be configured to directly control strobe unit 336 by transmitting control commands to the strobe unit 336 through strobe control signal 338. By directly controlling both the camera module 330 and the strobe unit 336, the camera interface unit 386 may cause the camera module 330 and the strobe unit 336 to perform their respective operations in precise time synchronization. In one embodiment, precise time synchronization may be less than five hundred microseconds of event timing error. Additionally, event timing error may be a difference in time from an intended event occurrence to the time of a corresponding actual event occurrence.

In another embodiment, camera interface unit 386 may be configured to accumulate statistics while receiving image data from camera module 330. In particular, the camera interface unit 386 may accumulate exposure statistics for a given image while receiving image data for the image through interconnect 334. Exposure statistics may include, without limitation, one or more of an intensity histogram, a count of over-exposed pixels, a count of under-exposed pixels, an intensity-weighted sum of pixel intensity, or any combination thereof. The camera interface unit 386 may present the exposure statistics as memory-mapped storage locations within a physical or virtual address space defined by a processor, such as one or more of CPU cores 370, within processor complex 310. In one embodiment, exposure statistics reside in storage circuits that are mapped into a memory-mapped register space, which may be accessed through the interconnect 334. In other embodiments, the exposure statistics are transmitted in conjunction with transmitting pixel data for a captured image. For example, the exposure statistics for a given image may be transmitted as in-line data, following transmission of pixel intensity data for the captured image. Exposure statistics may be calculated, stored, or cached within the camera interface unit 386.

In one embodiment, camera interface unit 386 may accumulate color statistics for estimating scene white-balance. Any technically feasible color statistics may be accumulated for estimating white balance, such as a sum of intensities for different color channels comprising red, green, and blue color channels. The sum of color channel intensities may then be used to perform a white-balance color correction on an associated image, according to a white-balance model such as a gray-world white-balance model. In other embodiments, curve-fitting statistics are accumulated for a linear or a quadratic curve fit used for implementing white-balance correction on an image.

In one embodiment, camera interface unit 386 may accumulate spatial color statistics for performing color-matching between or among images, such as between or among an ambient image and one or more images sampled with strobe illumination. As with the exposure statistics, the color statistics may be presented as memory-mapped storage locations within processor complex 310. In one embodiment, the color statistics are mapped in a memory-mapped register space, which may be accessed through interconnect 334, within processor subsystem 360. In other embodiments, the color statistics may be transmitted in conjunction with transmitting pixel data for a captured image. For example, in one embodiment, the color statistics for a given image may be transmitted as in-line data, following transmission of pixel intensity data for the image. Color statistics may be calculated, stored, or cached within the camera interface 386.

In one embodiment, camera module 330 may transmit strobe control signal 338 to strobe unit 336, enabling the strobe unit 336 to generate illumination while the camera module 330 is sampling an image. In another embodiment, camera module 330 may sample an image illuminated by strobe unit 336 upon receiving an indication signal from camera interface unit 386 that the strobe unit 336 is enabled. In yet another embodiment, camera module 330 may sample an image illuminated by strobe unit 336 upon detecting strobe illumination within a photographic scene via a rapid rise in scene illumination. In one embodiment, a rapid rise in scene illumination may include at least a rate of increasing intensity consistent with that of enabling strobe unit 336. In still yet another embodiment, camera module 330 may enable strobe unit 336 to generate strobe illumination while sampling one image, and disable the strobe unit 336 while sampling a different image.

Figure 3G:
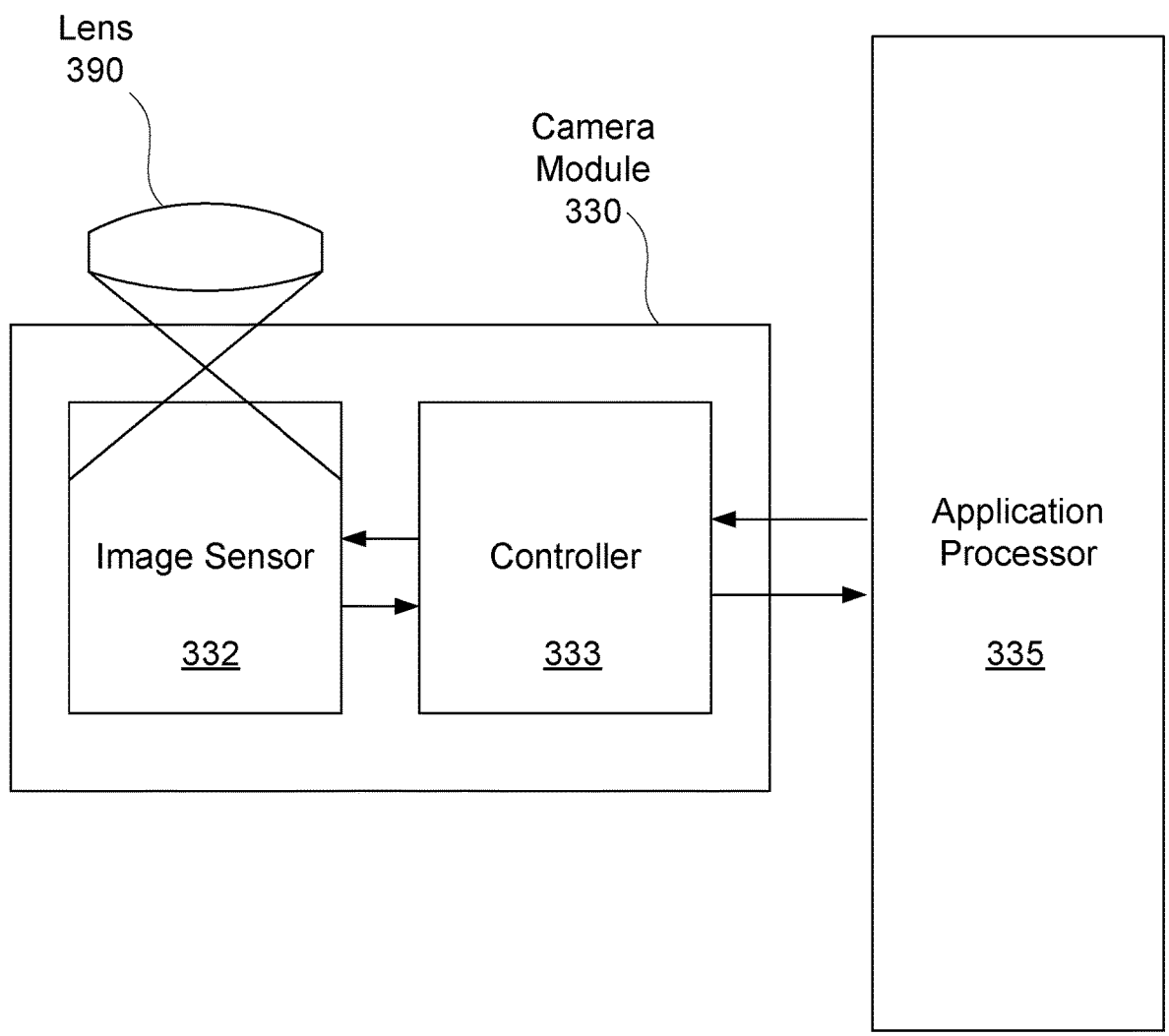
FIG. 3G illustrates a camera module in communication with an application processor, in accordance with an embodiment.

FIG. 3G illustrates camera module 330, in accordance with one embodiment. As an option, the camera module 330 may be implemented in the context of the details of any of the Figures disclosed herein. Of course, however, the camera module 330 may be implemented in any desired environment. Further, the aforementioned definitions may equally apply to the description below.

In one embodiment, the camera module 330 may be in communication with an application processor 335. The camera module 330 is shown to include image sensor 332 in communication with a controller 333. Further, the controller 333 is shown to be in communication with the application processor 335.

In one embodiment, the application processor 335 may reside outside of the camera module 330. As shown, the lens 390 may be configured to focus optical scene information onto image sensor 332 to be sampled. The optical scene information sampled by the image sensor 332 may then be communicated from the image sensor 332 to the controller 333 for at least one of subsequent processing and communication to the application processor 335. In another embodiment, the controller 333 may control storage of the optical scene information sampled by the image sensor 332, or storage of processed optical scene information.

In another embodiment, the controller 333 may enable a strobe unit to emit strobe illumination for a short time duration (e.g. less than one microsecond, etc.) after image sensor 332 completes an exposure time associated with sampling an ambient image. Further, the controller 333 may be configured to generate strobe control signal 338 in conjunction with controlling operation of the image sensor 332.

In one embodiment, the image sensor 332 may be a complementary metal oxide semiconductor (CMOS) sensor or a charge-coupled device (CCD) sensor. In another embodiment, the controller 333 and the image sensor 332 may be packaged together as an integrated system or integrated circuit. In yet another embodiment, the controller 333 and the image sensor 332 may comprise discrete packages. In one embodiment, the controller 333 may provide circuitry for receiving optical scene information from the image sensor 332, processing of the optical scene information, timing of various functionalities, and signaling associated with the application processor 335. Further, in another embodiment, the controller 333 may provide circuitry for control of one or more of exposure, shuttering, white balance, and gain adjustment. Processing of the optical scene information by the circuitry of the controller 333 may include one or more of gain application, amplification, and analog-to-digital conversion. After processing the optical scene information, the controller 333 may transmit corresponding digital pixel data, such as to the application processor 335.

In one embodiment, the application processor 335 may be implemented on processor complex 310 and at least one of volatile memory 318 and NV memory 316, or any other memory device and/or system. The application processor 335 may be previously configured for processing of received optical scene information or digital pixel data communicated from the camera module 330 to the application processor 335.

Figure 4:
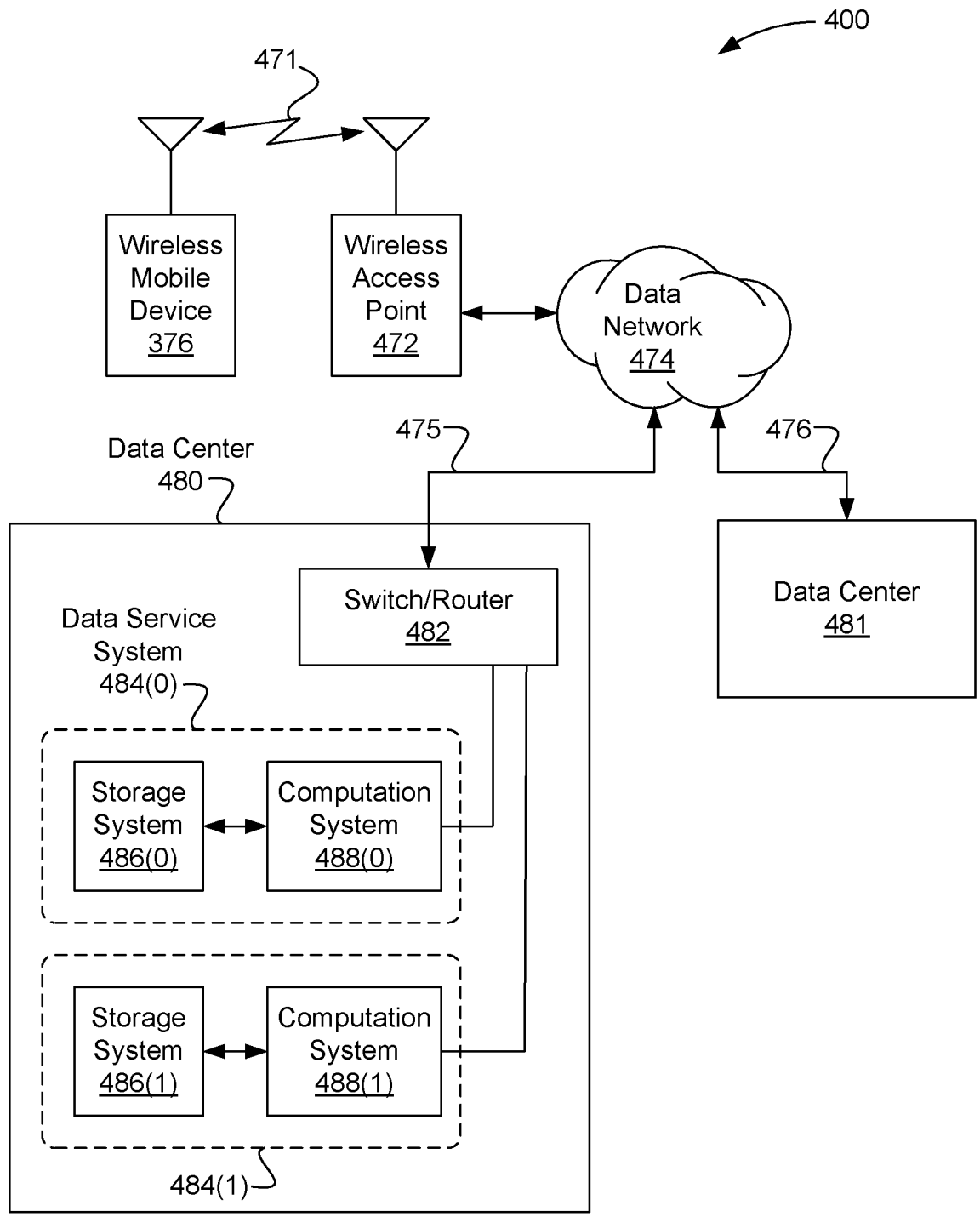
FIG. 4 illustrates a network service system, in accordance with another embodiment.

FIG. 4 illustrates a network service system 400, in accordance with one embodiment. As an option, the network service system 400 may be implemented in the context of the details of any of the Figures disclosed herein. Of course, however, the network service system 400 may be implemented in any desired environment. Further, the aforementioned definitions may equally apply to the description below.

In one embodiment, the network service system 400 may be configured to provide network access to a device implementing a digital photographic system. As shown, network service system 400 includes a wireless mobile device 376, a wireless access point 472, a data network 474, data center 480, and a data center 481. The wireless mobile device 376 may communicate with the wireless access point 472 via a digital radio link 471 to send and receive digital data, including data associated with digital images. The wireless mobile device 376 and the wireless access point 472 may implement any technically feasible transmission techniques for transmitting digital data via digital a radio link 471 without departing the scope and spirit of the present invention. In certain embodiments, one or more of data centers 480, 481 may be implemented using virtual constructs so that each system and subsystem within a given data center 480, 481 may comprise virtual machines configured to perform specified data processing and network tasks. In other implementations, one or more of data centers 480, 481 may be physically distributed over a plurality of physical sites.

The wireless mobile device 376 may comprise a smart phone configured to include a digital camera, a digital camera configured to include wireless network connectivity, a reality augmentation device, a laptop configured to include a digital camera and wireless network connectivity, or any other technically feasible computing device configured to include a digital photographic system and wireless network connectivity.

In various embodiments, the wireless access point 472 may be configured to communicate with wireless mobile device 376 via the digital radio link 471 and to communicate with the data network 474 via any technically feasible transmission media, such as any electrical, optical, or radio transmission media. For example, in one embodiment, wireless access point 472 may communicate with data network 474 through an optical fiber coupled to the wireless access point 472 and to a router system or a switch system within the data network 474. A network link 475, such as a wide area network (WAN) link, may be configured to transmit data between the data network 474 and the data center 480.

In one embodiment, the data network 474 may include routers, switches, long-haul transmission systems, provisioning systems, authorization systems, and any technically feasible combination of communications and operations subsystems configured to convey data between network endpoints, such as between the wireless access point 472 and the data center 480. In one implementation, a wireless the mobile device 376 may comprise one of a plurality of wireless mobile devices configured to communicate with the data center 480 via one or more wireless access points coupled to the data network 474.

Additionally, in various embodiments, the data center 480 may include, without limitation, a switch/router 482 and at least one data service system 484. The switch/router 482 may be configured to forward data traffic between and among a network link 475, and each data service system 484. The switch/router 482 may implement any technically feasible transmission techniques, such as Ethernet media layer transmission, layer 2 switching, layer 3 routing, and the like. The switch/router 482 may comprise one or more individual systems configured to transmit data between the data service systems 484 and the data network 474.

In one embodiment, the switch/router 482 may implement session-level load balancing among a plurality of data service systems 484. Each data service system 484 may include at least one computation system 488 and may also include one or more storage systems 486. Each computation system 488 may comprise one or more processing units, such as a central processing unit, a graphics processing unit, or any combination thereof. A given data service system 484 may be implemented as a physical system comprising one or more physically distinct systems configured to operate together. Alternatively, a given data service system 484 may be implemented as a virtual system comprising one or more virtual systems executing on an arbitrary physical system. In certain scenarios, the data network 474 may be configured to transmit data between the data center 480 and another data center 481, such as through a network link 476.

In another embodiment, the network service system 400 may include any networked mobile devices configured to implement one or more embodiments of the present invention. For example, in some embodiments, a peer-to-peer network, such as an ad-hoc wireless network, may be established between two different wireless mobile devices. In such embodiments, digital image data may be transmitted between the two wireless mobile devices without having to send the digital image data to a data center 480.

Figure 5A:
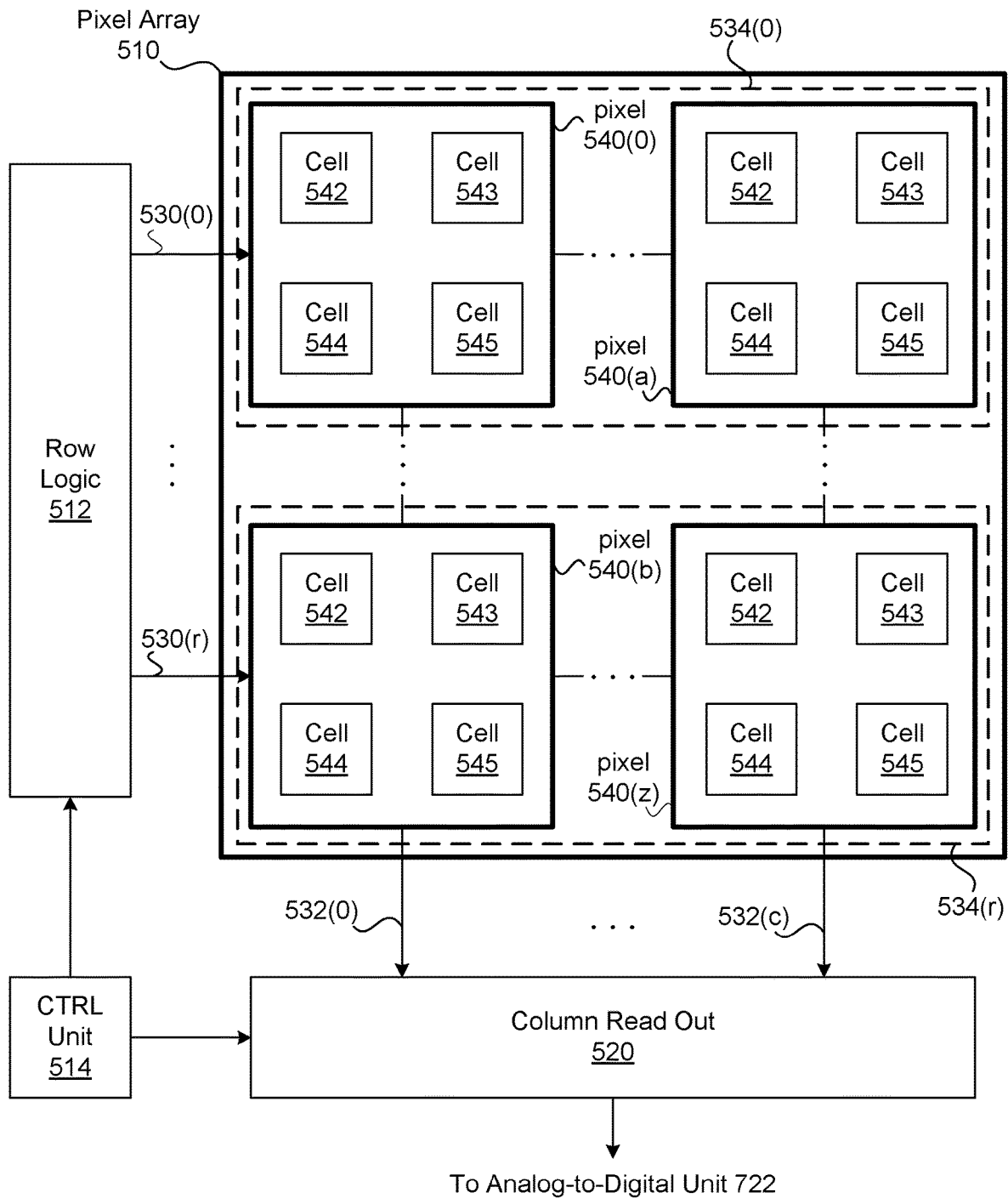
FIGS. 5A-5E illustrate systems for converting optical scene information to an electronic representation of a photographic scene, in accordance with other embodiments.

FIG. 5A illustrates a system for capturing optical scene information for conversion to an electronic representation of a photographic scene, in accordance with one embodiment. As an option, the system of FIG. 5A may be implemented in the context of the details of any of the Figures. Of course, however, the system of FIG. 5A may be implemented in any desired environment. Further, the aforementioned definitions may equally apply to the description below.

As shown in FIG. 5A, a pixel array 510 is in communication with row logic 512 and a column read out circuit 520. Further, the row logic 512 and the column read out circuit 520 are both in communication with a control unit 514. Still further, the pixel array 510 is shown to include a plurality of pixels 540, where each pixel 540 may include four cells, cells 542-545. In the context of the present description, the pixel array 510 may be included in an image sensor, such as image sensor 332 of camera module 330. Also, each of the pixels 540 may be implemented as the pixels 240 of FIG. 2, and, correspondingly, each of the cells 542, 543, 544, and 545 may be implemented as the cells 242, 243, 244, and 245, respectively, of FIG. 2. Although not shown in FIG. 5A, two or more corresponding cells between two or more pixels 540 may be communicatively coupled using an interconnect. For example, two or more cells 542 may be communicatively coupled using an interconnect, or two or more cells 545 may be communicatively coupled using an interconnect.

As shown, the pixel array 510 includes a 2-dimensional array of the pixels 540. For example, in one embodiment, the pixel array 510 may be built to comprise 4,000 pixels 540 in a first dimension, and 3,000 pixels 540 in a second dimension, for a total of 12,000,000 pixels 540 in the pixel array 510, which may be referred to as a 12 megapixel pixel array. Further, as noted above, each pixel 540 is shown to include four cells 542-545. In one embodiment, cell 542 may be associated with (e.g. selectively sensitive to, etc.) a first color of light, cell 543 may be associated with a second color of light, cell 544 may be associated with a third color of light, and cell 545 may be associated with a fourth color of light. In one embodiment, each of the first color of light, second color of light, third color of light, and fourth color of light are different colors of light, such that each of the cells 542-545 may be associated with different colors of light. In another embodiment, at least two cells of the cells 542-545 may be associated with a same color of light. For example, the cell 543 and the cell 544 may be associated with the same color of light.

Further, each of the cells 542-545 may be capable of storing an analog value. In one embodiment, each of the cells 542-545 may be associated with a capacitor for storing a charge that corresponds to an accumulated exposure during an exposure time. In such an embodiment, asserting a row select signal to circuitry of a given cell may cause the cell to perform a read operation, which may include, without limitation, generating and transmitting a current that is a function of the stored charge of the capacitor associated with the cell. In one embodiment, prior to a readout operation, current received at the capacitor from an associated photodiode may cause the capacitor, which has been previously charged, to discharge at a rate that is proportional to an incident light intensity detected at the photodiode. The remaining charge of the capacitor of the cell may then be read using the row select signal, where the current transmitted from the cell is an analog value that reflects the remaining charge on the capacitor. To this end, an analog value received from a cell during a readout operation may reflect an accumulated intensity of light detected at a photodiode. The charge stored on a given capacitor, as well as any corresponding representations of the charge, such as the transmitted current, may be referred to herein as analog pixel data. Of course, analog pixel data may include a set of spatially discrete intensity samples, each represented by continuous analog values.

Still further, the row logic 512 and the column read out circuit 520 may work in concert under the control of the control unit 514 to read a plurality of cells 542-545 of a plurality of pixels 540. For example, the control unit 514 may cause the row logic 512 to assert a row select signal comprising row control signals 530 associated with a given row of pixels 540 to enable analog pixel data associated with the row of pixels to be read. As shown in FIG. 5A, this may include the row logic 512 asserting one or more row select signals comprising row control signals 530(0) associated with a row 534(0) that includes pixel 540(0) and pixel 540(a). In response to the row select signal being asserted, each pixel 540 on row 534(0) transmits at least one analog value based on charges stored within the cells 542-545 of the pixel 540. In certain embodiments, cell 542 and cell 543 are configured to transmit corresponding analog values in response to a first row select signal, while cell 544 and cell 545 are configured to transmit corresponding analog values in response to a second row select signal.

In one embodiment, analog values for a complete row of pixels 540 comprising each row 534(0) through 534(r) may be transmitted in sequence to column read out circuit 520 through column signals 532. In one embodiment, analog values for a complete row or pixels or cells within a complete row of pixels may be transmitted simultaneously. For example, in response to row select signals comprising row control signals 530(0) being asserted, the pixel 540(0) may respond by transmitting at least one analog value from the cells 542-545 of the pixel 540(0) to the column read out circuit 520 through one or more signal paths comprising column signals 532(0); and simultaneously, the pixel 540(a) will also transmit at least one analog value from the cells 542-545 of the pixel 540(a) to the column read out circuit 520 through one or more signal paths comprising column signals 532(c). Of course, one or more analog values may be received at the column read out circuit 520 from one or more other pixels 540 concurrently to receiving the at least one analog value from pixel 540(0) and concurrently receiving the at least one analog value from the pixel 540(a). Together, a set of analog values received from the pixels 540 comprising row 534(0) may be referred to as an analog signal, and this analog signal may be based on an optical image focused on the pixel array 510. An analog signal may be a set of spatially discrete intensity samples, each represented by continuous analog values.

Further, after reading the pixels 540 comprising row 534(0), the row logic 512 may select a second row of pixels 540 to be read. For example, the row logic 512 may assert one or more row select signals comprising row control signals 530(r) associated with a row of pixels 540 that includes pixel 540(b) and pixel 540(z). As a result, the column read out circuit 520 may receive a corresponding set of analog values associated with pixels 540 comprising row 534(r).

Figure 7:
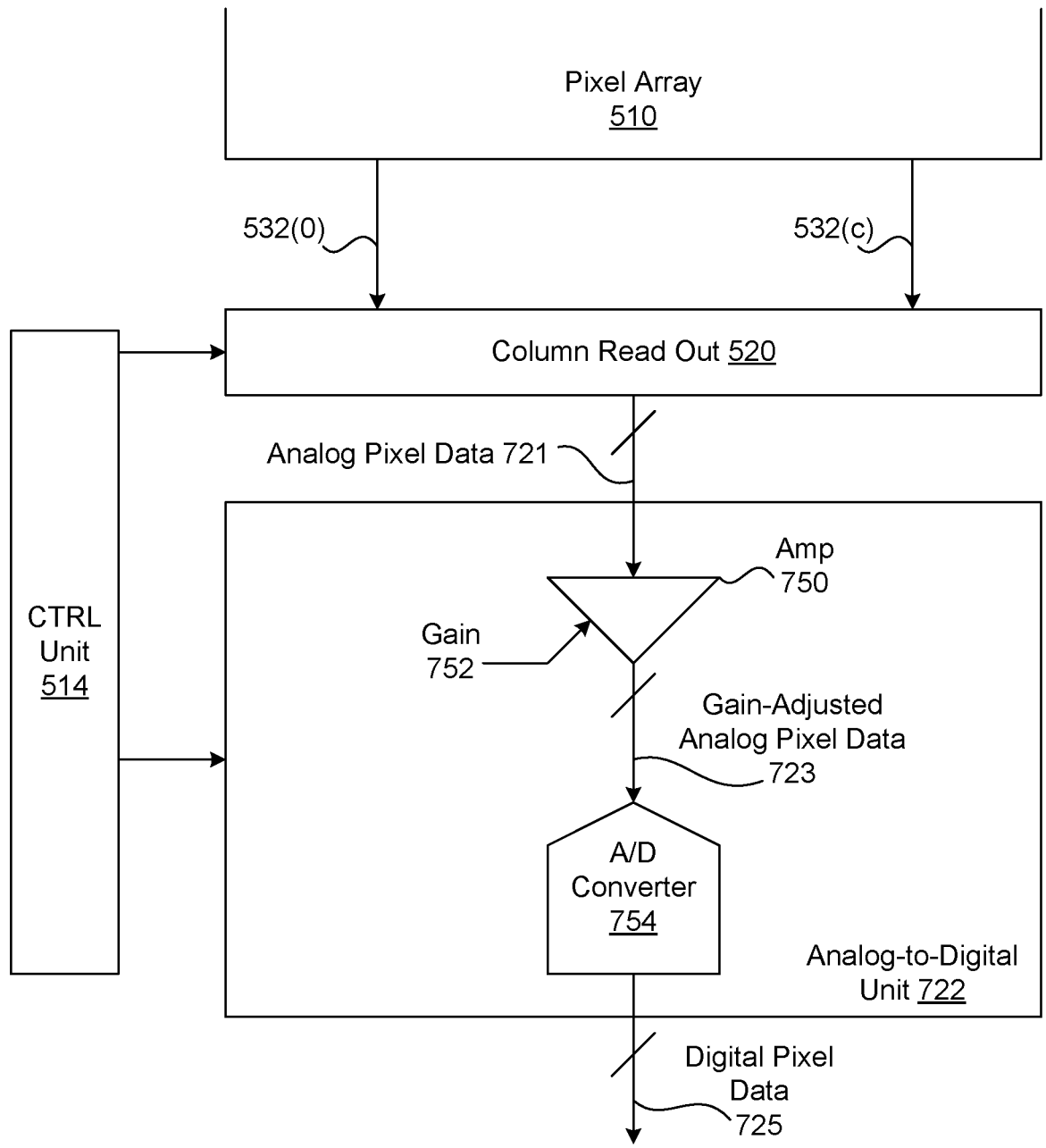
FIG. 7 illustrates a system for converting analog pixel data of an analog signal to digital pixel data, in accordance with another embodiment.

The column read out circuit 520 may serve as a multiplexer to select and forward one or more received analog values to an analog-to-digital converter circuit, such as analog-to-digital unit 722 of FIG. 7. The column read out circuit 520 may forward the received analog values in a predefined order or sequence. In one embodiment, row logic 512 asserts one or more row selection signals comprising row control signals 530, causing a corresponding row of pixels to transmit analog values through column signals 532. The column read out circuit 520 receives the analog values and sequentially selects and forwards one or more of the analog values at a time to the analog-to-digital unit 622. Selection of rows by row logic 512 and selection of columns by column read out circuit 620 may be directed by control unit 514. In one embodiment, rows 534 are sequentially selected to be read, starting with row 534(0) and ending with row 534(r), and analog values associated with sequential columns are transmitted to the analog-to-digital unit 622. In other embodiments, other selection patterns may be implemented to read analog values stored in pixels 540.

Further, the analog values forwarded by the column read out circuit 520 may comprise analog pixel data, which may later be amplified and then converted to digital pixel data for generating one or more digital images based on an optical image focused on the pixel array 510.

Figure 5B:
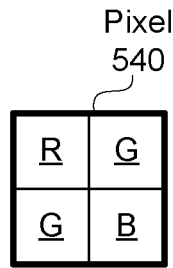
Figure 5C:
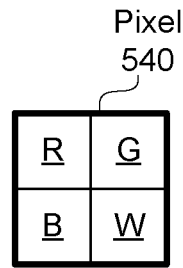
Figure 5D:
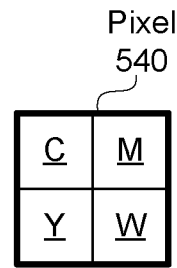

FIGS. 5B-5D illustrate three optional pixel configurations, according to one or more embodiments. As an option, these pixel configurations may be implemented in the context of the details of any of the Figures disclosed herein. Of course, however, these pixel configurations may be implemented in any desired environment. By way of a specific example, any of the pixels 540 of FIGS. 5B-5D may operate as one or more of the pixels 540 of the pixel array 510.

As shown in FIG. 5B, a pixel 540 is illustrated to include a first cell (R) for measuring red light intensity, second and third cells (G) for measuring green light intensity, and a fourth cell (B) for measuring blue light intensity, in accordance with one embodiment. As shown in FIG. 5C, a pixel 540 is illustrated to include a first cell (R) for measuring red light intensity, a second cell (G) for measuring green light intensity, a third cell (B) for measuring blue light intensity, and a fourth cell (W) for measuring white light intensity, in accordance with another embodiment. As shown in FIG. 5D, a pixel 540 is illustrated to include a first cell (C) for measuring cyan light intensity, a second cell (M) for measuring magenta light intensity, a third cell (Y) for measuring yellow light intensity, and a fourth cell (W) for measuring white light intensity, in accordance with yet another embodiment.

Of course, while pixels 540 are each shown to include four cells, a pixel 540 may be configured to include fewer or more cells for measuring light intensity. Still further, in another embodiment, while certain of the cells of pixel 540 are shown to be configured to measure a single peak wavelength of light, or white light, the cells of pixel 540 may be configured to measure any wavelength, range of wavelengths of light, or plurality of wavelengths of light.

Figure 5E:
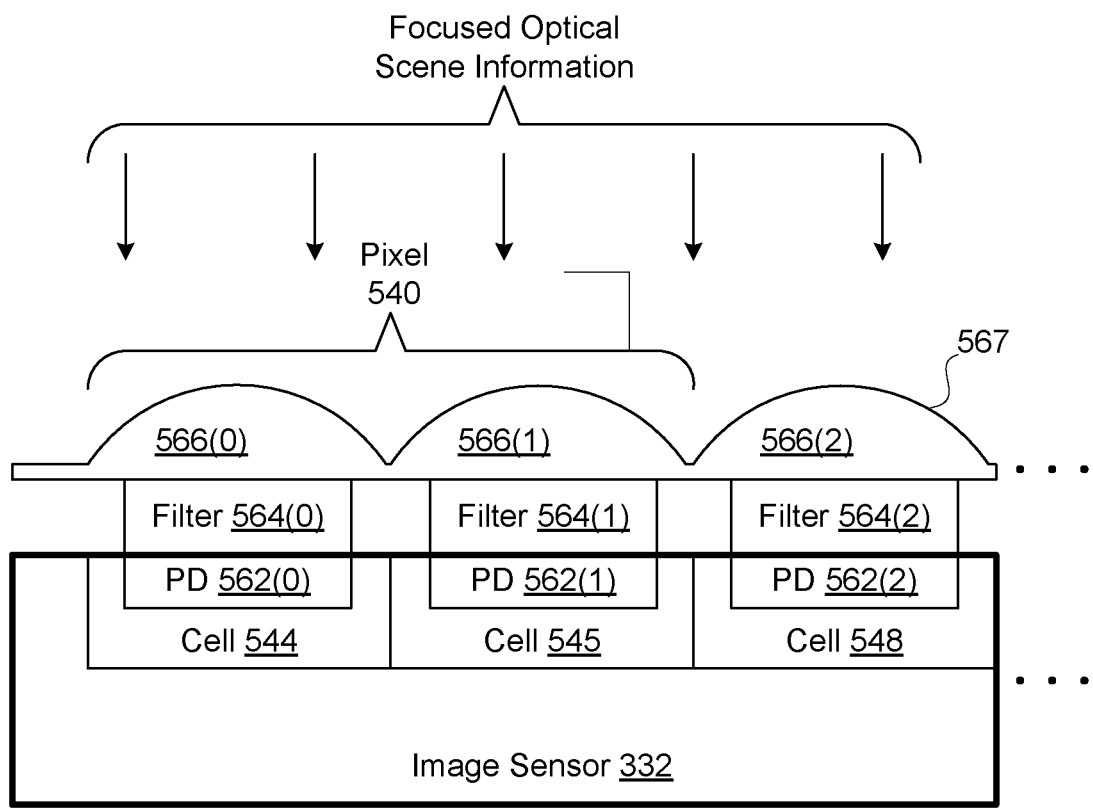

Referring now to FIG. 5E, a system is shown for capturing optical scene information focused as an optical image on an image sensor 332, in accordance with one embodiment. As an option, the system of FIG. 5E may be implemented in the context of the details of any of the Figures. Of course, however, the system of FIG. 5E may be carried out in any desired environment. Further, the aforementioned definitions may equally apply to the description below.

As shown in FIG. 5E, an image sensor 332 is shown to include a first cell 544, a second cell 545, and a third cell 548. Further, each of the cells 544-548 is shown to include a photodiode 562. Still further, upon each of the photodiodes 562 is a corresponding filter 564, and upon each of the filters 564 is a corresponding microlens 566. For example, the cell 544 is shown to include photodiode 562(0), upon which is filter 564(0), and upon which is microlens 566(0). Similarly, the cell 545 is shown to include photodiode 562(1), upon which is filter 564(1), and upon which is microlens 566(1). Still yet, as shown in FIG. 5E, pixel 540 is shown to include each of cells 544 and 545, photodiodes 562(0) and 562(1), filters 564(0) and 564(1), and microlenses 566(0) and 566 (1).

In one embodiment, each of the microlenses 566 may be any lens with a diameter of less than 50 microns. However, in other embodiments each of the microlenses 566 may have a diameter greater than or equal to 50 microns. In one embodiment, each of the microlenses 566 may include a spherical convex surface for focusing and concentrating received light on a supporting substrate beneath the microlens 566. For example, as shown in FIG. 5E, the microlens 566(0) focuses and concentrates received light on the filter 564(0). In one embodiment, a microlens array 567 may include microlenses 566, each corresponding in placement to photodiodes 562 within cells 544 of image sensor 332.

In the context of the present description, the photodiodes 562 may comprise any semiconductor diode that generates a potential difference, or changes its electrical resistance, in response to photon absorption. Accordingly, the photodiodes 562 may be used to detect or measure light intensity. Further, each of the filters 564 may be optical filters for selectively transmitting light of one or more predetermined wavelengths. For example, the filter 564(0) may be configured to selectively transmit substantially only green light received from the corresponding microlens 566(0), and the filter 564(1) may be configured to selectively transmit substantially only blue light received from the microlens 566(1). Together, the filters 564 and microlenses 566 may be operative to focus selected wavelengths of incident light on a plane. In one embodiment, the plane may be a 2-dimensional grid of photodiodes 562 on a surface of the image sensor 332. Further, each photodiode 562 receives one or more predetermined wavelengths of light, depending on its associated filter. In one embodiment, each photodiode 562 receives only one of red, blue, or green wavelengths of filtered light. As shown with respect to FIGS. 5B-5D, it is contemplated that a photodiode may be configured to detect wavelengths of light other than only red, green, or blue. For example, in the context of FIGS. 5C-5D specifically, a photodiode may be configured to detect white, cyan, magenta, yellow, or non-visible light such as infrared or ultraviolet light.

To this end, each coupling of a cell, photodiode, filter, and microlens may be operative to receive light, focus and filter the received light to isolate one or more predetermined wavelengths of light, and then measure, detect, or otherwise quantify an intensity of light received at the one or more predetermined wavelengths. The measured or detected light may then be represented as one or more analog values stored within a cell. For example, in one embodiment, each analog value may be stored within the cell utilizing a capacitor. Further, each analog value stored within a cell may be output from the cell based on a selection signal, such as a row selection signal, which may be received from row logic 512. Further still, each analog value transmitted from a cell may comprise one analog value in a plurality of analog values of an analog signal, where each of the analog values is output by a different cell. Accordingly, the analog signal may comprise a plurality of analog pixel data values from a plurality of cells. In one embodiment, the analog signal may comprise analog pixel data values for an entire image of a photographic scene. In another embodiment, the analog signal may comprise analog pixel data values for a subset of the entire image of the photographic scene. For example, the analog signal may comprise analog pixel data values for a row of pixels of the image of the photographic scene. In the context of FIGS. 5A-5E, the row 534(0) of the pixels 540 of the pixel array 510 may be one such row of pixels of the image of the photographic scene.

Figure 6A:
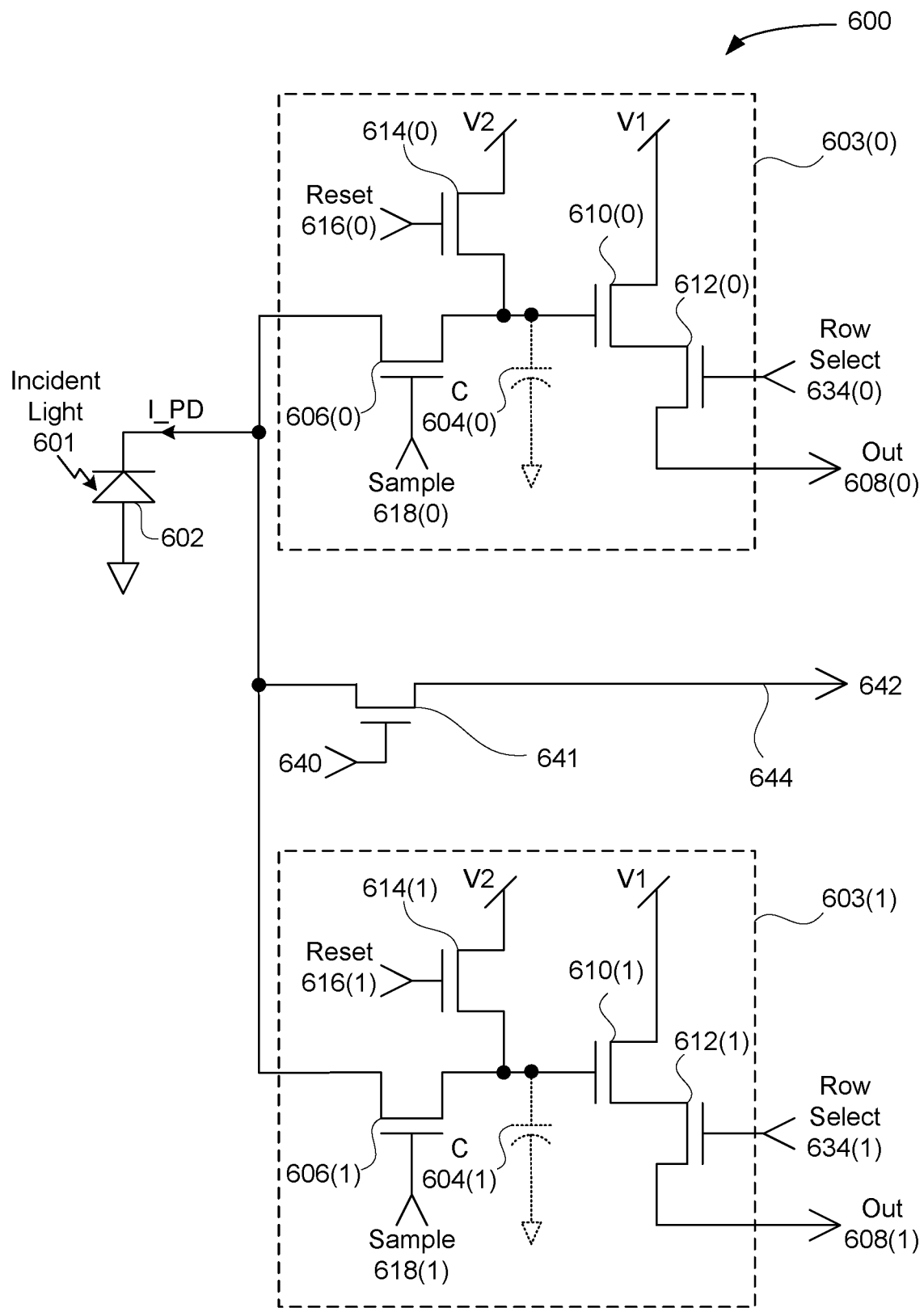
FIG. 6A illustrates a circuit diagram for a photosensitive cell, according to one embodiment.

FIG. 6A illustrates a circuit diagram for a photosensitive cell 600, in accordance with one possible embodiment. As an option, the cell 600 may be implemented in the context of any of the Figures disclosed herein. Of course, however, the cell 600 may be implemented in any desired environment. Further, the aforementioned definitions may equally apply to the description below.

As shown in FIG. 6A, a photosensitive cell 600 includes a photodiode 602 coupled to a first analog sampling circuit 603(0) and a second analog sampling circuit 603(1). The photodiode 602 may be implemented as a photodiode of a cell 101 described within the context of FIG. 1, or any of the photodiodes 562 of FIG. 5E. In one embodiment, a unique instance of photosensitive cell 600 may be implemented as any of cells 242-245 within the context of FIG. 2, or any of cells 542-545 within the context of FIGS. 5A-5E. Further, the first analog sampling circuit 603(0) and the second analog sampling circuit 603(1) may separately, or in combination, comprise a sample storage node, such as one of the sample storage nodes 121 or 123 of FIG. 1.

As shown, the photosensitive cell 600 comprises two analog sampling circuits 603, and a photodiode 602. The two analog sampling circuits 603 include a first analog sampling circuit 603(0) which is coupled to a second analog sampling circuit 603(1). As shown in FIG. 6A, the first analog sampling circuit 603(0) comprises transistors 606(0), 610(0), 612(0), 614(0), and a capacitor 604(0); and the second analog sampling circuit 603(1) comprises transistors 606(1), 610(1), 612(1), 614(1), and a capacitor 604(1). In one embodiment, each of the transistors 606, 610, 612, and 614 may be a field-effect transistor.

The photodiode 602 may be operable to measure or detect incident light 601 of a photographic scene. In one embodiment, the incident light 601 may include ambient light of the photographic scene. In another embodiment, the incident light 601 may include light from a strobe unit utilized to illuminate the photographic scene. Of course, the incident light 601 may include any light received at and measured by the photodiode 602. Further still, and as discussed above, the incident light 601 may be concentrated on the photodiode 602 by a microlens, and the photodiode 602 may be one photodiode of a photodiode array that is configured to include a plurality of photodiodes arranged on a two-dimensional plane.

In one embodiment, the analog sampling circuits 603 may be substantially identical. For example, the first analog sampling circuit 603(0) and the second analog sampling circuit 603(1) may each include corresponding transistors, capacitors, and interconnects configured in a substantially identical manner. Of course, in other embodiments, the first analog sampling circuit 603(0) and the second analog sampling circuit 603(1) may include circuitry, transistors, capacitors, interconnects and/or any other components or component parameters (e.g. capacitance value of each capacitor 604) which may be specific to just one of the analog sampling circuits 603.

In one embodiment, each capacitor 604 may include one node of a capacitor comprising gate capacitance for a transistor 610 and diffusion capacitance for transistors 606 and 614. The capacitor 604 may also be coupled to additional circuit elements (not shown) such as, without limitation, a distinct capacitive structure, such as a metal-oxide stack, a poly capacitor, a trench capacitor, or any other technically feasible capacitor structures.

The cell 600 is further shown to include an interconnect 644 between the analog sampling circuit 603(0) and the analog sampling circuit 603(1). The interconnect 644 includes a transistor 641, which comprises a gate 640 and a source 642. A drain of the transistor 641 is coupled to each of the analog sampling circuit 603(0) and the analog sampling circuit 603(1). When the gate 640 is turned off, the cell 600 may operate in isolation. When operating in isolation, the cell 600 may operate in a manner whereby the photodiode 602 is sampled by one or both of the analog sampling circuits 603 of the cell 600. For example, the photodiode 602 may be sampled by the analog sampling circuit 603(0) and the analog sampling circuit 603(1) in a concurrent manner, or the photodiode 602 may be sampled by the analog sampling circuit 603(0) and the analog sampling circuit 603(1) in a sequential manner. In alternative embodiments, the drain terminal of transistor 641 is coupled to interconnect 644 and the source terminal of transistor 641 is coupled to the sampling circuits 603 and the photodiode 602.

With respect to analog sampling circuit 603(0), when reset 616(0) is active (low), transistor 614(0) provides a path from voltage source V2 to capacitor 604(0), causing capacitor 604(0) to charge to the potential of V2. When sample signal 618(0) is active, transistor 606(0) provides a path for capacitor 604(0) to discharge in proportion to a photodiode current (I_PD) generated by the photodiode 602 in response to the incident light 601. In this way, photodiode current I_PD is integrated for a first exposure time when the sample signal 618(0) is active, resulting in a corresponding first voltage on the capacitor 604(0). This first voltage on the capacitor 604(0) may also be referred to as a first sample. When row select 634(0) is active, transistor 612(0) provides a path for a first output current from V1 to output 608(0). The first output current is generated by transistor 610(0) in response to the first voltage on the capacitor 604(0). When the row select 634(0) is active, the output current at the output 608(0) may therefore be proportional to the integrated intensity of the incident light 601 during the first exposure time.

With respect to analog sampling circuit 603(1), when reset 616(1) is active (low), transistor 614(1) provides a path from voltage source V2 to capacitor 604(1), causing capacitor 604(1) to charge to the potential of V2. When sample signal 618(1) is active, transistor 606(1) provides a path for capacitor 604(1) to discharge in proportion to a photodiode current (I_PD) generated by the photodiode 602 in response to the incident light 601. In this way, photodiode current I_PD is integrated for a second exposure time when the sample signal 618(1) is active, resulting in a corresponding second voltage on the capacitor 604(1). This second voltage on the capacitor 604(1) may also be referred to as a second sample. When row select 634(1) is active, transistor 612(1) provides a path for a second output current from V1 to output 608(1). The second output current is generated by transistor 610(1) in response to the second voltage on the capacitor 604(1). When the row select 634(1) is active, the output current at the output 608(1) may therefore be proportional to the integrated intensity of the incident light 601 during the second exposure time.

As noted above, when the cell 600 is operating in an isolation mode, the photodiode current I_PD of the photodiode 602 may be sampled by one of the analog sampling circuits 603 of the cell 600; or may be sampled by both of the analog sampling circuits 603 of the cell 600, either concurrently or sequentially. When both the sample signal 618(0) and the sample signal 618(1) are activated simultaneously, the photodiode current I_PD of the photodiode 602 may be sampled by both analog sampling circuits 603 concurrently, such that the first exposure time and the second exposure time are, at least partially, overlapping. Concurrent sampling of the photodiode 602 using two or more analog sampling circuits is explained in greater depth within U.S. patent application Ser. No. 14/534,089, filed Nov. 5, 2014, entitled "IMAGE SENSOR APPARATUS AND METHOD FOR SIMULTANEOUSLY CAPTURING MULTIPLE IMAGES," now U.S. Pat. No. 9,167,169, the contents of which are incorporated herein as though set forth in full.

When the sample signal 618(0) and the sample signal 618(1) are activated sequentially, the photodiode current I_PD of the photodiode 602 may be sampled by the analog sampling circuits 603 sequentially, such that the first exposure time and the second exposure time do not overlap. Sequential sampling of the photodiode current I_PD of the photodiode 602 using two or more analog sampling circuits is explained in greater depth within U.S. patent application Ser. No. 14/535,274, filed Nov. 6, 2014, entitled "IMAGE SENSOR APPARATUS AND METHOD FOR SIMULTANEOUSLY CAPTURING FLASH AND AMBIENT ILLUMINATED IMAGES," now U.S. Pat. No. 9,154,708, the contents of which are incorporated herein as though set forth in full. Further disclosure regarding sequential sampling of the photodiode 602 using two or more analog sampling circuits may also be found in U.S. patent application Ser. No. 13/999,678, entitled "Systems and methods for a digital image sensor," now U.S. Pat. No. 9,807,322 which is also incorporated herein as though set forth in full.

In various embodiments, when the gate 640 is turned on, the cell 600 may be thereby communicatively coupled to one or more other instances of cell 600 of other pixels via the interconnect 644. In one embodiment, when two or more cells 600 are coupled together, the two or more corresponding instances of photodiode 602 may collectively provide a shared photodiode current on the interconnect 644. In such an embodiment, one or more analog sampling circuits 603 of the two instances of cell 600 may sample the shared photodiode current. For example, in one embodiment, a single sample signal 618(0) may be activated such that a single analog sampling circuit 603 samples the shared photodiode current. In another embodiment two instances of a sample signal 618(0), each associated with a different cell 600, may be activated to sample the shared photodiode current, such that two analog sampling circuits 603 of two different cells 600 sample the shared photodiode current. In yet another embodiment, both of a sample signal 618(0) and 618(1) of a single cell 600 may be activated to sample the shared photodiode current, such that two analog sampling circuits 603(0) and 603(1) of one of the cells 600 sample the shared photodiode current, and neither of the analog sampling circuits 603 of the other cell 600 sample the shared photodiode current.

In a specific example, two instances of cell 600 may be coupled via the interconnect 644. Each instance of the cell 600 may include a photodiode 602 and two analog sampling circuits 603. In such an example, the two photodiodes 602 may be configured to provide a shared photodiode current to one, two, three, or all four of the analog sampling circuits 603 via the interconnect 644. If the two photodiodes 602 detect substantially identical quantities of light, then the shared photodiode current may be twice the magnitude that any single photodiode current would be from a single one of the photodiodes 602. Thus, this shared photodiode current may otherwise be referred to as a 2× photodiode current. If only one analog sampling circuit 603 is activated to sample the 2× photodiode current, the analog sampling circuit 603 may effectively sample the 2× photodiode current twice as fast for a given exposure level as the analog sampling circuit 603 would sample a photodiode current received from a single photodiode 602. Further, if only one analog sampling circuit 603 is activated to sample the 2× photodiode current, the analog sampling circuit 603 may be able to obtain a sample twice as bright as the analog sampling circuit 603 would obtain by sampling a photodiode current received from a single photodiode 602 for a same exposure time. However, in such an embodiment, because only a single analog sampling circuit 603 of the two cells 600 actively samples the 2× photodiode current, one of the cells 600 does not store any analog value representative of the 2× photodiode current. Accordingly, when a 2× photodiode current is sampled by only a subset of corresponding analog sampling circuits 603, image resolution may be reduced in order to increase a sampling speed or sampling sensitivity.

In one embodiment, communicatively coupled cells 600 may be located in a same row of pixels of an image sensor. In such an embodiment, sampling with only a subset of communicatively coupled analog sampling circuits 603 may reduce an effective horizontal resolution of the image sensor by ½. In another embodiment, communicatively coupled cells 600 may be located in a same column of pixels of an image sensor. In such an embodiment, sampling with only a subset of communicatively coupled analog sampling circuits 603 may reduce an effective vertical resolution of the image sensor by ½.

In another embodiment, an analog sampling circuit 603 of each of the two cells 600 may be simultaneously activated to concurrently sample the 2× photodiode current. In such an embodiment, because the 2× photodiode current is shared by two analog sampling circuits 603, sampling speed and sampling sensitivity may not be improved in comparison to a single analog sampling circuit 603 sampling a photodiode current of a single photodiode 602. However, by sharing the 2× photodiode current over the interconnect 644 between the two cells 600, and then sampling the 2× photodiode current using an analog sampling circuit 603 in each of the cells 600, the analog values sampled by each of the analog sampling circuits 603 may be effectively averaged, thereby reducing the effects of any noise present in a photodiode current output by either of the coupled photodiodes 602.

In yet another example, two instances of cell 600 may be coupled via the interconnect 644. Each instance of the cell 600 may include a photodiode 602 and two analog sampling circuits 603. In such an example, the two photodiodes 602 may be configured to provide a shared photodiode current to one, two, three, or all four of the analog sampling circuits 603 via the interconnect 644. If the two photodiodes 602 detect substantially identical quantities of light, then the shared photodiode current may be twice the magnitude that any single photodiode current would be from a single one of the photodiodes 602. Thus, this shared photodiode current may otherwise be referred to as a 2× photodiode current. Two analog sampling circuits 603 of one of the cells 600 may be simultaneously activated to concurrently sample the 2× photodiode current in a manner similar to that described hereinabove with respect to the analog sampling circuits 603(0) and 603(1) sampling the photodiode current I_PD of the photodiode 602 in isolation. In such an embodiment, two analog storage planes may be populated with analog values at a rate that is 2× faster than if the analog sampling circuits 603(0) and 603(1) received a photodiode current from a single photodiode 602.

In another embodiment including two instances of cell 600 coupled via interconnect 644 for sharing a 2× photodiode current, such that four analog sampling circuits 603 may be simultaneously activated for a single exposure. In such an embodiment, the four analog sampling circuits 603 may concurrently sample the 2× photodiode current in a manner similar to that described hereinabove with respect to the analog sampling circuits 603(0) and 603(1) sampling the photodiode current I_PD of the photodiode 602 in isolation. In such an embodiment, the four analog sampling circuits 603 may be disabled sequentially, such that each of the four analog sampling circuits 603 stores a unique analog value representative of the 2× photodiode current. Thereafter, each analog value may be output in a different analog signal, and each analog signal may be amplified and converted to a digital signal comprising a digital image.

Thus, in addition to the 2× photodiode current serving to reduce noise in any final digital image, four different digital images may be generated for the single exposure, each with a different effective exposure and light sensitivity. These four digital images may comprise, and be processed as, an image stack, as described in U.S. patent application No application Ser. No. 14/535,274, filed Nov. 6, 2014, entitled "IMAGE SENSOR APPARATUS AND METHOD FOR SIMULTANEOUSLY CAPTURING FLASH AND AMBIENT ILLUMINATED IMAGES," the contents of which are incorporated herein as though set forth in full. In other embodiments, the four analog sampling circuits 603 may be activated and deactivated together for sampling the 2× photodiode current, such that each of the analog sampling circuits 603 store a substantially identical analog value. In yet other embodiments, the four analog sampling circuits 603 may be activated and deactivated in a sequence for sampling the 2× photodiode current, such that no two analog sampling circuits 603 are actively sampling at any given moment.

Of course, while the above examples and embodiments have been described for simplicity in the context of two instances of a cell 600 being communicatively coupled via interconnect 644, more than two instances of a cell 600 may be communicatively coupled via the interconnect 644. For example, four instances of a cell 600 may be communicatively coupled via an interconnect 644. In such an example, eight different analog sampling circuits 603 may be addressable, in any sequence or combination, for sampling a 4× photodiode current shared between the four instances of cell 600. Thus, as an option, a single analog sampling circuit 603 may be able to sample the 4× photodiode current at a rate 4× faster than the analog sampling circuit 603 would be able to sample a photodiode current received from a single photodiode 602.

For example, an analog value stored by sampling a 4× photodiode current at a $\frac{1}{120}$ second exposure time may be substantially identical to an analog value stored by sampling a 1× photodiode current at a $\frac{1}{30}$ second exposure time. By reducing an exposure time required to sample a given analog value under a given illumination, blur may be reduced within a final digital image. Thus, sampling a shared photodiode current may effectively increase the ISO, or light sensitivity, at which a given photographic scene is sampled without increasing the noise associated with applying a greater gain.

As another option, the single analog sampling circuit 603 may be able to obtain, for a given exposure time, a sample 4× brighter than a sample obtained by sampling a photodiode current received from a single photodiode. Sampling a 4× photodiode current may allow for much more rapid sampling of a photographic scene, which may serve to reduce any blur present in a final digital image, to more quickly capture a photographic scene (e.g., $\frac{1}{4}$ exposure time), to increase the brightness or exposure of a final digital image, or any combination of the foregoing. Of course, sampling a 4× photodiode current with a single analog sampling circuit 603 may result in an analog storage plane having $\frac{1}{4}$ the resolution of an analog storage plane in which each cell 600 generates a sample. In another embodiment, where four instances of a cell 600 may be communicatively coupled via an interconnect 644, up to eight separate exposures may be captured by sequentially sampling the 4× photodiode current with each of the eight analog sampling circuits 603. In one embodiment, each cell includes one or more analog sampling circuits 603.

Figure 6B:
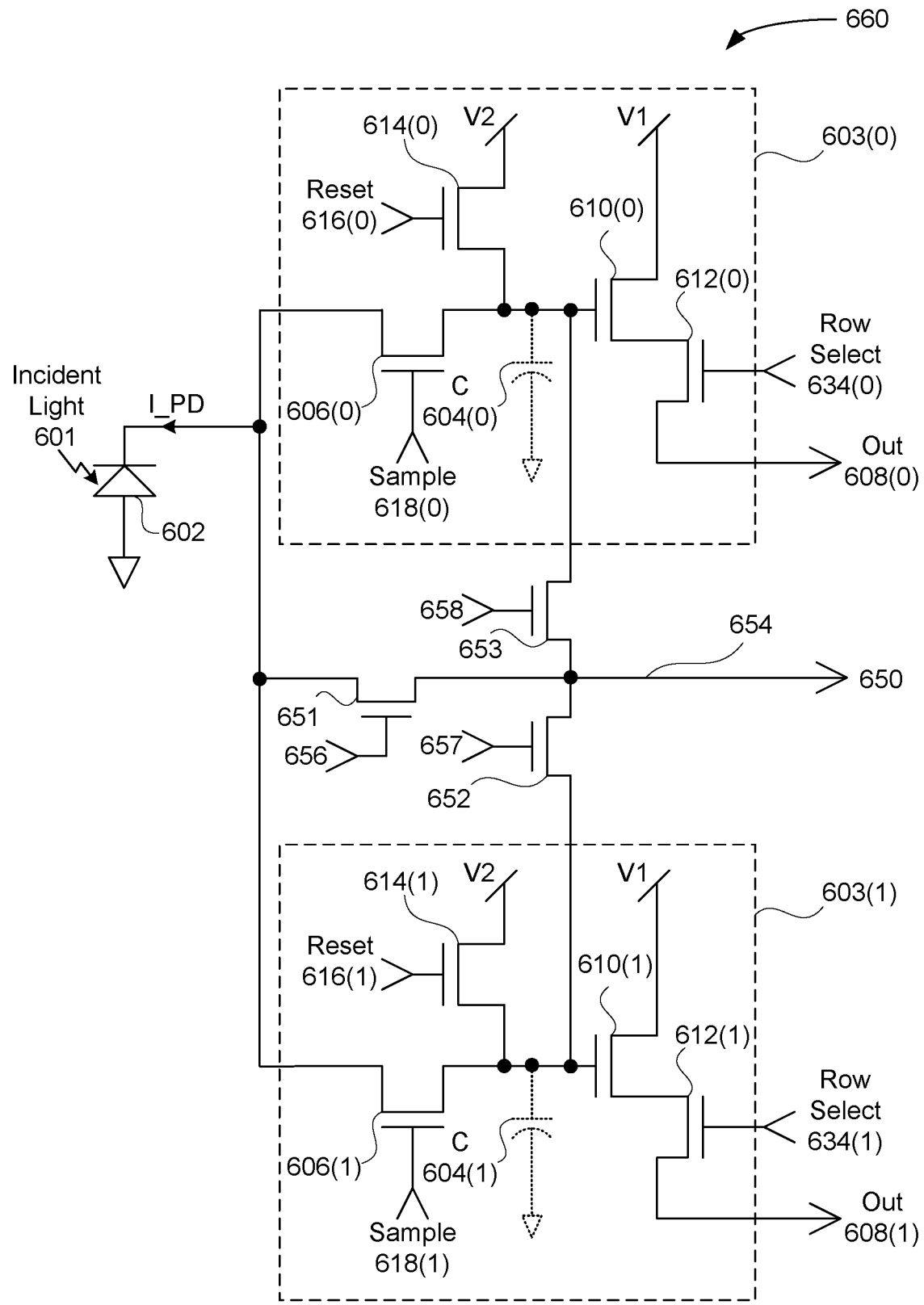
FIG. 6B illustrates a circuit diagram for another photosensitive cell, according to another embodiment.

FIG. 6B illustrates a circuit diagram for a photosensitive cell 660, in accordance with one possible embodiment. As an option, the cell 660 may be implemented in the context of any of the Figures disclosed herein. Of course, however, the cell 660 may be implemented in any desired environment. Further, the aforementioned definitions may equally apply to the description below.

As shown, the photosensitive cell 660 comprises a photodiode 602 that is substantially identical to the photodiode 602 of cell 600, a first analog sampling circuit 603(0) that is substantially identical to the first analog sampling circuit 603(0) of cell 600, a second analog sampling circuit 603(1) that is substantially identical to the second analog sampling circuit 603(1) of cell 600, and an interconnect 654. The interconnect 654 is shown to comprise three transistors 651-653, and a source 650. Each of the transistors 651, 652, and 653, include a gate 656, 657, and 658, respectively. The cell 660 may operate in substantially the same manner as the cell 600 of FIG. 6A, however the cell 660 includes only two pass gates from photodiodes 602 of other cells 660 coupled via the interconnect 654, whereas the cell 600 includes three pass gates from the photodiodes 602 of other cells 600 coupled via the interconnect 644.

Figure 6C:
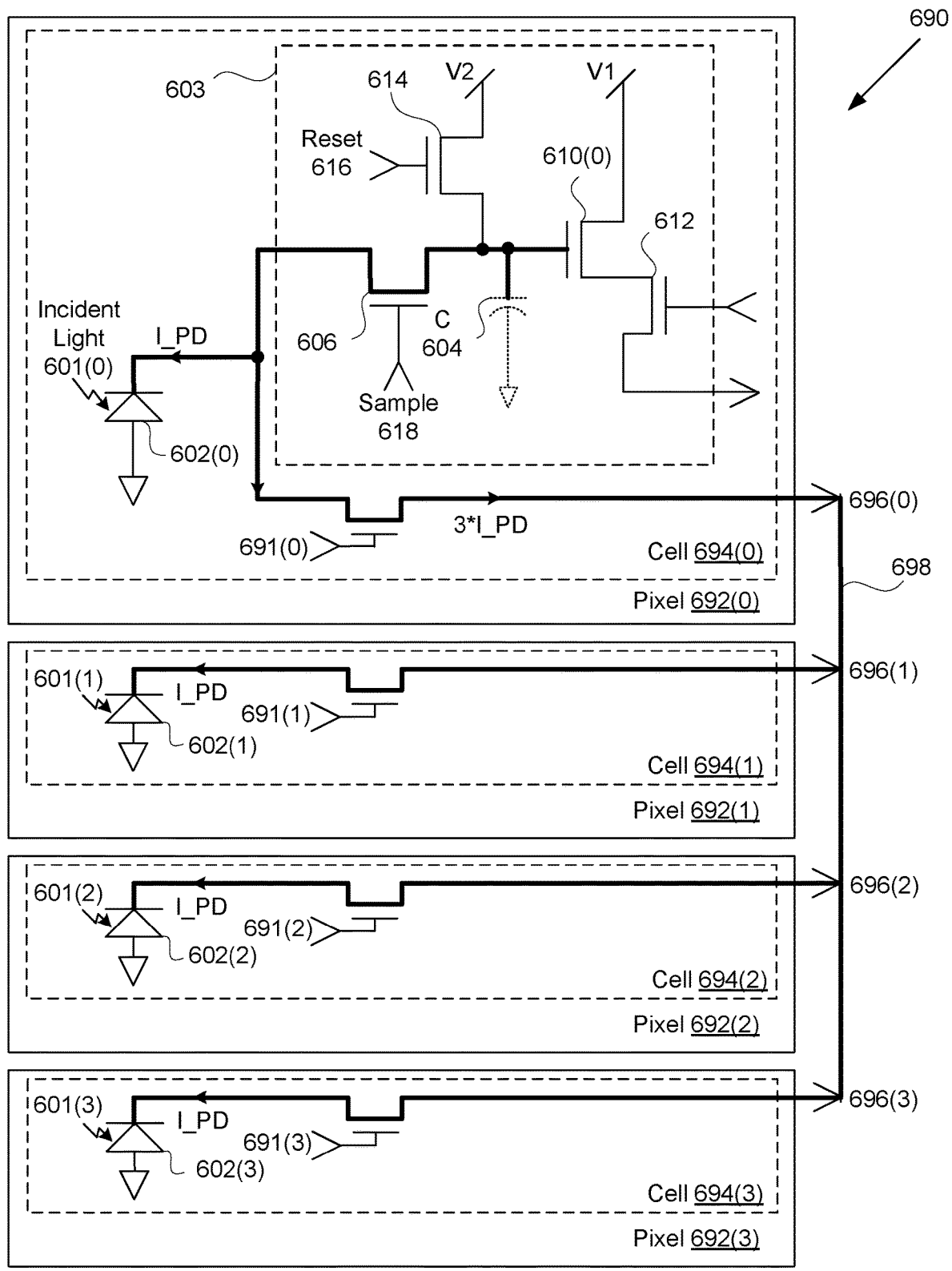
FIG. 6C illustrates a circuit diagram for a plurality of communicatively coupled photosensitive cells, according to yet another embodiment.

FIG. 6C illustrates a circuit diagram for a system 690 including plurality of communicatively coupled photosensitive cells 694, in accordance with one possible embodiment. As an option, the system 690 may be implemented in the context of any of the Figures disclosed herein. Of course, however, the system 690 may be implemented in any desired environment. Further, the aforementioned definitions may equally apply to the description below.

As illustrated in FIG. 6C, the system 690 is shown to include four pixels 692, where each of the pixels 692 includes a respective cell 694, and a set of related cells 694 are communicatively coupled via interconnect 698. Each of the pixels 692 may be implemented as a pixel 240 of FIG. 2, each of the cells 694 may be implemented as a cell 242 of FIG. 2, and the interconnect 698 may be implemented as the interconnect 250 of FIG. 2. Further, the interconnect 698 is shown to include multiple instances of a source 696, and multiple instances of a gate 691. Also, each cell 694 may include an analog sampling circuit 603 coupled to a photodiode 602 for measuring or detecting incident light 601. The analog sampling circuit 603 may be substantially identical to either of the analog sampling circuits 603(0) and 603(1) disclosed in the context of FIG. 6A.

When all instances of the gate 691 are turned on, each of the cells 694 may be thereby communicatively coupled to each of the other cells 694 of the other pixels 692 via the interconnect 698. As a result, a shared photodiode current may be generated. As shown in FIG. 6C, each of the cells 694(1), 694(2), and 694(3) output a substantially similar photodiode current I_PD on the interconnect 698. The photodiode current I_PD generated by each of the cells 694(1), 694(2), and 694(3) may be generated by the respective photodiodes 602(1), 602(2), and 602(3). The photodiode current from the cells 694(1), 694(2), and 694(3) may combine on the interconnect 698 to form a combined photodiode current of 3*I_PD, or a 3× photodiode current.

When sample signal 618 of analog sampling circuit 603 is asserted, the 3× photodiode combines with the photodiode current I_PD of photodiode 602(0), and a 4× photodiode current may be sampled by the analog sampling circuit 603. Thus, a sample may be stored to capacitor 604 of analog sampling circuit 603 of cell 694(0) at a rate 4× faster than if the single photodiode 602(0) generated the photodiode current I_PD sampled by the analog sampling circuit 603. As an option, the 4× photodiode current may be sampled for a same given exposure time that a 1× photodiode current would be sampled for, which may significantly increase or decrease a value of the analog value stored in the analog sampling circuit 603. For example, an analog value stored from sampling the 4× photodiode current for the given exposure time may be associated with a final digital pixel value that is effectively 4× brighter than an analog value stored from sampling a 1× photodiode current for the given exposure time.

When all instances of the gate 691 are turned off, each of the cells 694 may be uncoupled from the other cells 694 of the other pixels 692. When the cells 694 are uncoupled, each of the cells 694 may operate in isolation as discussed previously, for example with respect to FIG. 6A. For example, when operating in isolation, analog sampling circuit 603 may only sample, under the control of sample signal 618, a photodiode current I_PD from a respective photodiode 602(0).

In one embodiment, pixels 692 within an image sensor each include a cell 694 configured to be sensitive to red light (a "red cell"), a cell 694 configured to be sensitive to green light (a "green cell"), and a cell 694 configured to be sensitive to blue light (a "blue cell"). Furthermore, sets of two or more pixels 692 may be configured as described above in FIGS. 6A-6C to switch into a photodiode current sharing mode, whereby red cells within each set of pixels share photodiode current, green cells within each set of pixels share photodiode current, and blue cells within each set of pixels share photodiode current. In certain embodiments, the pixels 692 also each include a cell 694 configured to be sensitive to white light (a "white cell"), whereby each white cell may operate independently with respect to photodiode current while the red cells, green cells, and blue cells operate in a shared photodiode current mode. All other manufacturing parameters being equal, each white cell may be more sensitive (e.g., three times more sensitive) to incident light than any of the red cells, green cells, or blue cells, and, consequently, a white cell may require less exposure time or gain to generate a comparable intensity signal level. In such an embodiment, the resolution of color information (from the red cells, green cells, and blue cells) may be reduced to gain greater sensitivity and better noise performance, while the resolution of pure intensity information (from the white cells) may be kept at full sensor resolution without significantly sacrificing sensitivity or noise performance with respect to intensity information. For example, a 4K pixel by 4K pixel image sensor may be configured to operate as a 2K pixel by 2K pixel image sensor with respect to color, thereby improving color sensitivity by a factor of 4×, while, at the same time, being able to simultaneously capture a 4K pixel by 4K pixel intensity plane from the white cells. In such a configuration, the quarter resolution color information provided by the red cells, green cells, and blue cells may be fused with full resolution intensity information provided by the white cells. To this end, a full 4K by 4K resolution color image may be generated by the image sensor, with better overall sensitivity and noise performance than a comparable conventional image sensor.

FIG. 7 illustrates a system for converting analog pixel data to digital pixel data, in accordance with an embodiment. As an option, the system of FIG. 7 may be implemented in the context of the details of any of the Figures disclosed herein. Of course, however, the system of FIG. 7 may be implemented in any desired environment. Further, the aforementioned definitions may equally apply to the description below.

As shown in FIG. 7, analog pixel data 721 is received from column read out circuit 520 at analog-to-digital unit 722 under the control of control unit 514. The analog pixel data 721 may be received within an analog signal, as noted hereinabove. Further, the analog-to-digital unit 722 generates digital pixel data 725 based on the received analog pixel data 721.

In one embodiment, a unique instance of analog pixel data 721 may include, as an ordered set of individual analog values, all analog values output from all corresponding analog sampling circuits or sample storage nodes. For example, in the context of the foregoing figures, each cell of cells 542-545 of a plurality of pixels 540 of a pixel array 510 may include one or more analog sampling circuits 603.

In one embodiment, the pixel array 510 may include a plurality of first analog sampling circuits 603(0) and also include a plurality of second analog sampling circuits 603(1). In such an embodiment, a first instance of analog pixel data 721 may be received containing a discrete analog value from a plurality of first analog sampling circuits 603(0), and a second instance of analog pixel data 721 may be received containing a discrete analog value from a plurality of second analog sampling circuits 603(1). Thus, in embodiments where cells of a pixel array include two or more analog sampling circuits, the pixel array may output two or more discrete analog signals, where each analog signal includes a unique instance of analog pixel data 721.

In some embodiments, only a subset of the cells of a pixel array may include two or more analog sampling circuits. For example, not every cell may include both a first analog sampling circuit 603(0) and a second analog sampling circuit 603(1).

With continuing reference to FIG. 7, the analog-to-digital unit 722 includes an amplifier 750 and an analog-to-digital converter 754. In one embodiment, the amplifier 750 receives an instance of analog pixel data 721 and a gain 752, and applies the gain 752 to the analog pixel data 721 to generate gain-adjusted analog pixel data 723. The gain-adjusted analog pixel data 723 is transmitted from the amplifier 750 to the analog-to-digital converter 754. The analog-to-digital converter 754 receives the gain-adjusted analog pixel data 723, and converts the gain-adjusted analog pixel data 723 to the digital pixel data 725, which is then transmitted from the analog-to-digital converter 754. In other embodiments, the amplifier 750 may be implemented within the column read out circuit 520 instead of within the analog-to-digital unit 722. The analog-to-digital converter 754 may convert the gain-adjusted analog pixel data 723 to the digital pixel data 725 using any technically feasible analog-to-digital conversion technique.

In an embodiment, the gain-adjusted analog pixel data 723 results from the application of the gain 752 to the analog pixel data 721. In one embodiment, the gain 752 may be selected by the analog-to-digital unit 722. In another embodiment, the gain 752 may be selected by the control unit 514, and then supplied from the control unit 514 to the analog-to-digital unit 722 for application to the analog pixel data 721.

In one embodiment, the amplifier 750 may be a transimpedance amplifier (TIA). Furthermore, the gain 752 may be specified by a digital value. In one embodiment, the digital value specifying the gain 752 may be set by a user of a digital photographic device, such as by operating the digital photographic device in a "manual" mode. Still yet, the digital value may be set by hardware or software of a digital photographic device. As an option, the digital value may be set by the user working in concert with the software of the digital photographic device.

In one embodiment, a digital value used to specify the gain 752 may be associated with an ISO. In the field of photography, the ISO system is a well-established standard for specifying light sensitivity. In one embodiment, the amplifier 750 receives a digital value specifying the gain 752 to be applied to the analog pixel data 721. In another embodiment, there may be a mapping from conventional ISO values to digital gain values that may be provided as the gain 752 to the amplifier 750. For example, each of ISO 100, ISO 200, ISO 400, ISO 800, ISO 1600, etc. may be uniquely mapped to a different digital gain value, and a selection of a particular ISO results in the mapped digital gain value being provided to the amplifier 750 for application as the gain 752. In one embodiment, one or more ISO values may be mapped to a gain of 1. Of course, in other embodiments, one or more ISO values may be mapped to any other gain value.

Accordingly, in one embodiment, each analog pixel value may be adjusted in brightness given a particular ISO value. Thus, in such an embodiment, the gain-adjusted analog pixel data 723 may include brightness corrected pixel data, where the brightness is corrected based on a specified ISO. In another embodiment, the gain-adjusted analog pixel data 723 for an image may include pixels having a brightness in the image as if the image had been sampled at a certain ISO.

In accordance with an embodiment, the digital pixel data 725 may comprise a plurality of digital values representing pixels of an image captured using the pixel array 510.

In one embodiment, an instance of digital pixel data 725 may be output for each instance of analog pixel data 721 received. Thus, where a pixel array 510 includes a plurality of first analog sampling circuits 603(0) and also includes a plurality of second analog sampling circuits 603(1), then a first instance of analog pixel data 721 may be received containing a discrete analog value from the first analog sampling circuits 603(0), and a second instance of analog pixel data 721 may be received containing a discrete analog value from the second analog sampling circuits 603(1). In such an embodiment, a first instance of digital pixel data 725 may be output based on the first instance of analog pixel data 721, and a second instance of digital pixel data 725 may be output based on the second instance of analog pixel data 721.

Further, the first instance of digital pixel data 725 may include a plurality of digital values representing pixels of a first image captured using the plurality of first analog sampling circuits 603(0) of the pixel array 510, and the second instance of digital pixel data 725 may include a plurality of digital values representing pixels of a second image captured using the plurality of second analog sampling circuits 603(1) of the pixel array 510.

In some embodiments, two or more gains 752 may be applied to an instance of analog pixel data 721, such that two or more instances of digital pixel data 725 may be output for each instance of analog pixel data 721.

Figure 8:
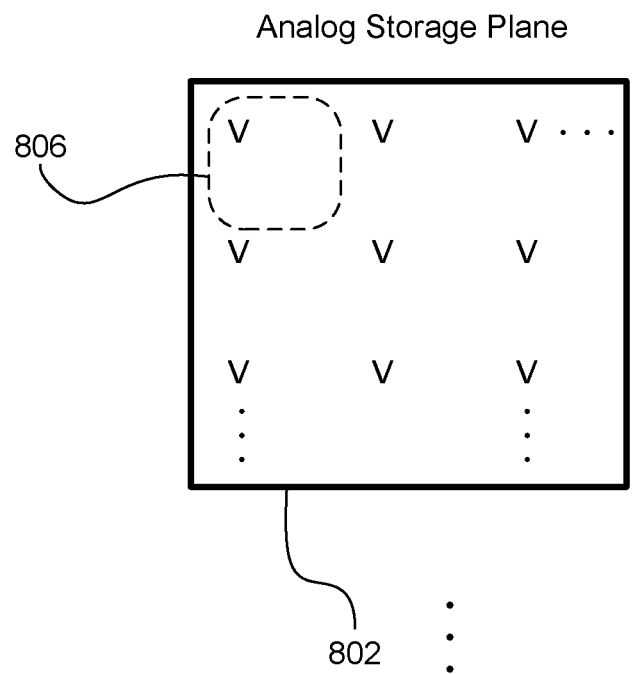
FIG. 8 illustrates implementations of different analog storage planes, in accordance with another embodiment.
Figure 8:
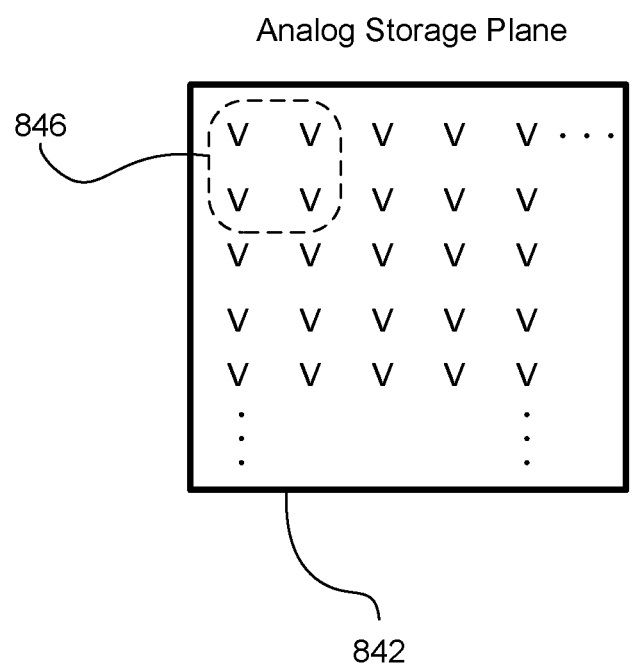

FIG. 8 illustrates implementations of different analog storage planes, in accordance with another embodiment. As an option, the analog storage planes of FIG. 8 may be implemented in the context of the details of any of the Figures disclosed herein. Of course, however, the analog storage planes of FIG. 8 may be implemented in any desired environment. Further, the aforementioned definitions may equally apply to the description below.

FIG. 8 is illustrated to include a first analog storage plane 802 and a second analog storage plane 842. A plurality of analog values are each depicted as a "V" within the analog storage planes 802 and 842. In the context of certain embodiments, each analog storage plane may comprise any collection of one or more analog values. In some embodiments, an analog storage plane may be capable of storing at least one analog pixel value for each pixel of a row or line of a pixel array. In one embodiment, an analog storage plane may cable of storing an analog value for each cell of each pixel of a plurality of pixels of a pixel array. Still yet, in another embodiment, an analog storage plane may be capable of storing at least one analog pixel value for each pixel of an entirety of a pixel array, which may be referred to as a frame. For example, an analog storage plane may be capable of storing an analog value for each cell of each pixel of every line or row of a pixel array.

In one embodiment, the analog storage plane 842 may be representative of a portion of an image sensor in which an analog sampling circuit of each cell has been activated to sample a corresponding photodiode current. In other words, for a given region of an image sensor, all cells include an analog sampling circuit that samples a corresponding photodiode current, and stores an analog value as a result of the sampling operation. As a result, the analog storage plane 842 includes a greater analog value density 846 than an analog value density 806 of the analog storage plane 802.

In one embodiment, the analog storage plane 802 may be representative of a portion of an image sensor in which only one-quarter of the cells include analog sampling circuits activated to sample a corresponding photodiode current. In other words, for a given region of an image sensor, only one-quarter of the cells include an analog sampling circuit that samples a corresponding photodiode current, and stores an analog value as a result of the sampling operation. The analog value density 806 of the analog storage plane 802 may result from a configuration, as discussed above, wherein four neighboring cells are communicatively coupled via an interconnect such that a 4× photodiode current is sampled by a single analog sampling circuit of one of the four cells, and the remaining analog sampling circuits of the other three cells are not activated to sample.

Figure 9:
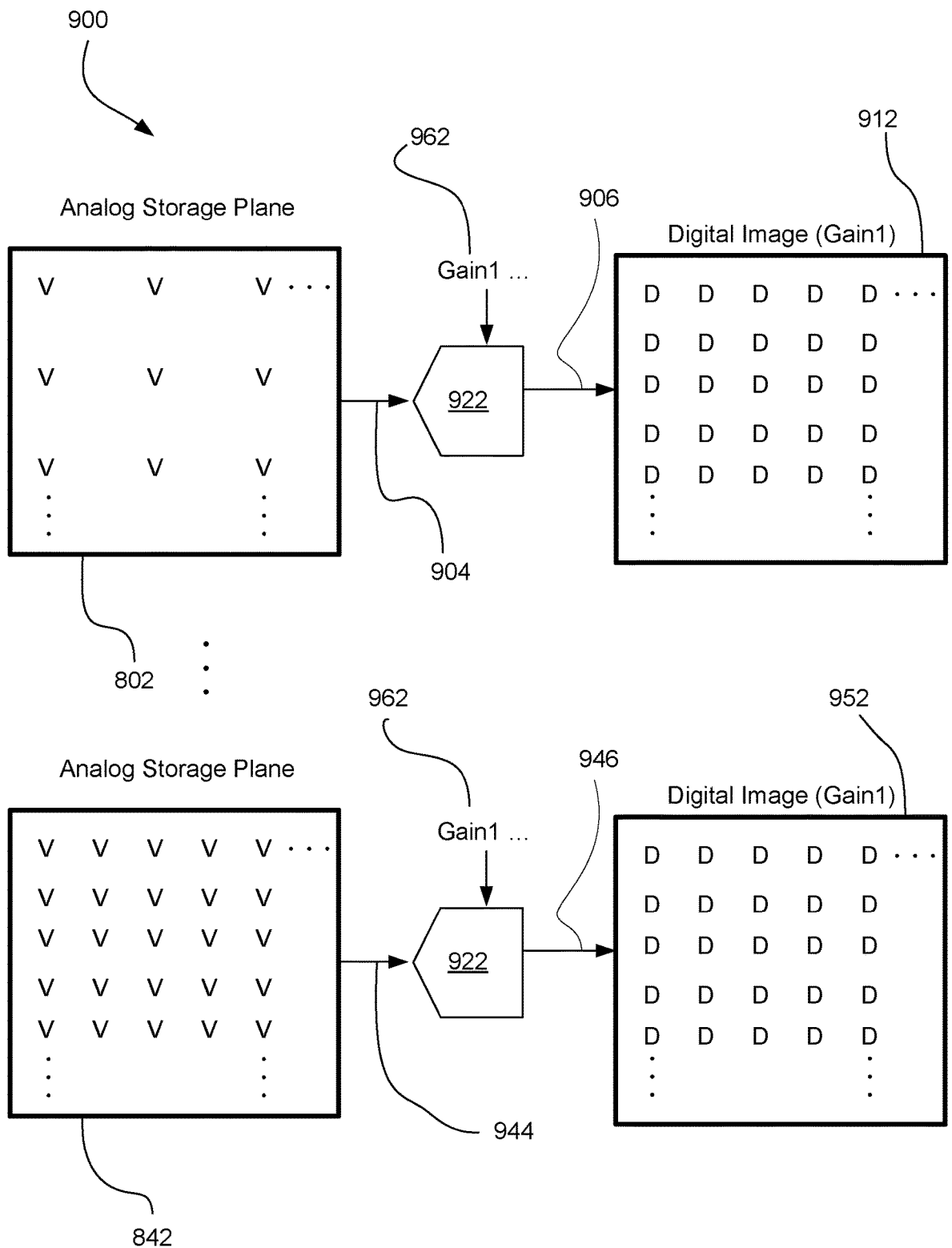
FIG. 9 illustrates a system for converting analog pixel data of an analog signal to digital pixel data, in accordance with another embodiment.

FIG. 9 illustrates a system 900 for converting analog pixel data of an analog signal to digital pixel data, in accordance with another embodiment. As an option, the system 900 may be implemented in the context of the details of any of the Figures disclosed herein. Of course, however, the system 900 may be implemented in any desired environment. Further, the aforementioned definitions may equally apply to the description below.

The system 900 is shown in FIG. 9 to include a first analog storage plane 802, an analog-to-digital unit 922, a first digital image 912, a second analog storage plane 842, and a second digital image 952. As illustrated in FIG. 9, a plurality of analog values are each depicted as a "V" within each of the analog storage planes 802 and 842, and corresponding digital values are each depicted as a "D" within digital images 912 and 952, respectively.

As noted above, each analog storage plane 802 and 842 may comprise any collection of one or more analog values. In one embodiment, a given analog storage plane may comprise an analog value for each analog storage circuit 603 that receives an active sample signal 618, and thereby samples a photodiode current, during an associated exposure time.

In some embodiments, an analog storage plane may include analog values for only a subset of all the analog storage circuits 603 of an image sensor. This may occur, for example, when analog storage circuits 603 of only odd or even rows of pixels are activated to sample during a given exposure time. Similarly, this may occur when analog storage circuits 603 of only odd or even columns of pixels are activated to sample during a given exposure. As another example, this may occur when two or more photosensitive cells are communicatively coupled, such as by an interconnect 644, in a manner that distributes a shared photodiode current, such as a 2× or 4× photodiode current, between the communicatively coupled cells. In such an embodiment, only a subset of analog sampling circuits 603 of the communicatively coupled cells may be activated by a sample signal 618 to sample the shared photodiode current during a given exposure time. Any analog sampling circuits 603 activated by a sample signal 618 during the given exposure time may sample the shared photodiode current, and store an analog value to the analog storage plane associated with the exposure time. However, the analog storage plane associated with the exposure time would not include any analog values associated with the analog sampling circuits 603 that are not activated by a sample signal 618 during the exposure time.

Thus, an analog value density of a given analog storage plane may depend on a subset of analog sampling circuits 603 activated to sample photodiode current during a given exposure associated with the analog storage plane. Specifically, a greater analog value density may be obtained, such as for the more dense analog storage plane 842, when a sample signal 618 is activated for an analog sampling circuit 603 in each of a plurality of neighboring cells of an image sensor during a given exposure time. Conversely, a decreased analog value density may be obtained, such as for the less dense analog storage plane 802, when a sample signal 618 is activated for only a subset of neighboring cells of an image sensor during a given exposure time.

Returning now to FIG. 9, the analog values of the less dense analog storage plane 802 are output as analog pixel data 904 to the analog-to-digital unit 922. Further, the analog values of the more dense analog storage plane 842 are separately output as analog pixel data 944 to the analog-to-digital unit 922. In one embodiment, the analog-to-digital unit 922 may be substantially identical to the analog-to-digital unit 722 described within the context of FIG. 7. For example, the analog-to-digital unit 922 may comprise at least one amplifier and at least one analog-to-digital converter, where the amplifier is operative to receive a gain value and utilize the gain value to gain-adjust analog pixel data received at the analog-to-digital unit 922. Further, in such an embodiment, the amplifier may transmit gain-adjusted analog pixel data to an analog-to-digital converter, which then generates digital pixel data from the gain-adjusted analog pixel data. To this end, an analog-to-digital conversion may be performed on the contents of each of two or more different analog storage planes 802 and 842.

In one embodiment, the analog-to-digital unit 922 applies at least two different gains to each instance of received analog pixel data. For example, the analog-to-digital unit 922 may receive analog pixel data 904, and apply at least two different gains to the analog pixel data 904 to generate at least a first gain-adjusted analog pixel data and a second gain-adjusted analog pixel data based on the analog pixel data 904; and the analog-to-digital unit 922 may receive analog pixel data 944, and then apply at least two different gains to the analog pixel data 944 to generate at least a first gain-adjusted analog pixel data and a second gain-adjusted analog pixel data based on the analog pixel data 944.

Further, the analog-to-digital unit 922 may convert each instance of gain-adjusted analog pixel data to digital pixel data, and then output a corresponding digital signal. With respect to FIG. 9 specifically, the analog-to-digital unit 922 is shown to generate a first digital signal comprising first digital pixel data 906 corresponding to application of Gain1 to analog pixel data 904; and a second digital signal comprising second digital pixel data 946 corresponding to application of Gain1 to analog pixel data 944. Each instance of digital pixel data may comprise a digital image, such that the first digital pixel data 906 comprises a digital image 912, and the second digital pixel data 946 comprises a digital image 952. In other words, a first digital image 912 may be generated based on the analog values of the less dense analog storage plane 802, and a second digital image 952 may be generated based on the analog values of the more dense analog storage plane 842.

Of course, in other embodiments, the analog-to-digital unit 922 may apply a plurality of gains to each instance of analog pixel data, to thereby generate an image stack based on each analog storage plane 802 and 842. Image stack generation is discussed more fully within application Ser. No. 14/534,089, filed Nov. 5, 2014, entitled "IMAGE SENSOR APPARATUS AND METHOD FOR SIMULTANEOUSLY CAPTURING MULTIPLE IMAGES"; application Ser. No. 14/535,274, filed Nov. 6, 2014, entitled "IMAGE SENSOR APPARATUS AND METHOD FOR SIMULTANEOUSLY CAPTURING FLASH AND AMBIENT ILLUMINATED IMAGES," which are each incorporated as though set forth herein in full. Each image stack may be manipulated as set forth in those applications, or as set forth below.

In some embodiments, the digital image 952 may have a greater resolution than the digital image 912. In other words, a greater number of pixels may comprise digital image 952 than a number of pixels that comprise digital image 912. This may be because the digital image 912 was generated from the less dense analog storage plane 802 that included, in one example, only one-quarter the number of sampled analog values of more dense analog storage plane 842. In other embodiments, the digital image 952 may have the same resolution as the digital image 912. In such an embodiment, a plurality of digital pixel data values may be generated to make up for the reduced number of sampled analog values in the less dense analog storage plane 802. For example, the plurality of digital pixel data values may be generated by interpolation to increase the resolution of the digital image 912.

In one embodiment, the digital image 912 generated from the less dense analog storage plane 802 may be used to improve the digital image 952 generated from the more dense analog storage plane 842. As a specific non-limiting example, each of the less dense analog storage plane 802 and the more dense analog storage plane 842 may storage analog values for a single exposure of a photographic scene. In the context of the present description, a "single exposure" of a photographic scene may include simultaneously, at least in part, capturing the photographic scene using two or more sets of analog sampling circuits, where each set of analog sampling circuits may be configured to operate at different exposure times. Further, the single exposure may be further broken up into multiple discrete exposure times or samples times, where the exposure times or samples times may occur sequentially, partially simultaneously, or in some combination of sequentially and partially simultaneously.

During capture of the single exposure of the photographic scene using the two or more sets of analog sampling circuits, some cells of the capturing image sensor may be communicatively coupled to one or more other cells. For example, cells of an image sensor may be communicatively coupled as shown in FIG. 2, such that each cell is coupled to three other cells associated with a same peak wavelength of light. Therefore, during the single exposure, each of the communicatively coupled cells may receive a 4× photodiode current.

During a first sample time of the single exposure, a first analog sampling circuit in each of the four cells may receive an active sample signal, which causes the first analog sampling circuit in each of the four cells to sample the 4× photodiode current for the first sample time. The more dense analog storage plane 842 may be representative of the analog values stored during such a sample operation. Further, a second analog sampling circuit in each of the four cells may be controlled to separately sample the 4× photodiode current. As one option, during a second sample time after the first sample time, only a single second analog sampling circuit of the four coupled cells may receive an active sample signal, which causes the single analog sampling circuit to sample the 4× photodiode current for the second sample time. The less dense analog storage plane 802 may be representative of the analog values stored during such a sample operation.

As a result, analog values stored during the second sample time of the single exposure are sampled with an increased sensitivity, but a decreased resolution, in comparison to the analog values stored during the first sample time. In situations involving a low-light photographic scene, the increased light sensitivity associated with the second sample time may generate a better exposed and/or less noisy digital image, such as the digital image 912. However, the digital image 952 may have a desired final image resolution or image size. Thus, in some embodiments, the digital image 912 may be blended or mixed or combined with digital image 952 to reduce the noise and improve the exposure of the digital image 952. For example, a digital image with one-half vertical or one-half horizontal resolution may be blended with a digital image at full resolution. In another embodiment any combination of digital images at one-half vertical resolution, one-half horizontal resolution, and full resolution may be blended.

In some embodiments, a first exposure time (or first sample time) and a second exposure time (or second sample time) are each captured using an ambient illumination of the photographic scene. In other embodiments, the first exposure time (or first sample time) and the second exposure time (or second sample time) are each captured using a flash or strobe illumination of the photographic scene. In yet other embodiments, the first exposure time (or first sample time) may be captured using an ambient illumination of the photographic scene, and the second exposure time (or second sample time) may be captured using a flash or strobe illumination of the photographic scene.

In embodiments in which the first exposure time is captured using an ambient illumination, and the second exposure time is captured using flash or strobe illumination, analog values stored during the first exposure time may be stored to an analog storage plane at a higher density than the analog values stored during the second exposure time. This may effectively increase the ISO or sensitivity of the capture of the photographic scene at ambient illumination. Subsequently, the photographic scene may then be captured at full resolution using the strobe or flash illumination. The lower resolution ambient capture and the full resolution strobe or flash capture may then be merged to create a combined image that includes detail not found in either of the individual captures.

Various options for combining the digital image 912 and the digital image 952 for obtaining a combined digital image with improved exposure and less noise are disclosed below, and provided in U.S. patent application Ser. No. 14/534,068, filed Nov. 5, 2014, entitled "SYSTEMS AND METHODS FOR HIGH-DYNAMIC RANGE IMAGES," now U.S. Pat. No. 9,167,174, the disclosures of which are incorporated herein as though set forth in full.

Figure 10:
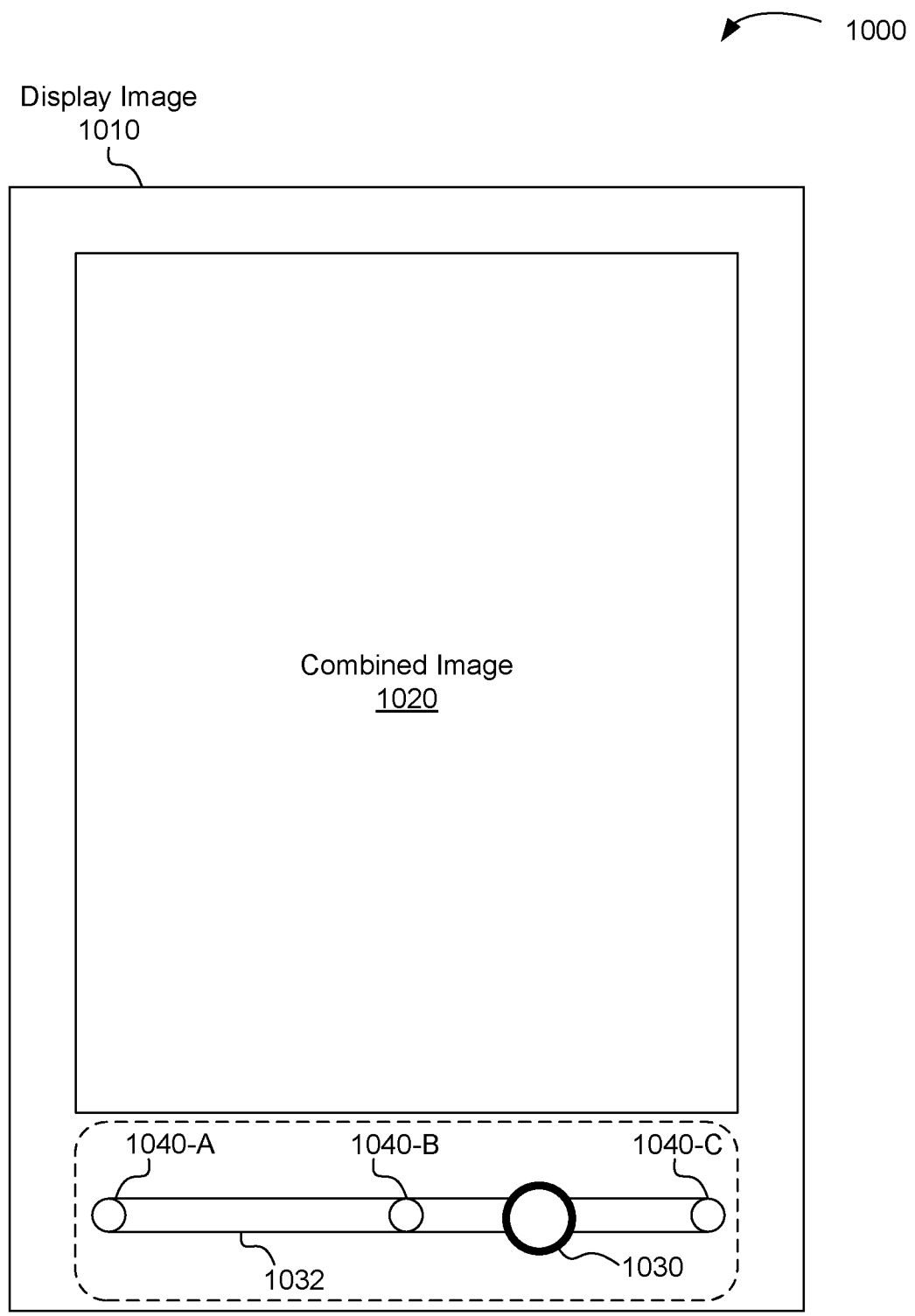
FIG. 10 illustrates a user interface system for generating a combined image, according to an embodiment.

FIG. 10 illustrates a user interface (UI) system 1000 for generating a combined image 1020, according to one embodiment. As an option, the UI system 1000 may be implemented in the context of the details of any of the Figures disclosed herein. Of course, however, the UI system 1000 may be carried out in any desired environment. Further, the aforementioned definitions may equally apply to the description below.

In one embodiment, a combined image 1020 comprises a combination of at least two related digital images. For example, the combined image 1020 may comprise a combined rendering of at least two digital images of a single exposure of a photographic scene. Specifically, the combined image 1020 may comprise a combined rendering of a digital image 912 generated from a less dense analog storage plane 802, and a digital image 952 generated from a more dense analog storage plane 842.

In one embodiment, the UI system 1000 presents a display image 1010 that includes, without limitation, a combined image 1020, a slider control 1030 configured to move along track 1032, and two or more indication points 1040, which may each include a visual marker displayed within display image 1010.

In one embodiment, the UI system 1000 is generated by an adjustment tool executing within a processor complex 310 of a digital photographic system 300, and the display image 1010 is displayed on display unit 312. In one embodiment, at least two digital images comprise source images for generating the combined image 1020. The at least two digital images may reside within NV memory 316, volatile memory 318, memory subsystem 362, or any combination thereof. In another embodiment, the UI system 1000 is generated by an adjustment tool executing within a computer system, such as a laptop computer or a desktop computer. The at least two digital images may be transmitted to the computer system or may be generated by an attached camera device. In yet another embodiment, the UI system 1000 may be generated by a cloud-based server computer system, which may download the at least two digital images to a client browser, which may execute combining operations described below. In another embodiment, the UI system 1000 is generated by a cloud-based server computer system, which receives the at least two digital images from a digital photographic system in a mobile device, and which may execute the combining operations described below in conjunction with generating combined image 1020.

The slider control 1030 may be configured to move between two end points corresponding to indication points 1040-A and 1040-C. One or more indication points, such as indication point 1040-B may be positioned between the two end points. Each indication point 1040 may be associated with a specific rendering of a combined image 1020, or a specific combination of two or more digital images. For example, the indication point 1040-A may be associated with a first digital image, and the indication point 1040-C may be associated with a second digital image. Both the first digital image and the second digital image may be from a single exposure, as described hereinabove. In another embodiment, when the slider control 1030 is positioned directly over the indication point 1040-A, only the first digital image may be displayed as the combined image 1020 in the display image 1010, and similarly when the slider control 1030 is positioned directly over the indication point 1040-C, only the second digital image may be displayed as the combined image 1020 in the display image 1010.

In one embodiment, indication point 1040-B may be associated with a blending of the first digital image and the second digital image. For example, when the slider control 1030 is positioned at the indication point 1040-B, the combined image 1020 may be a blend of the first digital image and the second digital image. In one embodiment, blending of the first digital image and the second digital image may comprise alpha blending, brightness blending, dynamic range blending, and/or tone mapping or other non-linear blending and mapping operations. In another embodiment, any blending of the first digital image and the second digital image may provide a new image that has a greater dynamic range or other visual characteristics that are different than either of the first image and the second image alone. Thus, a blending of the first digital image and the second digital image may provide a new computed HDR image that may be displayed as combined image 1020 or used to generate combined image 1020. To this end, a first digital signal and a second digital signal may be combined, resulting in at least a portion of a HDR image. Further, one of the first digital signal and the second digital signal may be further combined with at least a portion of another digital image or digital signal. In one embodiment, the other digital image may include another HDR image.

In one embodiment, when the slider control 1030 is positioned at the indication point 1040-A, the first digital image is displayed as the combined image 1020, and when the slider control 1030 is positioned at the indication point 1040-C, the second digital image is displayed as the combined image 1020; furthermore, when slider control 1030 is positioned at indication point 1040-B, a blended image is displayed as the combined image 1020. In such an embodiment, when the slider control 1030 is positioned between the indication point 1040-A and the indication point 1040-C, a mix (e.g. blend) weight may be calculated for the first digital image and the second digital image. For the first digital image, the mix weight may be calculated as having a value of 0.0 when the slider control 1030 is at indication point 1040-C and a value of 1.0 when slider control 1030 is at indication point 1040-A, with a range of mix weight values between 0.0 and 1.0 located between the indication points 1040-C and 1040-A, respectively. For the second digital image, the mix weight may be calculated as having a value of 0.0 when the slider control 1030 is at indication point 1040-A and a value of 1.0 when slider control 1030 is at indication point 1040-C, with a range of mix weight values between 0.0 and 1.0 located between the indication points 1040-A and 1040-C, respectively.

In other embodiments, in addition to the indication point 1040-B, there may exist a plurality of additional indication points along the track 1032 between the indication points 1040-A and 1040-C. The additional indication points may be associated with additional digital images.

Thus, as a result of the slider control 1030 positioning, two or more digital signals may be blended, and the blended digital signals may be generated utilizing analog values from different analog storage planes. Further, the different analog storage planes may be associated with different analog value densities. As noted above, a digital image generated from an analog storage plane captured using a shared photodiode current may be captured to include less noise, and/or may be captured at a greater light sensitivity or brightness. This digital image may be blended with a higher noise and higher resolution digital image to generate an image at the higher resolution with decreased noise, increased brightness, and/or better exposure. Thus, a blend operation of two or more digital signals may serve to reduce the noise apparent in at least one of the digital signals.

Of course, any two or more effective exposures may be blended based on the indication point of the slider control 1030 to generate a combined image 1020 in the UI system 1000. Still further, any two or more effective exposures may be blended utilizing the systems and methods disclose within U.S. patent application Ser. No. 14/534,068, filed Nov. 5, 2014, entitled "SYSTEMS AND METHODS FOR HIGH-DYNAMIC RANGE IMAGES," now U.S. Pat. No. 9,167,174.

In one embodiment, a mix operation may be applied to a first digital image and a second digital image based upon at least one mix weight value associated with at least one of the first digital image and the second digital image. In one embodiment, a mix weight of 1.0 gives complete mix weight to a digital image associated with the 1.0 mix weight. In this way, a user may blend between the first digital image and the second digital image. To this end, a first digital signal and a second digital signal may be blended in response to user input. For example, sliding indicia may be displayed, and a first digital signal and a second digital signal may be blended in response to the sliding indicia being manipulated by a user.

A system of mix weights and mix operations provides a UI tool for viewing a first digital image, a second digital image, and a blended image as a gradual progression from the first digital image to the second digital image. In one embodiment, a user may save a combined image 1020 corresponding to an arbitrary position of the slider control 1030. The adjustment tool implementing the UI system 1000 may receive a command to save the combined image 1020 via any technically feasible gesture or technique. For example, the adjustment tool may be configured to save the combined image 1020 when a user gestures within the area occupied by combined image 1020. Alternatively, the adjustment tool may save the combined image 1020 when a user presses, but does not otherwise move the slider control 1030. In another implementation, the adjustment tool may save the combined image 1020 when a user gestures, such as by pressing a UI element (not shown), such as a save button, dedicated to receive a save command.

To this end, a slider control may be used to determine a contribution of two or more digital images to generate a final computed image, such as combined image 1020. Persons skilled in the art will recognize that the above system of mix weights and mix operations may be generalized to include two or more indication points, associated with two or more related images. Such related images may comprise, without limitation, any number of digital images that have been generated from two or more analog storage planes, and which may have zero, or near zero, interframe time.

Furthermore, a different continuous position UI control, such as a rotating knob, may be implemented rather than the slider control 1030.

In other embodiments, the UI system 1000 may include additional slider controls. For example, where the first digital image includes an ambient image, and the second digital image includes a strobe or flash image, then two or more slider controls may be provided on the UI system 1000. A first slider control in such an example may allow a user to control an application of gain to one or more of the digital images. For example, the first slider control may control an application of gain to the ambient image. Similarly, a second slider control may control an application of gain to the strobe or flash image. As an option, another slider control in such an example may allow a user to control a flash contribution of the flash image to a combined image.

Figure 11:
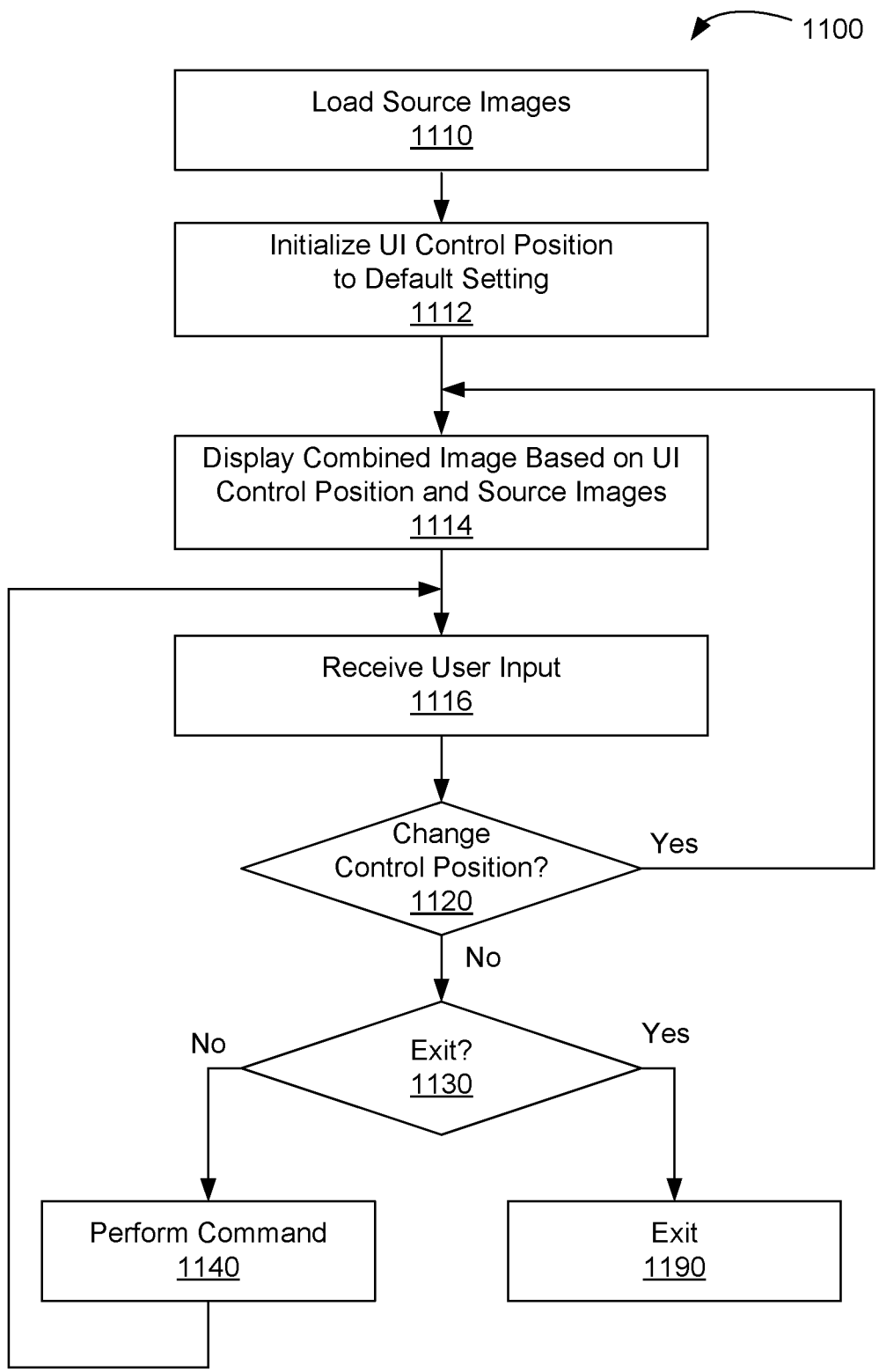
FIG. 11 is a flow diagram of method steps for generating a combined image, according to one embodiment.

FIG. 11 is a flow diagram of method 1100 for generating a combined image, according to one embodiment. As an option, the method 1100 may be carried out in the context of the details of any of the Figures disclosed herein. Of course, however, the method 1100 may be carried out in any desired environment. Further, the aforementioned definitions may equally apply to the description below.

The method 1100 begins in step 1110, where an adjustment tool executing within a processor complex, such as processor complex 310, loads at least two related source images, such as a first digital image and a second digital image described in the context of FIG. 10. In step 1112, the adjustment tool initializes a position for a UI control, such as slider control 1030 of FIG. 10, to a default setting. In one embodiment, the default setting comprises an end point, such as indication point 1040-A, for a range of values for the UI control. In another embodiment, the default setting comprises a calculated value based on one or more of the at least two related source images. In certain embodiments, the default setting is initialized to a value previously selected by a user in association with an image object comprising at least the first digital image and the second digital image.

In step 1114, the adjustment tool generates and displays a combined image, such as combined image 1020 of FIG. 10, based on a position of the UI control and the at least two related source images. In one embodiment, generating the combined image comprises mixing the at least two related source images as described previously in FIG. 10. In step 1116, the adjustment tool receives user input. The user input may include, without limitation, a UI gesture such as a selection gesture or click gesture within display image 1010. If, in step 1120, the user input should change the position of the UI control, then the adjustment tool changes the position of the UI control and the method proceeds back to step 1114. Otherwise, the method proceeds to step 1130.

If, in step 1130, the user input does not comprise a command to exit, then the method proceeds to step 1140, where the adjustment tool performs a command associated with the user input. In one embodiment, the command comprises a save command and the adjustment tool then saves the combined image, which is generated according to a position of the UI control. The method then proceeds back to step 1116.

Returning to step 1130, if the user input comprises a command to exit, then the method terminates in step 1190, where the adjustment tool exits, thereby terminating execution.

In summary, a technique is disclosed for generating a new digital photograph that beneficially blends a first digital image and a second digital image, where the first digital image and the second digital image are based on different analog signals received from two different analog storage planes, but from a single image sensor. The first digital image may be blended with the second digital image based on a function that implements any technically feasible blend technique. An adjustment tool may implement a user interface technique that enables a user to select and save the new digital photograph from a gradation of parameters for combining related images.

One advantage of the embodiments disclosed herein is that a digital photograph may be selectively generated based on user input using two or more different samples of a single exposure of a photographic scene. Accordingly, the digital photograph generated based on the user input may have a greater dynamic range than any of the individual samples. Further, the generation of an HDR image using two or more different samples with zero, or near zero, interframe time allows for the rapid generation of HDR images without motion artifacts.

Figure 12:
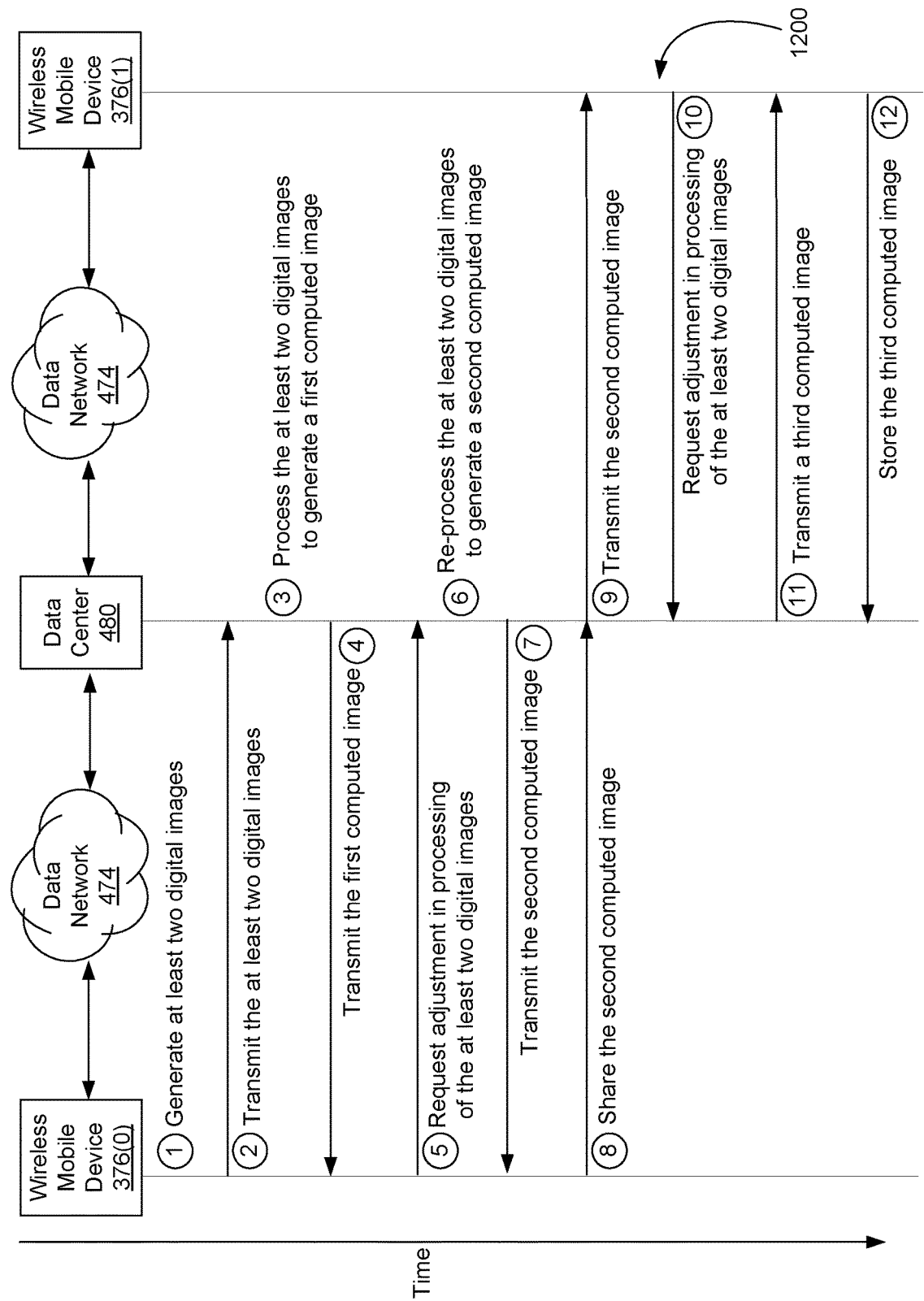
FIG. 12 illustrates a message sequence for generating a combined image utilizing a network, according to another embodiment.

FIG. 12 illustrates a message sequence 1200 for generating a combined image utilizing a network, according to one embodiment. As an option, the message sequence 1200 may be carried out in the context of the details of any of the Figures disclosed herein. Of course, however, the message sequence 1200 may be carried out in any desired environment. Further, the aforementioned definitions may equally apply to the description below.

As shown in FIG. 12, a wireless mobile device 376(0) generates at least two digital images. In one embodiment, the at least two digital images may include a digital image 912 generated from a less dense analog storage plane 802, and a digital image 952 generated from a more dense analog storage plane 842.

Referring again to FIG. 12, the at least two digital images are transmitted from the wireless mobile device 376(0) to a data center 480 by way of a data network 474. The at least two digital images may be transmitted by the wireless mobile device 376(0) to the data center 480 using any technically feasible network communication method.

Further, in one embodiment, the data center 480 may then process the at least two digital images to generate a first computed image. The processing of the at least two digital images may include any processing of the at least two digital images that blends or merges at least a portion of each of the at least two digital images to generate the first computed image. To this end, the first digital image and the second digital image may be combined remotely from the wireless mobile device 376(0). For example, the processing of the at least two digital images may include an any type of blending operation, including but not limited to, an HDR image combining operation. In one embodiment, the processing of the at least two digital images may include any blending computations that produce a first computed image with less noise than at least one of the digital images received at the data center 480. In another embodiment, the processing of the at least two digital images may include any computations that produce a first computed image having a greater dynamic range than any one of the digital images received at the data center 480. Accordingly, in one embodiment, the first computed image generated by the data center 480 may be an HDR image. In other embodiments, the first computed image generated by the data center 480 may be at least a portion of an HDR image.

After generating the first computed image, the data center 480 may then transmit the first computed image to the wireless mobile device 376(0). In one embodiment, the transmission of the at least two digital images from the wireless mobile device 376(0), and the receipt of the first computed image at the wireless mobile device 376(0), may occur without any intervention or instruction being received from a user of the wireless mobile device 376(0). For example, in one embodiment, the wireless mobile device 376(0) may transmit the at least two digital images to the data center 480 immediately after capturing a photographic scene and generating the at least two digital images utilizing one or more analog signals representative of the photographic scene. The photographic scene may be captured based on a user input or selection of an electronic shutter control, or pressing of a manual shutter button, on the wireless mobile device 376(0).

Further, in response to receiving the at least two digital images, the data center 480 may generate an HDR image based on the at least two digital images, and transmit the HDR image to the wireless mobile device 376(0). The HDR image may be generated utilizing a blending of the at least two digital images for reducing the noise of the HDR image in comparison to at least one of the digital images. The wireless mobile device 376(0) may then display the received HDR image. Accordingly, a user of the wireless mobile device 376(0) may view on the display of the wireless mobile device 376(0) an HDR image computed by the data center 480. Thus, even though the wireless mobile device 376(0) does not perform any HDR image processing, the user may view on the wireless mobile device 376(0) the newly computed HDR image substantially instantaneously after capturing the photographic scene and generating the at least two digital images on which the HDR image is based.

As shown in FIG. 12, the wireless mobile device 376(0) requests adjustment in processing of the at least two digital images. In one embodiment, upon receiving the first computed image from the data center 480, the wireless mobile device 376(0) may display the first computed image in a UI system, such as the UI system 1000 of FIG. 10. In such an embodiment, the user may control a slider control, such as the slider control 1030, to adjust the processing of the at least two digital images transmitted to the data center 480. For example, user manipulation of a slider control may result in commands being transmitted to the data center 480. In one embodiment, the commands transmitted to the data center 480 may include mix weights for use in adjusting the processing of the at least two digital images. In other embodiments, the request to adjust processing of the at least two digital images includes any instructions from the wireless mobile device 376(0) that the data center 480 may use to again process the at least two digital images and generate a second computed image.

As shown in FIG. 12, upon receiving the request to adjust processing, the data center 480 re-processes the at least two digital images to generate a second computed image. In one embodiment, the data center 480 may re-process the at least two digital images using parameters received from the wireless mobile device 376(0). The parameters may be provided as input with the at least two digital images to an HDR processing algorithm that executes at the data center 480. The parameters may be provided as input to a blending operation to adjust a blending of the at least two digital images. After generating the second computed image, the second computed image may be transmitted from the data center 480 to the wireless mobile device 376(0) for display to the user.

Referring again to FIG. 12, the wireless mobile device 376(0) shares the second computed image with another wireless mobile device 376(1). In one embodiment, the wireless mobile device 376(0) may share any computed image received from the data center 480 with the other wireless mobile device 376(1). For example, the wireless mobile device 376(0) may share the first computed image received from the data center 480. As shown in FIG. 12, the data center 480 communicates with the wireless mobile device 376(0) and the wireless mobile device 376(1) over the same data network 474. Of course, in other embodiments the wireless mobile device 376(0) may communicate with the data center 480 via a network different than a network utilized by the data center 480 and the wireless mobile device 376(1) for communication.

In another embodiment, the wireless mobile device 376(0) may share a computed image with the other wireless mobile device 376(1) by transmitting a sharing request to data center 480. For example, the wireless mobile device 376(0) may request that the data center 480 forward the second computed to the other wireless mobile device 376(1). In response to receiving the sharing request, the data center 480 may then transmit the second computed image to the wireless mobile device 376(1). In an embodiment, transmitting the second computed image to the other wireless mobile device 376(1) may include sending a URL at which the other wireless mobile device 376(1) may access the second computed image.

Still further, as shown in FIG. 12, after receiving the second computed image, the other wireless mobile device 376(1) may send to the data center 480 a request to adjust processing of the at least two digital images. For example, the other wireless mobile device 376(1) may display the second computed image in a UI system, such as the UI system 1000 of FIG. 10. A user of the other wireless mobile device 376(1) may manipulate UI controls to adjust the processing of the at least two digital images transmitted to the data center 480 by the wireless mobile device 376(0). For example, user manipulation of a slider control at the other wireless mobile device 376(1) may result in commands being generated and transmitted to data center 480 for processing. In an embodiment, the request to adjust the processing of the at least two digital images sent from the other wireless mobile device 376(1) includes the commands generated based on the user manipulation of the slider control at the other wireless mobile device 376(1). In other embodiments, the request to adjust processing of the at least two digital images includes any instructions from the wireless mobile device 376(1) that the data center 480 may use to again process the at least two digital images and generate a third computed image.

As shown in FIG. 12, upon receiving the request to adjust processing, the data center 480 re-processes the at least two digital images to generate a third computed image. In one embodiment, the data center 480 may re-process the at least two digital images using mix weights received from the wireless mobile device 376(1). In such an embodiment, the mix weights received from the wireless mobile device 376(1) may be provided as input with the at least two digital images to an HDR processing algorithm that executes at the data center 480. In another embodiment, the mix weights received from the wireless mobile device 376(1) may be used to adjust a blending of the at least two digital images. After generating the third computed image, the third computed image is then transmitted from the data center 480 to the wireless mobile device 376(1) for display. Still further, after receiving the third computed image, the wireless mobile device 376(1) may send to the data center 480 a request to store the third computed image. In another embodiment, other wireless mobile devices 376 in communication with the data center 480 may request storage of a computed image. For example, in the context of FIG. 12, the wireless mobile device 376(0) may at any time request storage of the first computed image or the second computed image.

In response to receiving a request to store a computed image, the data center 480 may store the computed image for later retrieval. For example, the stored computed image may be stored such that the computed image may be later retrieved without re-applying the processing that was applied to generate the computed image. In one embodiment, the data center 480 may store computed images within a storage system 486 local to the data center 480. In other embodiments, the data center 480 may store computed images within hardware devices not local to the data center 480, such as a data center 481. In such embodiments, the data center 480 may transmit the computed images over the data network 474 for storage.

Still further, in some embodiments, a computed image may be stored with a reference to the at least two digital images utilized to generate the computed image. For example, the computed image may be associated with the at least two digital images utilized to generate the computed image, such as through a URL served by data center 480 or 481. By linking the stored computed image to the at least two digital images, any user or device with access to the computed image may also be given the opportunity to subsequently adjust the processing applied to the at least two digital images, and thereby generate a new computed image.

To this end, users of wireless mobile devices 376 may leverage processing capabilities of a data center 480 accessible via a data network 474 to generate a new image utilizing digital images that other wireless mobile devices 376 have captured and subsequently provided access to. For example, digital signals comprising digital images may be transferred over a network for being combined remotely, and the combined digital signals may result in at least a portion of a low-noise or HDR image. Still further, a user may be able to adjust a blending of two or more digital images to generate a new low-noise or HDR photograph without relying on their wireless mobile device 376 to perform the processing or computation necessary to generate the new photograph. Subsequently, the user's device may receive at least a portion of an image resulting from a combination of two or more digital signals. Accordingly, the user's wireless mobile device 376 may conserve power by offloading processing to a data center. Finally, the user may be able to obtain a low-noise or HDR photograph generated using an algorithm determined to be best for a photographic scene without having to select a blending or HDR algorithm himself or herself and without having installed software that implements such a blending or HDR algorithm on their wireless mobile device 376. For example, the user may rely on the data center 480 to identify and to select a best blending or HDR algorithm for a particular photographic scene.

One advantage of the present invention is that a digital photograph may be selectively generated based on user input using two or more different images generated from a single exposure of a photographic scene. Accordingly, the digital photograph generated based on the user input may have a greater dynamic range than any of the individual images. Further, the generation of an HDR image using two or more different images with zero, or near zero, interframe time allows for the rapid generation of HDR images without motion artifacts.

When there is any motion within a photographic scene, or a capturing device experiences any jitter during capture, any interframe time between exposures may result in a motion blur within a final merged HDR photograph. Such blur can be significantly exaggerated as interframe time increases. This problem renders current HDR photography an ineffective solution for capturing clear images in any circumstance other than a highly static scene. Further, traditional techniques for generating a HDR photograph involve significant computational resources, as well as produce artifacts which reduce the image quality of the resulting image. Accordingly, strictly as an option, one or more of the above issues may or may not be addressed utilizing one or more of the techniques disclosed herein.

Still yet, in various embodiments, one or more of the techniques disclosed herein may be applied to a variety of markets and/or products. For example, although the techniques have been disclosed in reference to a photo capture, they may be applied to televisions, web conferencing (or live streaming capabilities, etc.), security cameras (e.g. increase contrast to determine characteristic, etc.), automobiles (e.g. driver assist systems, in-car infotainment systems, etc.), and/or any other product which includes a camera input.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. An image sensor, comprising:
   a first analog sampling circuit including a first charge storage element, the first analog sampling circuit in communication with a first node of the first charge storage element for storing a first sample;
   a first photodiode in communication with the first analog sampling circuit;
   a second photodiode in communication with the first analog sampling circuit;
   a second analog sampling circuit including a second charge storage element, the second analog sampling circuit in communication with a second node of the second charge storage element for storing a second sample;
   a third photodiode in communication with the second analog sampling circuit;
   a fourth photodiode in communication with the second analog sampling circuit;
   wherein the first analog sampling circuit is in communication with the second analog sampling circuit via a first transistor, the first transistor coupling together the first charge storage element with the second charge storage element.

2. The image sensor of claim 1, wherein the first sample stored at the first node is based on both of a first light intensity at the first photodiode and a second light intensity at the second photodiode.

3. The image sensor of claim 1, wherein the second sample stored at the second node is based on both of a first light intensity at the third photodiode and a second light intensity at the fourth photodiode.

4. The image sensor of claim 1, wherein a first sample signal associated with the first sample and a second sample signal associated with the second sample are activated sequentially.

5. The image sensor of claim 1, wherein the first sample stored at the first node is based on both of a first light intensity at the first photodiode and a second light intensity at the third photodiode.

6. The image sensor of claim 1, wherein the first sample and the second sample are combined together via the first transistor, the combined samples based on a first light intensity at the first photodiode, a second light intensity at the second photodiode, a third light intensity at the third photodiode, and a fourth light intensity at the fourth photodiode.

7. The image sensor of claim 1, wherein the transistor includes a drain communicatively coupled to the first node, a source communicatively coupled to the second nod, and a gate.

8. The image sensor of claim 1, wherein the image sensor is operable such that the first sample is output in a first analog signal.

9. The image sensor of claim 1, wherein the image sensor is operable such that a first photodiode current of the first photodiode and a second photodiode current of the second photodiode are combined for storing the first sample at the first node.

10. The image sensor of claim 9, wherein the image sensor is operable such that the first sample is output in a first analog signal that is amplified utilizing a first gain, resulting in a first amplified analog signal.

11. The image sensor of claim 10, wherein the image sensor is operable such that the first amplified analog signal is converted to at least a portion of a first digital signal associated with a first digital image.

12. The image sensor of claim 11, wherein the image sensor is operable such that sliding indicia is displayed, and in response to the sliding indicia being manipulated by a user the first digital signal is blended with a second digital signal associated with a second digital image.

13. The image sensor of claim 12, wherein the image sensor is operable such that the second digital signal is generated utilizing, at least in part, a second amplified analog signal, wherein the second amplified analog signal is generated from applying a second gain to a second analog signal, wherein the second analog signal includes an analog value based on the second sample stored at the second node.

14. The image sensor of claim 13, wherein the image sensor is operable such that the first sample and the second sample are stored during a single exposure of a photographic scene.

15. The image sensor of claim 12, wherein the image sensor is operable such that the first digital signal includes the first digital image having a first resolution, and the second digital signal includes the second digital image having a second resolution different than the first resolution.

16. The image sensor of claim 15, wherein the second resolution of the second digital image is greater than the first resolution of the first digital image.

17. The image sensor of claim 1, wherein the image sensor is operable such that at least one of the first sample and the second sample is converted to a plurality of digital signals.

18. The image sensor of claim 17, wherein the image sensor is operable for transferring the digital signals over a network for being combined remotely.

19. The image sensor of claim 17, wherein the image sensor is operable for transferring the digital signals over a network for being combined remotely, resulting in at least a portion of a high dynamic range (HDR) image.

20. A camera module, comprising:
an image sensor;
a first analog sampling circuit of the image sensor including a first charge storage element, the first analog sampling circuit in communication with a first node of the first charge storage element for storing a first output;
a first photodiode in communication with the first analog sampling circuit;
a second photodiode in communication with the first analog sampling circuit;
a second analog sampling circuit of the image sensor including a second charge storage element, the second analog sampling circuit in communication with a second node of the second charge storage element for storing a second output;
a third photodiode in communication with the second analog sampling circuit; and
a fourth photodiode in communication with the second analog sampling circuit;
wherein the first analog sampling circuit is in communication with the second analog sampling circuit via a first transistor, the first transistor coupling together the first charge storage element with the second charge storage element.

* * * * *